US012530882B2

(12) United States Patent
Dutta et al.

(10) Patent No.: US 12,530,882 B2
(45) Date of Patent: Jan. 20, 2026

(54) EFFICIENT ARTIFICIAL INTELLIGENCE-BASED BASE CALLING OF INDEX SEQUENCES

(71) Applicant: ILLUMINA, INC., San Diego, CA (US)

(72) Inventors: Anindita Dutta, San Francisco, CA (US); Gery Vessere, Oakland, CA (US)

(73) Assignee: Illumina, Inc., San Diego, CA (US)

( * ) Notice: Subject to any disclaimer, the term of this patent is extended or adjusted under 35 U.S.C. 154(b) by 678 days.

(21) Appl. No.: 17/839,331

(22) Filed: Jun. 13, 2022

(65) Prior Publication Data

US 2023/0005253 A1 Jan. 5, 2023

Related U.S. Application Data

(60) Provisional application No. 63/217,644, filed on Jul. 1, 2021.

(51) Int. Cl.
*G06V 10/75* (2022.01)
*G06T 7/38* (2017.01)
(Continued)

(52) U.S. Cl.
CPC ............... *G06V 10/82* (2022.01); *G06T 7/38* (2017.01); *G06T 7/73* (2017.01); *G06V 10/75* (2022.01); *G06T 2207/20084* (2013.01)

(58) Field of Classification Search
CPC .......... G06V 10/82; G06V 10/75; G06T 7/38; G06T 7/73; G06T 2207/20084;
(Continued)

(56) References Cited

U.S. PATENT DOCUMENTS 5,641,658 A 6/1997 Adams et al.
6,090,592 A 7/2000 Adams et al.
(Continued)

FOREIGN PATENT DOCUMENTS

CA 2894317 A1 12/2016
CA 3104851 A1 11/2020
(Continued)

OTHER PUBLICATIONS

Semantic Segmentation Examples—MATLAB and Simulink, 22 pages, [retrieved on Jul. 21, 2021], Retrieved from the internet [URL: https://www.mathworks.com/help/vision/ug/semantic-segmentation-examples.html ].
(Continued)

*Primary Examiner* — Amandeep Saini
*Assistant Examiner* — Denise G Alfonso
(74) *Attorney, Agent, or Firm* — Keller Preece PLLC

(57) ABSTRACT

Techniques for improving artificial intelligence-based base calling are disclosed. The improved techniques can be used to better train artificial intelligence for base calling by reordering of sequencing images, and training of a neural network-based base caller where the temporal logic is effectively "frozen" (or bypassed). In addition, the improved techniques include various combinations, including, for example, combining "normalization" of sequencing images with reordering of sequencing images and/or with effectively "freezing" the temporal logic.

31 Claims, 29 Drawing Sheets
(13 of 29 Drawing Sheet(s) Filed in Color)

(51) Int. Cl.
*G06T 7/73* (2017.01)
*G06V 10/82* (2022.01)
(58) Field of Classification Search
CPC ........ G06N 3/0464; G06N 3/09; G06N 3/084; G16B 30/00; G16B 40/10; G16B 40/20
See application file for complete search history.

(56) References Cited

U.S. PATENT DOCUMENTS

| | | | |
|---|---|---|---|
| 7,057,026 | B2 | 6/2006 | Barnes et al. |
| 7,115,400 | B1 | 10/2006 | Adessi et al. |
| 7,211,414 | B2 | 5/2007 | Hardin et al. |
| 7,315,019 | B2 | 1/2008 | Turner et al. |
| 7,329,492 | B2 | 2/2008 | Hardin et al. |
| 7,405,281 | B2 | 7/2008 | Xu et al. |
| 7,427,673 | B2 | 9/2008 | Balasubramanian et al. |
| 7,541,444 | B2 | 6/2009 | Milton et al. |
| 7,566,537 | B2 | 7/2009 | Balasubramanian et al. |
| 7,592,435 | B2 | 9/2009 | Milton et al. |
| 8,182,993 | B2 | 5/2012 | Tomaney et al. |
| 8,241,573 | B2 | 8/2012 | Banerjee et al. |
| 8,392,126 | B2 | 3/2013 | Mann |
| 8,401,258 | B2 | 3/2013 | Hargrove et al. |
| 8,407,012 | B2 | 3/2013 | Erlich et al. |
| 8,594,439 | B2 | 11/2013 | Staelin et al. |
| 8,725,425 | B2 | 5/2014 | Heiner et al. |
| 8,795,971 | B2 | 8/2014 | Kersey et al. |
| 8,965,076 | B2 | 2/2015 | Garcia et al. |
| 9,279,154 | B2 | 3/2016 | Previte et al. |
| 9,453,258 | B2 | 9/2016 | Kain et al. |
| 9,708,656 | B2 | 7/2017 | Turner et al. |
| 10,023,911 | B2 | 7/2018 | Tomaney et al. |
| 10,068,054 | B2 | 9/2018 | Van Rooyen et al. |
| 10,152,776 | B2 | 12/2018 | Langlois et al. |
| 10,168,438 | B2 | 1/2019 | Dennis et al. |
| 10,241,075 | B2 | 3/2019 | Davey et al. |
| 10,354,747 | B1 | 7/2019 | DePristo et al. |
| 10,423,861 | B2 | 9/2019 | Gao et al. |
| 10,491,239 | B1 | 11/2019 | Hubara |
| 10,527,549 | B2 | 1/2020 | Rebetez et al. |
| 10,540,591 | B2 | 1/2020 | Gao et al. |
| 10,619,195 | B2 | 4/2020 | Lamb et al. |
| 10,648,027 | B2 | 5/2020 | Mannion et al. |
| 10,711,299 | B2 | 7/2020 | Rothberg et al. |
| 10,713,794 | B1 | 7/2020 | He et al. |
| 10,740,880 | B2 | 8/2020 | Paik et al. |
| 10,740,883 | B2 | 8/2020 | Zerfass et al. |
| 10,755,810 | B2 | 8/2020 | Buckler et al. |
| 10,963,673 | B2 | 3/2021 | Schaumberg et al. |
| 11,138,496 | B2 | 10/2021 | Seth |
| 2002/0055100 | A1 | 5/2002 | Kawashima et al. |
| 2003/0062485 | A1 | 4/2003 | Fernandez et al. |
| 2004/0002090 | A1 | 1/2004 | Mayer et al. |
| 2004/0096853 | A1 | 5/2004 | Mayer |
| 2006/0014151 | A1 | 1/2006 | Ogura et al. |
| 2006/0040297 | A1 | 2/2006 | Leamon et al. |
| 2006/0064248 | A1 | 3/2006 | Saidi et al. |
| 2006/0188901 | A1 | 8/2006 | Barnes et al. |
| 2006/0240439 | A1 | 10/2006 | Smith et al. |
| 2006/0269130 | A1 | 11/2006 | Maroy et al. |
| 2007/0128624 | A1 | 6/2007 | Gormley et al. |
| 2007/0166705 | A1 | 7/2007 | Milton et al. |
| 2008/0009420 | A1 | 1/2008 | Schroth et al. |
| 2008/0234136 | A1 | 9/2008 | Drmanac et al. |
| 2008/0242560 | A1 | 10/2008 | Gunderson et al. |
| 2009/0081775 | A1 | 3/2009 | Hodneland et al. |
| 2010/0046830 | A1 | 2/2010 | Wang et al. |
| 2010/0111370 | A1 | 5/2010 | Black et al. |
| 2010/0157086 | A1 | 6/2010 | Segale et al. |
| 2011/0059865 | A1 | 3/2011 | Smith et al. |
| 2011/0065607 | A1 | 3/2011 | Kersey et al. |
| 2011/0281736 | A1 | 11/2011 | Drmanac et al. |
| 2011/0286628 | A1 | 11/2011 | Goncalves et al. |
| 2011/0295902 | A1 | 12/2011 | Mande et al. |
| 2012/0015825 | A1 | 1/2012 | Zhong et al. |
| 2012/0020537 | A1 | 1/2012 | Garcia et al. |
| 2013/0059740 | A1 | 3/2013 | Drmanac et al. |
| 2013/0079232 | A1 | 3/2013 | Kain et al. |
| 2013/0124100 | A1 | 5/2013 | Drmanac et al. |
| 2013/0188866 | A1 | 7/2013 | Obrador et al. |
| 2013/0250407 | A1 | 9/2013 | Schaffer et al. |
| 2014/0051588 | A9 | 2/2014 | Drmanac et al. |
| 2014/0152801 | A1 | 6/2014 | Fine et al. |
| 2015/0079596 | A1 | 3/2015 | Eltoukhy et al. |
| 2015/0117784 | A1 | 4/2015 | Lin et al. |
| 2015/0169824 | A1 | 6/2015 | Kermani et al. |
| 2016/0042511 | A1 | 2/2016 | Chukka et al. |
| 2016/0078272 | A1 | 3/2016 | Hammoud |
| 2016/0110498 | A1 | 4/2016 | Bruand et al. |
| 2016/0196479 | A1 | 7/2016 | Chertok et al. |
| 2016/0350914 | A1 | 12/2016 | Champlin et al. |
| 2016/0356715 | A1 | 12/2016 | Zhong et al. |
| 2016/0357903 | A1 | 12/2016 | Shendure et al. |
| 2016/0371431 | A1 | 12/2016 | Haque et al. |
| 2017/0044601 | A1 | 2/2017 | Crnogorac et al. |
| 2017/0098032 | A1 | 4/2017 | Desai et al. |
| 2017/0116520 | A1 | 4/2017 | Min et al. |
| 2017/0161545 | A1 | 6/2017 | Champlin et al. |
| 2017/0169313 | A1 | 6/2017 | Choi et al. |
| 2017/0249421 | A1 | 8/2017 | Eberle et al. |
| 2017/0249744 | A1 | 8/2017 | Wang et al. |
| 2017/0362634 | A1 | 12/2017 | Ota et al. |
| 2018/0075279 | A1 | 3/2018 | Gertych et al. |
| 2018/0107927 | A1 | 4/2018 | Frey |
| 2018/0114337 | A1 | 4/2018 | Li et al. |
| 2018/0189613 | A1 | 7/2018 | Wolf et al. |
| 2018/0195953 | A1 | 7/2018 | Langlois et al. |
| 2018/0201992 | A1 | 7/2018 | Wu et al. |
| 2018/0211001 | A1 | 7/2018 | Gopalan et al. |
| 2018/0240032 | A1* | 8/2018 | van Rooyen .......... G16B 30/00 |
| 2018/0274023 | A1 | 9/2018 | Belitz et al. |
| 2018/0305751 | A1 | 10/2018 | Vermaas et al. |
| 2018/0322327 | A1 | 11/2018 | Smith et al. |
| 2018/0330824 | A1 | 11/2018 | Athey |
| 2018/0334711 | A1 | 11/2018 | Kelley et al. |
| 2018/0334712 | A1 | 11/2018 | Singer et al. |
| 2018/0340234 | A1 | 11/2018 | Scafe et al. |
| 2019/0034586 | A1 | 1/2019 | Pirrotte et al. |
| 2019/0080450 | A1 | 3/2019 | Arar et al. |
| 2019/0107642 | A1 | 4/2019 | Farhadi Nia et al. |
| 2019/0114544 | A1 | 4/2019 | Sundaram et al. |
| 2019/0156915 | A1 | 5/2019 | Zhang et al. |
| 2019/0164010 | A1 | 5/2019 | Ma et al. |
| 2019/0170680 | A1 | 6/2019 | Sikora et al. |
| 2019/0180153 | A1 | 6/2019 | Buckler et al. |
| 2019/0213473 | A1* | 7/2019 | Dutta .................. C12Q 1/6869 |
| 2019/0237160 | A1 | 8/2019 | Rothberg et al. |
| 2019/0237163 | A1 | 8/2019 | Wang et al. |
| 2019/0244348 | A1 | 8/2019 | Buckler et al. |
| 2019/0266491 | A1 | 8/2019 | Gao et al. |
| 2019/0272638 | A1 | 9/2019 | Mouton et al. |
| 2019/0332118 | A1 | 10/2019 | Wang et al. |
| 2019/0392578 | A1 | 12/2019 | Chukka et al. |
| 2020/0019859 | A1* | 1/2020 | Farh ...................... G06N 20/20 |
| 2020/0027002 | A1 | 1/2020 | Hickson et al. |
| 2020/0054306 | A1 | 2/2020 | Mehanian et al. |
| 2020/0057838 | A1 | 2/2020 | Yekhanin et al. |
| 2020/0065675 | A1 | 2/2020 | Sundaram et al. |
| 2020/0125947 | A1 | 4/2020 | Park et al. |
| 2020/0176082 | A1 | 6/2020 | Massingham |
| 2020/0193597 | A1 | 6/2020 | Fan et al. |
| 2020/0226368 | A1 | 7/2020 | Bakalo et al. |
| 2020/0256856 | A1 | 8/2020 | Chou et al. |
| 2020/0302223 | A1 | 9/2020 | Dutta et al. |
| 2020/0302224 | A1 | 9/2020 | Jaganathan et al. |
| 2020/0302297 | A1 | 9/2020 | Jaganathan et al. |
| 2020/0302603 | A1 | 9/2020 | Barnes et al. |
| 2020/0320294 | A1 | 10/2020 | Mangal et al. |
| 2020/0327377 | A1 | 10/2020 | Jaganathan et al. |
| 2020/0342955 | A1 | 10/2020 | Guo et al. |
| 2020/0364565 | A1 | 11/2020 | Kostem |
| 2020/0388029 | A1 | 12/2020 | Saltz et al. |
| 2021/0027462 | A1 | 1/2021 | Bredno et al. |
| 2021/0056287 | A1 | 2/2021 | Schaumburg et al. |

(56) References Cited

U.S. PATENT DOCUMENTS

| | | |
|---|---|---|
| 2021/0072391 A1 | 3/2021 | Li et al. |
| 2021/0089827 A1 | 3/2021 | Kumagai et al. |
| 2021/0115490 A1 | 4/2021 | Embree et al. |
| 2021/0390278 A1 | 12/2021 | Van Leeuwen et al. |

FOREIGN PATENT DOCUMENTS

| | | |
|---|---|---|
| CN | 110245685 A | 9/2019 |
| EP | 3130681 A1 | 2/2017 |
| EP | 3373238 A1 | 9/2018 |
| JP | 2007199397 A | 8/2007 |
| WO | 9106678 A1 | 5/1991 |
| WO | 2004018497 A2 | 3/2004 |
| WO | 2005065814 A1 | 7/2005 |
| WO | 2006064199 A1 | 6/2006 |
| WO | 2007010251 A2 | 1/2007 |
| WO | 2007123744 A2 | 11/2007 |
| WO | 2008154317 A1 | 12/2008 |
| WO | 2012058096 A1 | 5/2012 |
| WO | 2014142921 A1 | 9/2014 |
| WO | 2015084985 A2 | 6/2015 |
| WO | 2016145516 A1 | 9/2016 |
| WO | 2016201564 A1 | 12/2016 |
| WO | 2017184997 A1 | 10/2017 |
| WO | 2018129314 A1 | 7/2018 |
| WO | 2018165099 A1 | 9/2018 |
| WO | 2018203084 A1 | 11/2018 |
| WO | 2019027767 A1 | 2/2019 |
| WO | 2019028047 A1 | 2/2019 |
| WO | 2019055856 A1 | 3/2019 |
| WO | 2019079182 A1 | 4/2019 |
| WO | 2019079202 A1 | 4/2019 |
| WO | 2019090251 A2 | 5/2019 |
| WO | 2019136284 A1 | 7/2019 |
| WO | 2019136388 A1 | 7/2019 |
| WO | 2019140402 A1 | 7/2019 |
| WO | 2019147904 A1 | 8/2019 |
| WO | 2020014280 A1 | 1/2020 |
| WO | PCT/US2020/024087 | 3/2020 |
| WO | PCT/US2020/024088 | 3/2020 |
| WO | PCT/US2020/024090 | 3/2020 |
| WO | PCT/US2020/024091 | 3/2020 |
| WO | PCT/US2020/024092 | 3/2020 |
| WO | PCT/US2020/033280 | 5/2020 |
| WO | PCT/US2020/033281 | 5/2020 |
| WO | 2020123552 A1 | 6/2020 |
| WO | PCT/US2021/018258 | 2/2021 |
| WO | PCT/US2021/018422 | 2/2021 |
| WO | PCT/US2021/018427 | 2/2021 |
| WO | PCT/US2021/018910 | 2/2021 |
| WO | PCT/US2021/018913 | 2/2021 |
| WO | PCT/US2021/018915 | 2/2021 |
| WO | PCT/US2021/018917 | 2/2021 |
| WO | PCT/US2021/047763 | 8/2021 |
| WO | PCT/US2022/020460 | 3/2022 |
| WO | PCT/US2022/020462 | 3/2022 |
| WO | PCT/US2022/021814 | 3/2022 |
| WO | PCT/US2022/24911 | 4/2022 |
| WO | PCT/US2022/24913 | 4/2022 |
| WO | PCT/US2022/24916 | 4/2022 |
| WO | PCT/US2022/24918 | 4/2022 |
| WO | PCT/US2022/035564 | 6/2022 |
| WO | PCT/US2022/035567 | 6/2022 |
| WO | PCT/US2022/035847 | 6/2022 |

OTHER PUBLICATIONS

Bentley et al., Accurate Whole Human Genome Sequencing using Reversible Terminator Chemistry, Supplemental Information, Nature, dated Nov. 6, 2008, 55 pages, [retrieved on Jul. 21, 2021], retrieved from the internet [URL: https://media.nature.com/original/nature-assets/nature/journal/v456/n7218/extref/nature07517-s1.pdf ].

Illumina, GA Bootcamp, Sequencing Module 3: Overview, Broad Institute, 73 pages, [retrieved on Jul. 22, 2021].
Grange, NGS: the basics, Institut Jacques Monod, dated Jun. 26, 2000, 59 pages.
Massingham et. al., All Your Base: a fast and accurate probabilistic approach to base calling, European Bioinformatics Institute, 22 pages, [retrieved on Jul. 22, 2021], Retrieved from the internet [URL: https://www.ebi.ac.uk/goldman-srv/AYB/references/ayb.pdf].
Krishnakumar et al., Systematic and stochastic influences on the performance of the MinION nanopore sequencer across a range of nucleotide bias, Scientific Reports, published Feb. 16, 2018, 13 pages.
Tegfalk, Application of Machine Learning techniques to perform base-calling in next-generation DNA sequencing, KTH Royal Institue of Technology, dated 2020, 53 pages.
Kircher et al., Improved base-calling for the Iillumina Genome Analyzer using Machine Learning Strategies, Genome Biology 2009, I O:R83, Aug. 14, 2009, 10 pages.
Adriana Romero et al., FitNets: Hints for Thin Deep Nets, published Mar. 27, 2015, 13 pages.
Robinson et al., Computational Exome and Genome Analysis—Chapter 3 Illumina Technology, dated 2018, 25 pages.
Pfeiffer et. al., Systematic evaluation of error rates and causes in short samples in next-generation sequencing, Scientific Reports, published Jul. 19, 2018, 14 pages.
Puckelwartz et al., Supercomputing for the parallelization of whole genome analysis, Bioinformatics, dated Feb. 12, 2014, pp. 1508-1513, 6 pages.
Kelly et al., Churchill: an ultra-fast, deterministic, highly scalable and balanced parallelization strategy for the discovery of human genetic variation in clinical and population-scale genomics, Genome Biology, Bio-Med Central Ltd, vol. 16, No. 1, dated Jan. 20, 2015, 14 pages.
Wang et al., Achieving Accurate and Fast Base-calling by a Block model of the Illumina Sequencing Data, Science Direct, vol. 48, No. 28, dated Jan. 1, 2015, pp. 1462-1465, 4 pages.
Gao et al., Deep Learning in Protein Structural Modeling and Design, Patterns—CelPress, dated Dec. 11, 2020, 23 pages.
Pejaver et al., Inferring the molecular and phenotypic impact of amino acid variants with MutPred2—with Supplementary Information, Nature Communications, dated 2020, 59 pages.
Pakhrin et al., Deep learning based advances in protein structure prediction, International Journal of Molecular sciences, published May 24, 2021, 30 pages.
Wang et al. Predicting the impacts of mutations on protein-ligand binding affinity based on molecular dynamics simulations and machine learning methods, Computational and Structural Biotechnology Journal 18, dated Feb. 20, 2022, pp. 439-454, 16 pages.
Iqbal et al., Comprehensive characterization of amino acid positions in protein structures reveals molecular effects of missense variants, and supplemental information, PNAS, vol. 117, No. 45, dated Nov. 10, 2020, 35 pages.
Forghani et al., Convolutional Neural Network Based Approach to In Silica Non-Anticipating Prediction of Antigenic Distance for Influenza Virus, Viruses, published Sep. 12, 2020, vol. 12, 20 pages.
Jing et al., Learning from protein structure with geometric vector perceptrons, Arxiv: 2009: 01411v2, dated Dec. 31, 2020, 18 pages.
Hacteria Wiki, HiSeq2000—Next Level Hacking—Hackteria Wiki, retrieved on Apr. 12, 2021, retrieved from the internet [URL: https://www.hackteria.org/wiki/HiSeq2000_-_Next_Level_Hacking ], 42 pages.
Pei et al., A Topological Measurement for Weighted Protein Interaction Network, IEEE Computational Systems Bioinformatics Conference dated 2005, 11 pages.
Assfalg et. al., "3DString, A Feature String Kernel for 3D Object Classification on Voxelized Data", dated Nov. 6, 2006, 10 pages.
Sanders, S. J. et al. De novo mutations revealed by whole-exome sequencing are strongly associated with autism. Nature 485, 237-241 (2012).
De Rubeis, S. et al. Synaptic, transcriptional and chromatin genes disrupted in autism. Nature 515, 209-215 (2014).

(56) References Cited

OTHER PUBLICATIONS

Deciphering Developmental Disorders Study. Large-scale discovery of novel genetic causes of developmental disorders. Nature 519, 223-228 (2015).
Deciphering Developmental Disorders Study. Prevalence and architecture of de novo mutations in developmental disorders. Nature 542, 433-438 (2017).
Iossifov, I. et al. The contribution of de novo coding mutations to autism spectrum disorder. Nature 515, 216-221 (2014).
Kent, W. J. et al. The human genome browser at UCSC. Genome Res. 12, 996-1006 (2002).
Tyner, C. et al. The UCSC Genome Browser database—2017 update. Nucleic Acids Res. 45, D626-D634 (2017).
Kabsch, W., & Sander, C. Dictionary of protein secondary structure—pattern recognition of hydrogen-bonded and geometrical features. Biopolymers 22, 2577-2637 (1983).
Joosten, R. P. et al. A series of PDB related databases for everyday needs. Nucleic Acids Res. 39, 411-419 (2011).
Tonita-Laza, I., McCallum, K., Xu, B., & Buxbaum, J. D. A spectral approach integrating functional genomic annotations for coding and noncoding variants. Nat. Genet. 48, 214-220 (2016).
Li, B. et al. Automated inference of molecular mechanisms of disease from amino acid substitutions. Bioinformatics 25, 2744-2750 (2009).
Shihab, H. A. et al. Predicting the functional, molecular, and phenotypic consequences of amino acid substitutions using hidden Markov models. Human. Mutat. 34, 57-65 (2013).
Liu, X., Wu, C., Li, C., & Boerwinkle, E. dbNSFPv3.0 a one-stop database of functional predictions and annotations for human nonsynonymous and splice-site SNVs. Human. Mutat. 37, 235-241 (2016).
Jain, S., White, M., Radivojac, P. Recovering true classifier performance in positive-unlabeled learning. in Proceedings Thirty-First AAAI Conference on Artificial Intelligence. 2066-2072 (AAAI Press, San Francisco; 2017).
De Ligt, J. et al. Diagnostic exome sequencing in persons with severe intellectual disability. N. Engl. J. Med. 367, 1921-1929 (2012).
Iossifov, I. et al. De novo gene disruptions in children on the autistic spectrum. Neuron 74, 285-299 (2012).
O'Roak, B. J. et al. Sporadic autism exomes reveal a highly interconnected protein network of de novo mutations. Nature 485, 246-250 (2012).
Rauch, A. et al. Range of genetic mutations associated with severe non-syndromic sporadic intellectual disability—an exome sequencing study. Lancet 380, 1674-1682 (2012).
Epi, K. C. et al. De novo mutations in epileptic encephalopathies. Nature 501, 217-221 (2013).
EuroEPINOMICS-RES Consortium, Epilepsy Phenome/Genome Project, Epi4K Consortium. De novo mutations in synaptic transmission genes including DNM1 cause epileptic encephalopathies. Am. J. Hum. Genet. 95, 360-370 (2014).
Gilissen, C. et al. Genome sequencing identifies major causes of severe intellectual disability. Nature 511, 344-347 (2014).
Lelieveld, S. H. et al. Meta-analysis of 2, 104 trios provides support for 10 new genes for intellectual disability. Nat. Neurosci. 19, 1194-1196 (2016).
Famiglietti, M. L. et al. Genetic variations and diseases in UniProtKB Swiss-Prot—the ins and outs of expert manual curation. Human. Mutat. 35, 927-935 (2014).
Horaitis, O., Talbot, C. C.Jr., Phommarinh, M., Phillips, K. M., & Cotton, R. G. A database of locus-specific databases. Nat. Genet. 39, 425 (2007).
Stenson, P. D. et al. The Human Gene Mutation Database—building a comprehensive mutation repository for clinical and molecular genetics, diagnostic testing and personalized genomic medicine. Hum. Genet. 133, 1-9 (2014).
Alipanahi, et al., "Predicting the Sequence Specificities of DNA and RNA Binding Proteins by Deep Learning", Aug. 2015, 9pgs.
Leung, et. al., "Deep learning of the tissue regulated splicing code", 2014, 9pgs.
Park, et. al., "Deep Learning for Regulatory Genomics", Aug. 2015, 2pgs.
Sundaram, et. al., "Predicting the clinical impact of human mutation with deep neural networks", Aug. 2018, 15pgs.
Torng, Wen, et al., "3D deep convolutional neural networks for amino acid environment similarity analysis", 2017, 23pages.
Grob, C., et. al., "Predicting variant deleteriousness in non human species Applying the CADD approach in mouse", 2018, 11 pages.
Alberts, Bruce, et al., "Molecular biology of the cell", Sixth Edition, 2015, 3 pages.
Illumina, "Indexed Sequencing Overview Guide", Document No. 15057455, v. 5, Mar. 2019.
Ramesh, Nisha, et. al., "Cell Segmentation Using a Similarity Interface With a Multi-Task Convolutional Neural Network"; IEEE Journal of Biomedical and Health Informatics, vol. 23, No. 4, Jul. 2019, 12 pages.
Pu et. al., "DeepDrug3D: Classification of ligand-binding pockets in proteins with a convolutional neural network", dated Feb. 4, 2019, 23 pages.
Adam, "Deep learning, 3D technology to improve structure modeling for protein interactions, create better drugs", dated Jan. 9, 2020, 4 pages.
Varela, "Ligvoxel: A Deep Learning Pharmacore-Field Predictor", dated Mar. 19, 2019, 5 pages.
Li et. al., "Predicting changes in protein thermostability upon mutation with deep 3D convolutional neural networks", dated Feb. 28, 2020, 21 pages.
Raschka et. al., "Machine Learning and AI-based approaches for bioactive ligand discovery and GPCR-ligand recognition", dated Jun. 6, 2020, 33 pages.
Morrone et. al., "Combining docking pose rank and structure with deep learning improves protein-ligand binding mode prediction", dated Oct. 7, 2019, 13 pages.
Li, "Machine Learning Methods for Medical and Biological Image Computing", dated Summer 2016, 113 pages.
Rivera et. al., "A Deep Learning Approach to Protein Structure Prediction", dated Apr. 24, 2019, 22 pages.
Aritake et. al., "Single-molecule localization by voxel-wise regression using convolutional neural network", dated Nov. 3, 2020, 11 pages.
Townshend et. al., "End-to-End Learning on 3D Protein Structure for Interface Prediction", dated 2019, 10 pages.
Amidi et. al., "EnzyNet: enzyme classification using 3D convolutional neural networks on spatial representation", dated Jul. 25, 2017, 18 pages.
Luna, "Machine Learning in structural biology and chemoinformatics", dated 2019, 106 pages.
Anonymous, "Transferrable end-to-end learning for protein interface prediction", dated 2019, 12 pages.
Dias et. al., "Artificial intelligence in clinical and genomic diagnostics", dated 2019, 12 pages.
Luna et. al., "A Deep-Learning Approach toward Rational Molecular Docking Protocol Selection", dated May 27, 2020, 12 pages.
Li et. al., "DeepAtom: A Framework for Protein-Ligand Binding Affinity Prediction", dated 2019, 8 pages.
Zhang et. al., "Template-based prediction of protein structure with deep learning", dated Jun. 2, 2020, 16 pages.
Jaganathan, K. et. al., "Predicting splicing from primary sequence with deep learning", Cell 176, 535-548, (2019).
Kircher, Martin, et al. "A general framework for estimating the relative pathogenicity of human genetic variants." Nature genetics 46.3 (2014): 310. (Year:2014).
LeCun, Y., Botlou, L., Bengio, Y., & Haffner, P. Gradient based learning applied to document recognition. Proc. IEEE 86, 2278-2324 (1998).
Zhu, X. Need, A. C., Petrovski, S. & Goldstein, D. B. One gene, many neuropsychiatric disorders: lessons from Mendelian diseases. Nat. Neurosci. 17, 773-781, (2014).
Leffler, E. M. et al. Revisiting an old riddle: what determines genetic diversity levels within species? PLoS Biol. 10, e1001388 (2012), 9pages.

(56) References Cited

OTHER PUBLICATIONS

He, K, Zhang, X., Ren, S., & Sun, J. Identity mappings in deep residual networks. in 14th European Conference on Computer Vision—ECCV 2016. ECCV 2016. Lecture Notes in Computer Science, vol. 9908; 630 6,15 (Springer, Cham, Switzerland; 2016).
Lu, Q. et al. A statistical framework to predict functional non-coding regions in the human genome through integrated analysis of annotation data. Sci. Rep. 5, 10576 (2015), 13pgs.
Davydov, E. V. et al. Identifying a high fraction of the human genome to be under selective constraint using Gerp++. PLoS Comput. Biol. 6, Dec. 2, 2010, 13 pages.
Angermueller, et. al., "Accurate Prediction of Single Cell DNA Methylation States Using Deep Learning", Apr. 11, 2017, 13pgs.
Ching, et. al., "Opportunities and Obstacles for Deep Learning in Biology and Medicine", Jan. 19, 2018, 123pgs.
Ching, et. al., "Opportunities and Obstacles for Deep Learning in Biology and Medicine", May 26, 2017, 47pgs.
Gu et. al., Recent Advances in Convolutional Neural Networks, dated Jan. 5, 2017, 37 pages.
Leung, et. al., "Inference of the Human Polyadenylation Code", Apr. 27, 2017, 13pgs.
Leung, et. al., "Machine Learning in Genomic Medicine", Jan. 1, 2016, 22pgs.
Schwarz, J. M., Rodelsperger, C., Schuelke, M. & Seelow, D. MutationTaster evaluates disease-causing potential of sequence alterations. Nat. Methods 7, 575-576 (2010).
Bell, C. J. et al. Comprehensive carrier testing for severe childhood recessive diseases by next generation sequencing. Sci. Transl. Med. 3, Jan. 12, 2011, 28 pages.
Hefferman, R. et al. Improving prediction of secondary structure, local backbone angles, and solvent accessible surface area of proteins by iterative deep learning. Sci. Rep. 5, 11476 (2015) 11 pages.
Harpak, A., Bhaskar, A., & Pritchard, J. K. Mutation rate variation is a primary determinant of the distribution of allele frequencies in humans. PLoS Genet. Dec. 15, 2016, 22pgs.
Angermueller, Christof, et. al., Deep learning for computational biology, Molecular Systems Biology, dated Jun. 6, 2016, 16 pages.
Ioannidis, Nilah M., et al., "REVEL—An Ensemble Method for Predicting the Pathogenicity of Rare Missense Variants", Oct. 5, 2016, 9 pages.
Quang Daniel, et. al., "DANN—a deep learning approach for annotating the pathogenicity of genetic variants", Oct. 22, 2014, 3 pages.
Xiong, et. al., "The human splicing code reveals new insights into the genetic determinants of disease", Jan. 9, 2015, 20pgs.
Yue, et. al., "Deep Learning for Genomics—A Concise Overview from internet", May 8, 2018, 40pgs.
Yuen, et. al., "Genome wide characteristics of de novo mutations in autism", Jun. 1, 2016, 10pgs.
Libbrecht, et. al., "Machine learning in genetics and genomics", Jan. 2, 2017, 30pgs.
Min, et. al., "Deep Learning in Bioinformatics", Jul. 25, 2016, 19 pgs.
Chen, Kathleen M., et. al., "Selene—a PyTorch based deep learning library for sequence level data", Oct. 10, 2018, 15pages.
Li, et. al., "FoldingZero—Protein Folding from Scratch in Hydrophobic Polar Model", Dec. 3, 2018, 10 pages.
Rentzsch, et. al.,_"CADD—predicting the deleteriousness of variants throughout the human genome", Oct. 11, 2018, 9 pages.
Zou, etal, "A primer on deep learning in genomics", Nov. 26, 2018, 7pages.
Wei et al, The Role of Balanced Training and Testing Data Sets for Binary Classifiers in Bioinformatics dated Jul. 9, 2013 12 pages.
Duggirala, Ravindranath, et.al., "Genome Mapping and Genomics in Human and Non Human Primate", 2015, 306pgs.
Brookes, Anthony J., "The essence of SNPs", 1999, pp. 177-186.
UniProtKB P04217 A1BG Human [retrieved on Mar. 13, 2019 from (www.uniprot.org/uniprot/P04217), 12pages.
Bahar, Protein Actions Principles and Modeling, Chapter 7, 2017 pp. 165-166.
Dunbrack, Roland L., Re Question about your Paper titled "The Role of Balanced Training and Testing Data Sets for Binary Classifiers in Bioinformatics", Message to Sikander Mohammed Khan, Feb. 3, 2019, E-mailm, 3pgs.
DbSNP rs2241788 [Retrieved on Mar. 13, 2019], Retrieved from the Internet<www.ncbi.nlm.nih.gov/snp/rs2241788>, 5 pages.
Wei, et. al., "Prediction of phenotypes of missense mutations in human proteins from biological assemblies", Feb. 2013, 28 pages.
Zhang, Jun, and Bin Liu. "PSFM-DBT—identifying DNA-binding proteins by combing position specific frequency matrix and distance-bigram transformation." International journal of molecular sciences 18.9 (2017) 1856.
Gao, Tingting, et al. "Identifying translation initiation sites in prokaryotes using support vector machine." Journal of theoretical biology 262.4 (2010) 644-649. (Year 2010).
Bi, Yingtao, et al. "Tree-based position weight matrix approach to model transcription factor binding site profiles." PloS one6.9 (2011) e24210.
Korhonen, Janne H., et al. "Fast motif matching revisited—high-order PWMs, SNPs and indels." Bioinformatics 33.4 (2016) 514-521.
Wong, Sebastien C., et al. "Understanding data augmentation for classification—when to warp?." 2016 international conference on digital image computing—techniques and applications (DICTA). IEEE, 2016.
Chang, Chia-Yun, et al. "Oversampling to overcome overfitting— exploring the relationship between data set composition, molecular descriptors, and predictive modeling methods." Journal of chemical information and modeling 53.4 (2013) 958-971.
Li, Gangmin, and Bei Yao. "Classification of Genetic Mutations for Cancer Treatment with Machine Learning Approaches." International Journal of Design, Analysis and Tools for Integrated Circuits and Systems 7.1 (2018) pp. 63-67.
Martin-Navarro, Antonio, et al. "Machine learning classifier for identification of damaging missense mutations exclusive to human mitochondrial DNA-encoded polypeptides." BMC bioinformatics 18.1 (2017) p. 158.
Krizhevsky, Alex, et al, ImageNet Classification with Deep Convolutional Neural Networks, 2012, 9 Pages.
Geeks for Geeks, "Underfitting and Overfilling in Machine Learning", [retrieved on Aug. 26, 2019]. Retrieved from the Internet <www.geeksforgeeks.org/underfitting-and-overfitting-in-machine--learning/>, 2 pages.
Despois, Julien, "Memorizing is not learning!—6 tricks to prevent overfitting in machine learning", Mar. 20, 2018, 17 pages.
Bhande, Anup What is underfitting and overfitting in machine learning and how to deal with it, Mar. 11, 2018, 10pages.
Carter et al., "Cancer-specific high-throughput annotation of somatic mutations—computational prediction of driver missense mutations," Cancer research 69, No. 16 (2009) pp. 6660-6667.
Min, et. al., "Deep Learning in Bioinformatics", Jun. 19, 2016, 46pgs.
Jiminez et. al., DeepSite—protein binding site predictor using 3D CNNs, dated Oct. 1, 2017, 7 pages.
Estrada, A. et al. Impending extinction crisis of the world's primates— why primates matter. Sc. Adv. 3, e1600946 (2017), 17 pages.
Sherry, S. T. et al. dbSNP—the NCBI database of genetic variation. Nucleic Acids Res. 29, 308-211 (2001).
Arpali et. al., High-throughput screening of large volumes of whole blood using structured illumination and fluoresecent on-chip imaging, Lab on a Chip, United Kingdom, Royal Society of Chemistry, Sep. 12, 2012, vol. 12, pp. 4968-4971.
Liu et. al., 3D Stacked Many Core Architecture for Biological Sequence Analysis Problems, 2017, Int J Parallel Prog, 45:1420-1460.
Wu et. al., FPGA-Based DNA Basecalling Hardware Acceleration, in Proc. IEEE 61st Int. Midwest Symp. Circuits Syst., Aug. 2018, pp. 1098-1101.
Wu et al., FPGA-Accelerated 3rd Generation DNA Sequencing, in IEEE Transactions on Biomedical Circuits and Systems, vol. 14, Issue 1, Feb. 2020, pp. 65-74.

(56) References Cited

OTHER PUBLICATIONS

Prabhakar et. al., Plasticine: A Reconfigurable Architecture for Parallel Patterns, ISCA '17, Jun. 24-28, 2017, Toronto, ON, Canada.
Lin et. al., Network in Network, in Proc. of ICLR, 2014.
Sifre, Rigid-motion Scattering for Image Classification, Ph.D. thesis, 2014.
Sifre et. al., Rotation, Scaling and Deformation Invariant Scattering for Texture Discrimination, in Proc. of CVPR, 2013.
Chollet, Xception: Deep Learning with Depthwise Separable Convolutions, in Proc. of CVPR, 2017. 8 pages.
Zhang et. al., ShuffleNet: An Extremely Efficient Convolutional Neural Network for Mobile Devices, 2017.
He et. al., Deep Residual Learning for Image Recognition, in Proc. of CVPR, 2016.
Xie et. al., Aggregated Residual Transformations for Deep Neural Networks, in Proc. of CVPR, 2017.
Howard et. al., Mobilenets: Efficient Convolutional Neural Networks for Mobile Vision Applications, 2017.
Sandler et. al., MobileNetV2: Inverted Residuals and Linear Bottlenecks, 2018.
Qin et. al., FD-MobileNet: Improved MobileNet with a Fast Downsampling Strategy, 2018.
Chen et. al., Rethinking atrous convolution for semantic image segmentation, 2017.
Huang et. al., Speed/accuracy trade-offs for modern convolutional detectors, 2016.
Oord et al., WAVENET: A Generative Model for Raw Audio, dated Sep. 19, 2016, 15 pages.
Arik et al., Deep Voice: Real-time Neural Text-to-Speech, dated 2017, 17 pages.
Yu et al., Multi-Scale Context Aggregation by Dilated Convolutions, ICLR 2016, dated Apr. 30, 2016, 13 pages.
He et. al., Deep Residual Learning for Image Recognition, 2015.
Srivastava et al., Highway Networks, dated 2015, 6 pages.
Huang et al., Densely Connected Convolutional Networks, dated Aug. 17, 2017, 9 pages.
Szegedy et al., Going Deeper with Convolutions, dated 2014, 12 pages.
Ioffe et al., Batch Normalization Accelerating Deep Network Training by Reducing Internal Covariate Shift, dated 2015, 11 pages.
Wolterink et al., Dilated Convolutional Neural Networks for Cardiovascular MR Segmentation in Congenital Heart Disease, dated 2017, 9 pages.
Piqueras, Autoregressive Model Based on a Deep Convolutional Neural Network for Audio Generation, Tampere University of Technology, dated 2016, 58 pages.
Wu, Introduction to Convolutional Neural Networks, Nanjing University, dated 2017, 31 pages.
scikit-image/peak.py at master, Github, retrieved on Jun. 8, 2021, 10 pages, Retrieved from the internet <URL: https://github.com/scikit-image/scikit-image/blob/main/skimage/feature/peak.py>.
3.3.9.11.Watershed and random walker for segmentation, Scipy lecture notes, 2 pages. [retrieved on Jun. 8, 2021] Retrieved from the internet <URL: http:scipy-lectures.org/packages/scikit-image/auto_examples/plot_segmentations.html>.
Mordvintsev et al., Image Segmentation with Watershed Algorithm, Revision 43532856, 2013, 6 pages. [retrieved on Jun. 8, 2021] Retrieved from the Internet <URL: https://opencv-python-tutroals.readthedocs.io/en/latest/py_tutorials/py_imgproc/py_watershed/py_watershed.html>.
Mzur, Watershed.py, Github, 3 pages. [retrieved on Jun. 8, 2021] Retrieved from the internet <URL: https://github.com/mzur/watershed/blob/master/Watershed.py>.
Thakur et al., A Survey of Image Segmentation Techniques, International Journal of Research in Computer Applications and Robotics, vol. 2, Issue 4, Apr. 2014, p. 158-165.
Long et. al., Fully Convolutional Networks for Semantic Segmentation, IEEE Transactions on Pattern Analysis and Machine Intelligence, vol. 39, Issue 4, Apr. 1, 2017, 12 pages.
Ronneberger et. al., U-net: Convolutional networks for biomedical image segmentation, in International Conference on Medical Image computing and computer assisted intervention, May 18, 2015, 8 pages.
Xie et al., Microscopy cell counting and detection with fully convolutional regression networks, Computer methods in biomechanics and biomedical engineering, Imaging and Visualization, 6(3), pp. 283-292, 2018.
Xie, Y., et. al., Beyond classification: structured regression for robust cell detection using convolutional neural network. International conference on medical image computing and computer assisted intervention, Oct. 2015, 12 pages.
Snuverink, Deep Learning for Pixelwise Classification of Hyperspectral Images, Master of Science Thesis, Delft University of Technology, Nov. 23, 2017, 128 pages.
Shevchenko, Keras weighted categorical_crossentropy, Github, [retrieved on Jun. 12, 2021], Retrieved from the internet <URL: https://gist.github.com/skeeet/cad06d584548fb45eece1d4e28cfa98b>, 2 pages.
Assem, Predicting periodic and chaotic signals using Wavenets, Master of Science thesis, Delft University of Technology, Aug. 18, 2017, pp. 3-38.
Goodfellow et al., Chapter 9—Convolutional Networks, Deep Learning, MIT Press, dated 2016, 41 pages.
Albrecht et. al., Deep learning for single-molecule science, Nanotechnology (28), dated 2017, 423001, 11 pages.
MISEQ: Imaging and Base Calling: Illumina, Inc. Online Training Course, dated Jan. 1, 2013 [retrieved on Jul. 13, 2020], Retrieved from <URL: https://support.illumina.com/training.html>, 13 pages.
MiSEQ: Imaging and Base Calling Script, retrieved on [Jun. 14, 2021], Retrieved from the internet <URL: https://support.illumina.com/content/dam/illumina-support/courses/MiSeq_Imaging_and_Base_Calling/story_content/external_files/MiSeq%20Imaging%20and%20Base%20Calling%20Script.pdf>.
Zhao et. al., Object detection with Deep Learning: A Review, dated Jul. 15, 2018, 22 pages.
Lee et. al., Fast Object Localization Using a CNN Feature Map Based Multi-Scale Search, dated Apr. 12, 2016, 16 pages.
Misiunas et. al., QuipuNet: convolutional neural network for single-molecule nanopore sensing, dated May 30, 2018, 7 pages.
Boza et. al., Deep Recurrent Neural Networks for Base Calling in MinION Nanopore Reads, dated Mar. 30, 2016, 12 pages.
Kao et. al., BayesCall: A model-based base-calling algorithm for high-throughput short-read sequencing, Genome Research (19), pp. 1884-1895, dated 2009.
Rang et. al., From squiggle to basepair: computational approaches for improving nanopore sequencing read accuracy, Genome Biology 2018, (19), 30.
Wang et. al., An adaptive decorrelation method removes Illumina DNA base-calling errors caused by crosstalk between adjacent clusters, Scientific Reports, published Feb. 20, 2017, 11 pages.
Cacho et. al., A comparison of Base Calling Algorithms for Illumina Sequencing Technology, dated Oct. 5, 2015, Briefings in Bioinformatics 2016 (17), 786-795.
Luo et. al., G-softmax: Improving Intra-class Compactness and Inter-class Separability of Features, dated Apr. 8, 2019, 15 pages.
Luo et. al., A multi-task convolutional deep neural network for variant calling in single molecule sequencing, Nature Communications (10), No. 1, dated Mar. 1, 2019.
Kingma et. al., Adam: A method for Stochastic Optimization, ICLR 2015, dated Jul. 23, 2015.
Luo et. al., Skyhawk: An Artificial Neural Network-based discriminator for reviewing clinically significant genomic variants, dated Jan. 28, 2019, 8 pages.
MiSEQ: Imaging and Base Calling: Illumina, Inc. Online Training Course, colored version, [retrieved on Oct. 11, 2020], Retrieved from <URL: https://support.illumina.com/training.html>, 9 pages.
Kircher et. al., Improved base-calling for the Illumina Genome Analyzer using Machine Learning Strategies, Genome Biology, published Aug. 14, 2009, 9 pages.
Smith et. al., Barcoding and demultiplexing Oxford nanopore native RNA sequencing reads with deep residual learning, bioRxiv, dated Dec. 5, 2019, 18 pages.

(56) References Cited

OTHER PUBLICATIONS

Aggarwal, Neural Networks and Deep Learning: A Textbook, Springer, dated Aug. 26, 2018, 512 pages.
Wang et. al., Deep Neural Network Approximation for Custom Hardware: Where We've Been, Where We're Going, Cornell University, dated Jan. 21, 2019, 37 pages.
Lavin et. al., Fast Algorithms for Convolutional Neural Networks, dated Nov. 10, 2015, 9 pages.
Liu et. al., A Uniform Architecture Design for Accelerating 2D and 3D CNNs on FPGAs, published Jan. 7, 2019, 19 pages.
Zeng et. al., Causalcall: Nanopore Basecalling Using a Temporal Convolutional Network, dated Jan. 20, 2020, 11 pages.
Kwon et. al., Understanding Reuse, Performance, and Hardware Cost of DNN Dataflow—A Data-Centric Approach, Proceedings of the 52nd Annual IEEE/ACM International Symposium on Microarchitecture, dated Oct. 12, 2019, 13 pages.
Sze et. al., Efficient Processing of Deep Neural Networks: A Tutorial and Survey, Cornell University Library, dated Mar. 27, 2017, 21 pages.
Wallach et. al., AtomNet: A Deep Convolutional Neural Network for Bioactivity Prediction in Structure-based Drug Discovery, dated Oct. 10, 2015, 11 pages.
Illumina, Two-Channel SBS Sequencing Technology, 2016, 2 pages.
Illumina, Low-diversity sequencing on the Illumina HiSeq Platform, 2014, 2 pages.
Hedegaard, An introduction to "Next Generation" DNA Sequencing, dated Nov. 26, 2017, 63 pages.
Jordan, An overview of semantic image segmentation, dated May 21, 2018, 28 pages retrieved on Jul. 21, 2021. Retrieved from the internet [URL: https://www.jeremyjordan.me/semantic-segmentation/ ].
Lanchantin, Deep Motif Dashboard: Visualizing and Understanding Genomic Sequences Using Deep Neural Networks, Oct. 18, 2016, 11 pages.
Thalles Silva, Deeplab Image Semantic Segmentation Network, dated Jan. 29, 2018, 19 pages, retrieved on Jul. 21, 2021. Retrieved from [URL: https://sthalles.github.io/deep_segmentation_network/ ].
James Le, How to do Semantic Segmentation using Deep Learning, dated May 3, 2018, 17 pages, retrieved on Jul. 21, 2021. Retrieved from [URL: https://medium.com/nanonets/how-to-do-image-segmentation-using-deep-learning-c673cc5862ef].
Townley, Illumina Primary and Secondary Analysis, Illumina UK, 2010, 33 pages.
Silver, Literature Review: Fully Convolutional Networks, dated Jun. 12, 2017, 5 pages, retrieved on Jul. 21, 2021. Retrieved from [URL: https://medium.com/self-driving-cars/literature-review-fully-convolutional-networks-d0a11fe0a7aa ].
Bowen, Nanotechnology for a Genomic Revolution, Illumina, dated Dec. 14, 2016, 40 pages.
Han, Deconvolutions in Convolutional Neural Networks, Postech Computer Vision Lab, 2015, 20 pages.
Illumina, Illumina's Genotyping Data Normalization Methods, 2006, 6 pages.
Illumina, Quality Scores for Next-Generation Sequencing—Assessing sequencing accuracy using Phred quality scoring, 2011, 2 pages.
Restrepo, A Gentle Introduction to Semantic Segmentation—Inputs, Labels and Outputs, 2 pages, retrieved on Jul. 21, 2021. Retrieved from [URL: http://ronny.rest/tutorials/module/seg_01/segmentation_03_inputs_outputs/].
Illumina, An Introduction to Next-Generation Sequencing Technology, 2017, 16 pages.
Belanovic, Library of Parameterized Hardware Modules for Floating-Point Arithmetic with an Example Application, Northeastern University, Boston, MA, May 2002, 83 pages.
Massingham, Base Calling: methods, problems and alternatives, EMBL Advanced Course in Analysis of Short Read Sequencing Data, Jun. 8, 2009-Jun. 10, 2009, 84 pages.
Thoma, A Survey of Semantic Segmentation, dated May 11, 2016, 16 pages.
Rodriguez-Ezpeleta, Bioinformatics for High Throughput Sequencing, Springer, 2012, 266 pages.
Ilumina, Optimizing Cluster Density on Illumina Sequencing Systems, 2016, 12 pages.
Boza et. al., DeepNano: Deep recurrent neural networks for base calling in MinION nanopore reads, PLOS ONE, dated Jun. 5, 2017, 13 pages.
Kircher, Understanding and Improving high-throughput sequencing data production and analysis, Leipzig University, 2011, 216 pages.
Lutteropp, Error-Profile-Aware Correction of Next Generation Sequencing Reads, Karlsruhe Institute of Technology, dated Mar. 31, 2017, 96 pages.
Illumina, HCS 1.4/RTA 1.12 Theory of Operation, 2010, 32 pages.
Cacho, Base-Calling of High-throughput Sequencing Data Using a Random Effects Mixture Model, UC Riverside, Dec. 2016, 102 pages.
Zhou et. al., Incorporating Side-Channel Information into Convolutional Neural Networks for Robotic Tasks, 2017, 7 pages.
Linder, Modeling the intronic regulation of Alternative Splicing using Deep Convolutional Neural Nets, KTH Institute of Technology, dated Jun. 14, 2015, 53 pages.
Bentley et. al., Accurate Whole Human Genome Sequencing using Reversible Terminator Chemistry, Nature, Nov. 2008, 21 pages.
Illumina CMOS Chip and One-Channel SBS Chemistry, Illumina Inc, 2018, 4 pages.
Illumina, Calculating Percent Passing Filter for Patterned and Nonpatterned Flow Cells, 2017, 2 pages.
Fritzilas, An Overview of Illumina's Sequencing Technology and its Applications, University of Primorska, dated Mar. 4, 2011, 47 pages.
Python Implementation of the color map function for the PASCAL VOC data set, Github, 4 pages, retrieved on Jul. 23, 2021. Retrieved from [URL: https://gist.github.com/wllhf/a4533e0adebe57e3ed06d4b50c8419ae ].
Illumina, Quality Score Encoding, 2 pages, retrieved on Jul. 23, 2021. Retrieved from [URL: https://support.illumina.com/help/BaseSpace_OLH_009008/Content/Source/Informatics/BS/QualityScoreEncoding_swBS.htm ].
Illumina, Reducing Whole-Genome Data Storage Footprint, Illumina Whitepaper, 2010-2014, 4 pages.
Badrinarayanan et. al., SegNet: A Deep Convolutional Encoder-Decoder Architecture for Image Segmentation, dated Oct. 10, 2016, 14 pages.
Li et. al., CS231 Lecture 13 Segmentation and Attention, Stanford University, dated Feb. 24, 2016, 133 pages.
Whiteford et. al., Swift: Primary data analysis for the Illumina Solexa sequencing platform, Bioinformatics, vol. 25, No. 17, 2009, pp. 2194-2199, 7 pages.
Schilling, The Effect of Batch Normalization on Deep Convolutional Neural Networks, KTH Royal Institute of Technology, 2016, 113 pages.
Tutorial Image Segmentation, BoofCV, 6 pages, retrieved on Jul. 23, 2021. Retrieved from [URL: https://boofcv.org/index.php?title=Tutorial_Image_Segmentation ].
Illumina, Understanding Illumina Quality Scores, dated Apr. 23, 2014, 2 pages.
Zhang et. al., Estimating Phred scores of Illumina base calls by logistic regression and sparse modeling, Bio Med Central Bioinformatics, 2017, 14 pages.
Renaud et. al., freelbis: an efficient base caller with calibrated quality scores for Illumina sequencers, dated Mar. 6, 2013, 2 pages.
Kircher, Improving data quality of the Illumina Genome Analyzer platform, Max Planck Institute for Evolutionary Anthropology, dated Oct. 24, 2009, 46 pages.
Mitra et. al., Strategies for Achieving High Sequencing Accuracy for Low Diversity Samples and Avoiding Sample Bleeding Using Illumina Platform, PLOS One, published Apr. 10, 2015, 21 pages.
Datta et. al., Statistical Analyses of Next Generation Sequence Data: A Partial Overview, Journal of Proteomics and Bioinformatics, vol. 3, Issue 6, 2010, 8 pages.

(56) References Cited

OTHER PUBLICATIONS

Erlich et. al., Alta-Cyclic: a self-optimizing base-caller for next generation sequencing, Nature Methods, Aug. 2008, 7 pages.
Kao et. al., Algorithms for Next-Generation High-Throughput Sequencing Technologies, University of California, Berkeley, 2011, 106 pages.
Kircher et. al., Addressing challenges in the production and analysis of Illumina sequencing data, published Jul. 29, 2011, retrieved on Jul. 24, 2021, 25 pages. Retrieved from [URL: https://www.ncbi.nlm.nih.gov/pmc/articles/PMC3163567/ ].
Teng et al., Chiron: translating nanopore raw signal directly into nucleotide sequence using deep learning, GigaScience, 7, 2018, 9 pages.
Ratkovic, Deep Learning Model for Base Calling of MinION Nanopore Reads, dated Jun. 2017, 48 pages.
Teng et. al., Chiron: translating nanopore raw signal directly into nucleotide sequence using deep learning, dated Aug. 23, 2017, 10 pages.
Stoiber et. al., BasecRAWller: Streaming Nanopore Basecalling Directly from Raw Signal, dated May 1, 2017, 15 pages.
Li et. al., DeepSimulator: a deep simulator for Nanopore sequencing, Bioinformatics 34(17), 2018, pp. 2899-2908, 10 pages.
Wick et. al., Performance of neural network basecalling tools for Oxford Nanopore sequencing, dated Feb. 7, 2019, 14 pages.
Ledergerber et. al., Base-calling for next-generation sequencing platforms, Briefings in Bioinformatics vol. 12, No. 5, pp. 489-497, dated Jan. 18, 2011, 9 pages.
Sheikh et. al., Chapter 5 Base-Calling for Bioinformaticians, 2012, 17 pages.
Kriseman et. al., BING: Biomedical informatics pipeline for Next Generation Sequencing, Journal of Biomedical Informatics, vol. 43, 2010, pp. 428-434, 7 pages.
Das et. al., Model-based sequential base calling for Illumina sequencing, IEEE, 2010, 4 pages.
Shamaiah et. al., Base calling error rates in next-generation DNA sequencing, IEEE Statistical Signal Processing Workshop, 2012, 4 pages.
Ye et. al., BlindCall: ultra-fast base-calling of high-throughput sequencing data by blind deconvolution, Bioinformatics, vol. 30, No. 9, 2014, pp. 1214-1219, 6 pages.
Wolowski, High-quality, high-throughput measurement of protein-DNA binding using HiTS-FLIP, Ludwig Maxmilian University, 2016, 251 pages.
Bravo et. al., Model-Based Quality Assessment and Base-Calling for Second-Generation Sequencing Data, Biometrics, 2009, 10 pages.
Illumina, RTA Theory of Operation, 2009, 8 pages.
Dash et. al., Artificial Intelligence and Evolutionary Computations in Engineering Systems, Advances in Intelligent Systems and Computing, vol. 1056, Springer 2020, 781 pages.
Ahmed, SIGNET: A Neural Network Architecture for Predicting Protein-Protein Interactions, The University of Western Ontario, dated May 7, 2017, 84 pages.
Deepa J, Development of Fully Automated Image Analysis Method for High Density cDNA and array CGH Microarray based genomic studies, Cochin University of Science and Technology, Mar. 2013, 232 pages.
Zhang et. al., Nanopore basecalling from a perspective of instance segmentation, BMC Bioinformatics, 2020, 9 pages.
Kao et. al., naiveBayesCall: An Efficient Model-Based Base-Calling Algorithm for High-Throughput Sequencing, Journal of Computational Biology, dated Mar. 2011, 16 pages.
Wick et. al., Performance of neural network basecalling tools for Oxford Nanopore sequencing, Genome Biology, 2019, 10 pages.
Baek et. al., LncRNAnet: long non-coding RNA identification using deep learning, Bioinformatics, vol. 34 (22), 2018, pp. 3889-3897, 9 pages.
Evans et. al., Estimating Change-Points in Biological Sequences via the Cross-Entropy Method, dated Sep. 20, 2010, 17 pages.
Shen et. al., ParticleCall: A particle filter for base calling in next-generation sequencing systems, BMC Bioinformatics, 2012, 10 pages.
Peresini et. al., Nanopore Base Calling on the Edge, dated Nov. 9, 2020, 15 pages.
Liang et. al., Bayesian Basecalling for DNA Sequence Analysis Using Hidden Markov Models, IEEE Transactions on Computational Biology and Bioinformatics, vol. 4, No. 3, Jul.-Sep. 2007, 11 pages.
Wang et. al., DeepDNA: a hybrid convolutional and recurrent neural network for compressing human mitochondrial genomes, IEEE International Conference on Bioinformatics and Biomedicine, 2018, 5 pages.
Anonymous, Vanishing Gradient Problem, Wikipedia, dated Jun. 16, 2018, retrieved on Jan. 12, 2020. Retrieved from [URL: https://en.wikipedia.org/w/index.php?title=Vanishing_gradient_problem&oldid=846115335 ].
Eraslan et. al., "Deep Learning: New computational modelling techniques for genomics", dated Jul. 2019, 15 pages.
U.S. Appl. No. 16/825,987, filed Mar. 20, 2020, U.S. Pat. No. 11,347,965, May 31, 2022, Issued.
U.S. Appl. No. 16/825,991, filed Mar. 20, 2020, U.S. Pat. No. 11,210,554, Dec. 28, 2021, Issued.
U.S. Appl. No. 16/826,126, filed Mar. 20, 2020, US-2020-0302297-A1, Sep. 24, 2020, Pending.
U.S. Appl. No. 16/826,134, filed Mar. 20, 2020, US-2020-0327377-A1, Oct. 15, 2020, Pending.
U.S. Appl. No. 16/826,168, filed Mar. 21, 2020, US-2020-030224-A1, Sep. 24, 2020, Allowed.
U.S. Appl. No. 17/529,222, filed Nov. 17, 2021, US-2022-0147760-A1, May 12, 2022, Pending.
U.S. Appl. No. 17/827,612, filed May 27, 2022, Pending.
U.S. Appl. No. 16/874,633, filed May 14, 2020, US-2020-0364565-A1, Nov. 19, 2020, Allowed.
U.S. Appl. No. 17/703,975, filed Mar. 24, 2022, Pending.
U.S. Appl. No. 17/175,546, filed Feb. 12, 2021, US-2021-0265009-A1, Aug. 26, 2021, Pending.
U.S. Appl. No. 17/180,542, filed Feb. 19, 2021, US-2021-0265017-A1, Aug. 26, 2021, Pending.
U.S. Appl. No. 17/176,151, filed Feb. 15, 2021, US-2021-0265018-A1, Aug. 26, 2021, Pending.
U.S. Appl. No. 17/411,980, filed Aug. 25, 2021, US-2022-0067489-A1, Mar. 3, 2022, Pending.
U.S. Appl. No. 17/687,551, filed Mar. 4, 2022, Pending.
U.S. Appl. No. 17/687,583, filed Mar. 4, 2022, Pending.
U.S. Appl. No. 17/176,147, filed Feb. 15, 2021, US-2021-0265015-A1, Aug. 26, 2021, Pending.
U.S. Appl. No. 17/179,395, filed Feb. 18, 2021, US-2021-0265016-A1, Aug. 26, 2021, Pending.
U.S. Appl. No. 17/180,480, filed Feb. 19, 2021, US-2021-0264266-A1, Aug. 26, 2021, Pending.
U.S. Appl. No. 17/180,513, filed Feb. 19, 2021, US-2021-0264267-A1, Aug. 26, 2021, Pending.
U.S. Appl. No. 17/687,586, filed Mar. 4, 2022, Pending.
U.S. Appl. No. 17/232,056, filed Apr. 15, 2021, Pending.
U.S. Appl. No. 17/468,411, filed Sep. 7, 2021, Allowed.
U.S. Appl. No. 17/830,287, filed Jun. 1, 2022, Pending.
U.S. Appl. No. 17/830,316, filed Jun. 1, 2022, Pending.
U.S. Appl. No. 17/839,387, filed Jun. 13, 2022, Pending.
U.S. Appl. No. 17/703,935, filed Mar. 24, 2022, Pending.
U.S. Appl. No. 17/703,958, filed Mar. 24, 2022, Pending.
MacArthur, D. G. et al. Guidelines for investigating causality of sequence variants in human disease. Nature 508, 469-476 (2014).
Rehm, H. L. et al. ClinGen—the Clinical Genome Resource. N. Engl. J. Med. 372, 2235-2242 (2015).
Bamshad, M. J. et al. Exome sequencing as a tool for Mendelian disease gene discovery. Nat. Rev. Genet. 12, 745-755 (2011).
Rehm, H. L. Evolving health care through personal genomics. Nat. Rev. Genet. 18, 259-267 (2017).
Richards, S. et al. Standards and guidelines for the interpretation of sequence variants—a joint consensus recommendation of the American College of Medical Genetics and Genomics and the Association for Molecular Pathology. Genet. Med. 17, 405-424 (2015).

(56) References Cited

OTHER PUBLICATIONS

Lek, M. et al. Analysis of protein-coding genetic variation in 60,706 humans. Nature 536, 285-291 (2016).
Mallick, S. et al. The Simons Genome Diversity Project—300 genomes from 142 diverse populations. Nature 538, 201-206 (2016).
Genomes Project Consortium. et al. A global reference for human genetic variation. Nature 526, 68-74 (2015).
Liu, X., Jian, X. & Boerwinkle, E. dbNSFP—a lightweight database of human nonsynonymous SNPs and their functional predictions. Human. Mutat. 32, 894-899 (2011).
Chimpanzee Sequencing Analysis Consortium. Initial sequence of the chimpanzee genome and comparison with the human genome. Nature 437, 69-87 (2005).
Takahata, N. Allelic genealogy and human evolution. Mol. Biol. Evol. 10, 2-22 (1993).
Asthana, S., Schmidt, S., & Sunyaev, S. A limited role for balancing selection. Trends Genet. 21, 30-32 (2005).
Leffler, E. M. et al. Multiple instances of ancient balancing selection shared between humans and chimpanzees. Science 339, 12 pages (2013).
Samocha, K. E. et al. A framework for the interpretation of de novo mutation in human disease. Nat. Genet. 46, 944-950 (2014).
Ohta, T. Slightly deleterious mutant substitutions in evolution. Nature 246, 96-98 (1973).
Reich, D. E. & Lander, E. S. On the allelic spectrum of human disease. Trends Genet. 17, 502-510 (2001).
Whiffin, N. et al. Using high-resolution variant frequencies to empower clinical genome interpretation. Genet. Med. 19, 1151-1158(2017).
Prado-Martinez, J. et al. Great ape genome diversity and population history. Nature 499, 471-475 (2013).
Klein, J., Satta, Y., O'HUigin, C., & Takahata, N. The molecular descent of the major histocompatibility complex. Annu. Rev. Immunol. 11, 269-295 (1993).
De Manuel, M. et al. Chimpanzee genomic diversity reveals ancient admixture with bonobos. Science 354, 477-481 (2016).
Locke, D. P. et al. Comparative and demographic analysis of orang-utan genomes. Nature 469, 529-533 (2011).
Rhesus Macaque Genome Sequencing Analysis Consortium. Evolutionary and biomedical insights from the rhesus macaque genome. Science 316, 222-234 (2007).
Worley, K. C. et al. The common marmoset genome provides insight into primate biology and evolution. Nat. Genet. 46, 850-857 (2014).
Schrago, C. G., & Russo, C. A. Timing the origin of New World monkeys. Mol. Biol. Evol. 20, 1620-1625 (2003).
Landrum, M. J. et al. ClinVar—public archive of interpretations of clinically relevant variants. Nucleic Acids Res. 44, D862-868 (2016).
Brandon, E. P., Idzerda, R. L. & McKnight, G. S. Targeting the mouse genome—a compendium of knockouts (Part II). Curr. Biol. 5, 758-765 (1995).
Lieschke, J. G. & Currie, P. D. Animal models of human disease—zebrafish swim into view. Nat. Rev. Genet. 8, 353-367 (2007).
Sittig, L. J. et al. Genetic background limits generalizability of genotype-phenotype relationships. Neuron 91, 1253-1259 (2016).
Bazykin, G. A. et al. Extensive parallelism in protein evolution. Biol. Direct 2, 20, 13 pages (2007).
Ng, P. C., & Henikoff, S. Predicting deleterious amino acid substitutions. Genome Res. 11, 863-874 (2001).
Adzhubei, I. A. et al. A method and server for predicting damaging missense mutations. Nat. Methods 7, 248-249 (2010).
Chun, S. & Fay, J. C. Identification of deleterious mutations within three human genomes. Genome Res. 19, 1553-1561 (2009).
Reva, B., Antipin, Y., & Sander, C. Predicting the functional impact of protein mutations—application to cancer genomics. Nucleic Acids Res. 39, e118 (2011), 14pgs.
Dong, C. et al. Comparison and integration of deleteriousness prediction methods for nonsynonymous SNVs in whole exome sequencing studies. Hum. Mol. Genet. 24, 2125-2137 (2015).
Carter, H., Douville, C., Stenson, P. D., Cooper, D. N., & Karchin, R. Identifying Mendelian disease genes with the variant effect scoring tool. BMC Genom, (2013), 13 pages.
Choi, Y., Sims, G. E., Murphy, S., Miller, J. R., & Chan, A. P. Predicting the functional effect of amino acid substitutions and indels. PLoS One 7, e46688 (2012).
Gulko, B., Hubisz, M. J., Gronau, I., & Siepel, A. A method for calculating probabilities of fitness consequences for point mutations across the human genome. Nat. Genet. 47, 276-283 (2015).
Shihab, H. A. et al. An integrative approach to predicting the functional effects of non-coding and coding sequence variation. Bioinformatics 31, 1536-1543 (2015).
Smedley, D. et al. A whole-genome analysis framework for effective identification of pathogenic regulatory variants in mendelian disease. Am. J. Hum. Genet. 99, 595-606 (2016).
Jagadeesh, K. A. et al. M-CAP eliminates a majority of variants of uncertain significance in clinical exomes at high sensitivity. Nat. Genet. 48, 1581-1586 (2016).
Grimm, D. G. The evaluation of tools used to predict the impact of missense variants is hindered by two types of circularity. Human. Mutat. 36, 513-523 (2015).
Wang, S., Peng, J., Ma, J. & Xu, J. Protein secondary structure prediction using deep convolutional neural fields. Sci. Rep. 6, 18962-18962 (2016).
Payandeh, J., Scheuer, T., Zheng, N. & Catterall, W. A. The crystal structure of a voltage-gated sodium channel. Nature 475, 353-358 (2011).
Shen, H. et al. Structure of a eukaryotic voltage-gated sodium channel at near-atomic resolution. Science 355, eaal4326 (2017), 19 pages.
Nakamura, K. et al. Clinical spectrum of SCN2A mutations expanding to Ohtahara syndrome. Neurology 81, 992-998 (2013).
Henikoff, S. & Henikoff, J. G. Amino acid substitution matrices from protein blocks. Proc. Natl. Acad. Sci. USA 89, 10915-10919 (1992).
Li, W. H., Wu, C. I. & Luo, C. C. Nonrandomness of point mutation as reflected in nucleotide substitutions in pseudogenes and its evolutionary implications. J. Molec. Evol. 21, 58-71 (1984).
Grantham, R. Amino acid difference formula to help explain protein evolution. Science 185, 862-864 (1974).
Vissers, L. E., Gilissen, C., & Veltman, J. A. Genetic studies in intellectual disability and related disorders. Nat. Rev. Genet. 17, 9-18 (2016).
Neale, B. M. et al. Patterns and rates of exonic de novo mutations in autism spectrum disorders. Nature 485, 242-245 (2012).

\* cited by examiner

FIG. 23

12-Plex

| | 1 | 2 | 3 | 4 | 5 | 6 | 7 | 8 | 9 | 10 | 11 | 12 |
|---|---|---|---|---|---|---|---|---|---|---|---|---|
| A | H701 H505 | H702 H506 | H703 H517 | H705 H505 | H707 H506 | H723 H517 | H706 H505 | H712 H506 | H720 H517 | H710 H505 | H711 H506 | H714 H517 |
| B | H702 H517 | H703 H505 | H701 H506 | H707 H517 | H723 H506 | H705 H506 | H712 H517 | H720 H505 | H706 H506 | H711 H517 | H714 H505 | H710 H506 |
| C | H703 H506 | H701 H517 | H702 H503 | H723 H517 | H705 H517 | H707 H505 | H720 H506 | H706 H517 | H712 H505 | H714 H506 | H710 H517 | H711 H505 |
| D | H705 H503 | H707 H503 | H723 H503 | H706 H503 | H712 H503 | H720 H503 | H710 H503 | H711 H503 | H714 H503 | H701 H503 | H702 H503 | H703 H503 |
| E | H706 H516 | H712 H516 | H720 H516 | H710 H516 | H711 H516 | H714 H516 | H701 H516 | H702 H516 | H703 H516 | H705 H516 | H707 H516 | H723 H516 |
| F | H710 H522 | H711 H510 | H714 H513 | H701 H522 | H702 H510 | H703 H513 | H705 H522 | H707 H510 | H723 H513 | H706 H522 | H712 H510 | H720 H513 |
| G | H711 H513 | H714 H522 | H710 H510 | H702 H513 | H701 H513 | H702 H510 | H723 H522 | H705 H510 | H707 H522 | H712 H513 | H720 H522 | H706 H510 |
| H | H714 H510 | H710 H513 | H711 H522 | H703 H510 | — | — | — | — | — | — | — | — |

8-rxn

96 Indexes

Changes in Index Base Calling: Different Training Strategy

Before Method

**Augmented *Unnormalized* Model**

- Showed model performance is comparable to RTA.
- Does not need training with index cycles.
- However, 5c model in ushort would have trouble fitting in memory.
- Move to 3c model - very little performance degradation, but not better than RTA.

New Method

**Joint Trained *Normalized* Model**

- Improved performance than augmented models.
- *Requires training with index cycles and specialized training to prevent memorization of index cycles\*.*
- Similar normalization as sequencing cycles (ease of implementation).
- 5c model can fit in memory.
- Method of training applicable for low diversity sequences in general – not just index cycles.

FIG. 24

Joint Training with Index Cycles

☐ Different training tricks to prevent memorization of the order of cycles.

a. Shuffle order of input 5 cycles
b. Load all 8/10 cycles of index cycles - permute at random allowing repetition and select 5 cycles.
c. Freeze temporal layers of a model trained on "sequencing cycles", and retrain with sequencing cycles and index cycles ☐ All methods improved performance over augmentation. Will use (c) going forward: best results and ease of training. Inference results presented for (a).

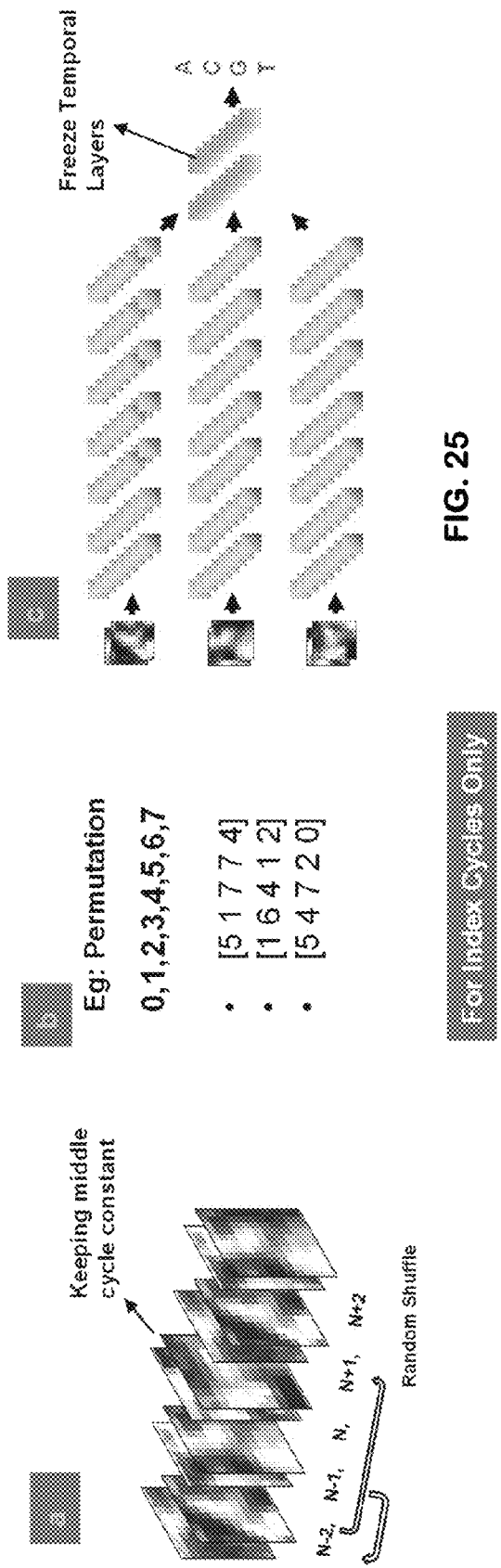

FIG. 25

EFFICIENT ARTIFICIAL INTELLIGENCE-BASED BASE CALLING OF INDEX SEQUENCES

PRIORITY APPLICATION

This application claims the benefit of U.S. Provisional Patent Application No. 63/217,644, titled, "EFFICIENT ARTIFICIAL INTELLIGENCE-BASED BASE CALLING OF INDEX SEQUENCES," filed Jul. 1, 2021. The provisional application is hereby incorporated by reference for all purposes.

FIELD OF THE TECHNOLOGY DISCLOSED

The technology disclosed relates to artificial intelligence type computers and digital data processing systems and corresponding data processing methods and products for emulation of intelligence (i.e., knowledge-based systems, reasoning systems, and knowledge acquisition systems); and including systems for reasoning with uncertainty (e.g., fuzzy logic systems), adaptive systems, machine learning systems, and artificial neural networks. In particular, the technology disclosed relates to using deep neural networks such as deep convolutional neural networks for analyzing data.

INCORPORATIONS BY REFERENCE

The following are hereby incorporated by reference as if fully set forth herein:

- U.S. Patent Application No. 62/979,384, titled "ARTIFICIAL INTELLIGENCE-BASED BASE CALLING OF INDEX SEQUENCES," filed 20 Feb. 2020;
- U.S. Patent Application No. 62/979,414, titled "ARTIFICIAL INTELLIGENCE-BASED MANY-TO-MANY BASE CALLING," filed 20 Feb. 2020;
- U.S. Patent Application No. 62/979,385, titled "KNOWLEDGE DISTILLATION-BASED COMPRESSION OF ARTIFICIAL INTELLIGENCE-BASED BASE CALLER," filed 20 Feb. 2020;
- U.S. Patent Application No. 63/072,032, titled "DETECTING AND FILTERING CLUSTERS BASED ON ARTIFICIAL INTELLIGENCE-PREDICTED BASE CALLS," filed 28 Aug. 2020;
- U.S. Patent Application No. 62/979,412, titled "MULTI-CYCLE CLUSTER BASED REAL TIME ANALYSIS SYSTEM," filed 20 Feb. 2020;
- U.S. patent application Ser. No. 16/825,987, titled "TRAINING DATA GENERATION FOR ARTIFICIAL INTELLIGENCE-BASED SEQUENCING," filed 20 Mar. 2020;
- U.S. patent application Ser. No. 16/825,991 titled "ARTIFICIAL INTELLIGENCE-BASED GENERATION OF SEQUENCING METADATA," filed 20 Mar. 2020;
- U.S. patent application Ser. No. 16/826,126, titled "ARTIFICIAL INTELLIGENCE-BASED BASE CALLING," filed 20 Mar. 2020;
- U.S. patent application Ser. No. 16/826,134, titled "ARTIFICIAL INTELLIGENCE-BASED QUALITY SCORING," filed 20 Mar. 2020;
- U.S. patent application Ser. No. 16/826,168, titled "ARTIFICIAL INTELLIGENCE-BASED SEQUENCING," filed 21 Mar. 2020; and
- U.S. patent application Ser. No. 17/179,395, titled "DATA COMPRESSION FOR ARTIFICIAL INTELLIGENCE-BASED BASE CALLING," filed 18 Feb. 2021.

BACKGROUND

The subject matter discussed in this section cannot and should not be assumed to be prior art merely as a result of its mention in this section because, among other things, it may represent different approaches, which in and of themselves, may also correspond to implementations of the claimed technology. Similarly, a problem mentioned, or identified, in this section or associated with the subject matter provided as background, cannot and should not be assumed to have been previously recognized in the prior art as, among other things, it may also be part of the solution proposed.

Improvements in next-generation sequencing (NGS) technology have greatly increased sequencing speed and data output, resulting in relatively massive sample throughput of current sequencing platforms. Approximately ten years ago, the Illumina Genome Analyzer™ was capable of generating up to one gigabyte of sequence data per run. Today, the Illumina NovaSeg™ series are capable of generating up to two terabytes of data in two days, representing a greater than 2000× increase in capacity.

One aspect of realizing this increased capacity is multiplexing, which adds unique sequences, called indexes, to each DNA fragment during library preparation. This allows large numbers of libraries to be pooled and sequenced simultaneously during a single sequencing run. Gains in throughput from multiplexing come with an added layer of complexity, as sequencing reads from pooled libraries need to be identified and sorted computationally in a process called demultiplexing before final data analysis. Index misassignment between multiplexed libraries is a known issue that has impacted NGS technologies from the time sample multiplexing was developed.

An opportunity arises to use artificial intelligence and neural networks to base call index sequences. Higher base calling throughput and increased base calling accuracy may result.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The color drawings also may be available in PAIR via the Supplemental Content tab. In the drawings, like reference characters generally refer to like parts throughout the different views. Also, the drawings are not necessarily to scale, with an emphasis instead generally being placed upon illustrating the principles of the technology disclosed. In the following description, various implementations of the technology disclosed are described with reference to the following drawings, in which:

FIG. 23 depicts an example of 96 indexes.

FIGS. 24 and 25 show various implementations of the technology disclosed.

DETAILED DESCRIPTION

The following discussion is presented to enable any person skilled in the art to make and use the technology disclosed and is provided in the context of a particular application and its requirements. Various modifications to the disclosed implementations will be readily apparent to those skilled in the art, and the general principles defined herein may be applied to other implementations and applications without departing from the spirit and scope of the technology disclosed. Thus, the technology disclosed is not intended to be limited to the implementations shown but is to be accorded the widest scope consistent with the principles and features disclosed herein.

Multiplexing

Figure 1:
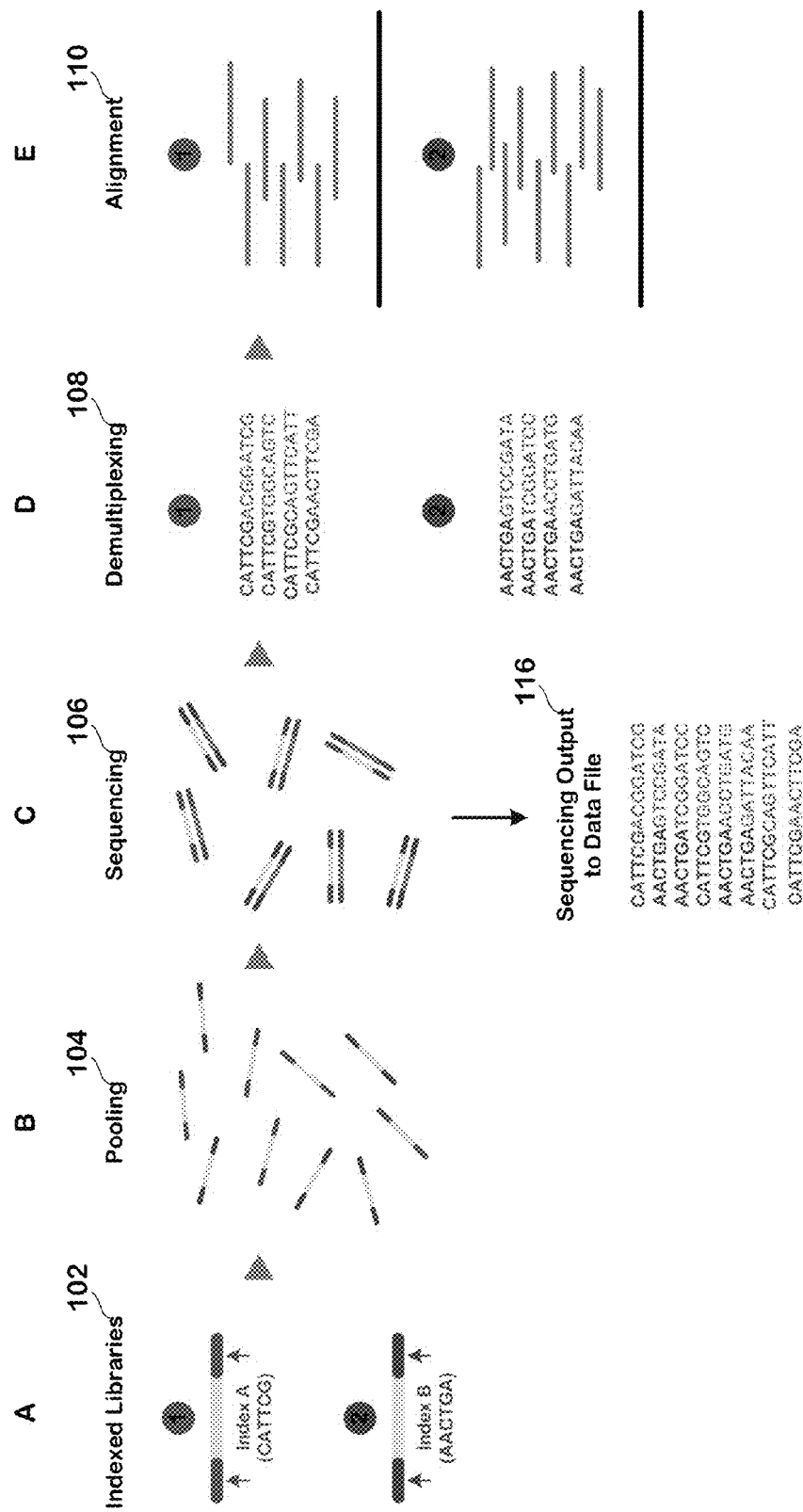
FIG. 1 shows one implementation of the sequencing of polynucleotides from indexed libraries.

FIG. 1 shows one implementation of the sequencing of polynucleotides from indexed libraries. When polynucleotides from different libraries are pooled or multiplexed for sequencing, the polynucleotides from each library are modified to include a library-specific index sequence. During sequencing, the index sequences are sequenced along with target polynucleotide sequences from the libraries. An index sequence is associated with a target polynucleotide sequence so that the library from which the target sequence originated can be identified.

Panel A shows indexed libraries 102. Here, unique index sequences ("indexes") are added to two different libraries during library preparation. The first index sequence (Index A) has a barcode of "CATTCG." The second index sequence (Index B) has a barcode of "AACTGA."

Panel B shows pooling 104. Here, the indexed libraries 102 are pooled together and loaded into the same flow cell lane.

Panel C shows sequencing 106 and the sequencing output 116. Here, the indexed libraries 102 are sequenced together during a single instrument run. All sequences are then exported to an output file 116. The output file 116 comprises sequence reads (in green) coupled to corresponding index reads (in blue and magenta).

Panel D shows demultiplexing 108. Here, a demultiplexing algorithm sorts the sequence reads into different files according to their indexes.

Panel E shows alignment 110. Here, each set of the demultiplexed sequence reads is aligned to the appropriate reference sequence.

Additional details about multiplexing, index sequences, and demultiplexing can be found in Illumina, "Indexed Sequencing Overview Guide," Document No. 15057455, v. 5, March 2019 and in Illumina's patent application publications US 2018/0305751, US 2018/0334712, US 2016/0110498, US 2018/0334711, and WO 2019/090251, each of which is incorporated herein by reference.

Target Sequences and Index Sequences

Figure 2:
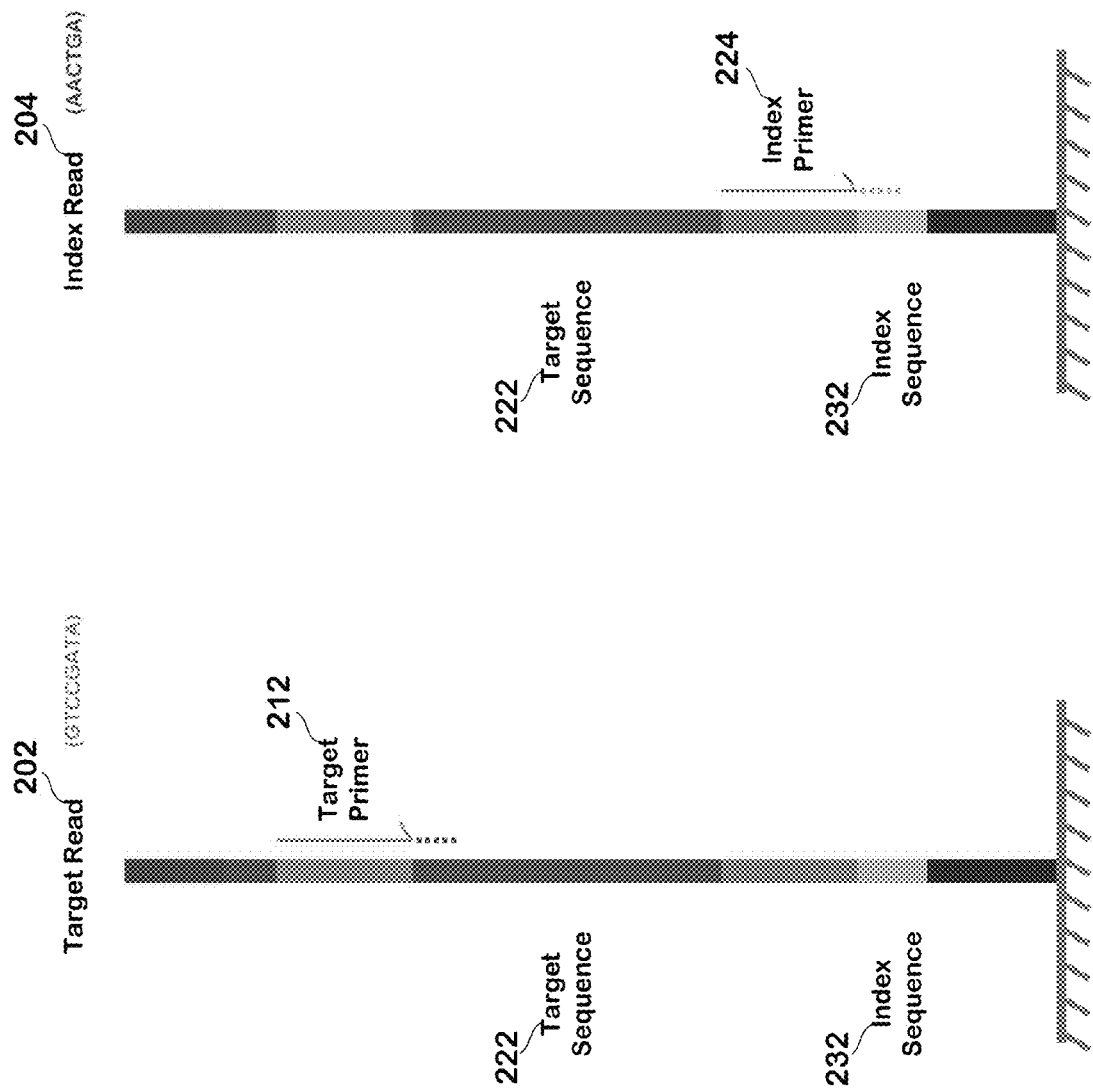
FIG. 2 shows one implementation of sequencing a target sequence to generate a target read and sequencing an index sequence to generate an index read.

FIG. 2 shows one implementation of sequencing a target sequence 222 to generate a target read 202 ("GTCCGATA") and sequencing an index sequence 232 to generate an index read 204 ("AACTGA"). The index sequence 232 can be a synthetic sequence of nucleotides that is coupled to the target sequence 222 during the template preparation step. The target sequence 222 can be naturally occurring DNA, RNA, or some other biological molecule. The length of the index sequence 232 can range from two to twenty nucleotides. For example, the index sequence 232 can be one to ten nucleotides long or four to six nucleotides long. A four-nucleotide index sequence gives the possibility of multiplexing 256 samples on the same array. A six-nucleotide index sequence enables 4096 samples to be processed on the same array.

During the sequencing 106, a target primer 212 traverses the target sequence 222 and produces the target read 202 ("GTCCGATA") and an index primer 224 traverses the index sequence 232 and produces the index read 204 ("AACTGA"). In some implementations, the sequencing 106 is Illumina's single-indexed sequencing. In other implementations, the sequencing 106 is Illumina's dual-indexed sequencing.

Base calling is the process of determining the nucleotide composition of the target sequence 222 and the index sequence 232, i.e., the process of generating the target read 202 ("GTCCGATA") and the index read 204 ("AACTGA").

Sequencing Images

Base calling involves analyzing image data, i.e., sequencing images, produced during a sequencing run (or sequencing reaction) carried out by a sequencing instrument such as Illumina's iSeq, HiSeqX, HiSeq 3000, Hi Seq 4000, HiSeq 2500, NovaSeq 6000, NextSeq 550, NextSeq 1000, NextSeq 2000, NextSeqDx, MiSeq, and MiSeqDx.

The following discussion outlines how the sequencing images are generated and what they depict, in accordance with one implementation.

Base calling decodes the intensity data encoded in the sequencing images into nucleotide sequences. In one implementation, the Illumina sequencing platforms employ cyclic reversible termination (CRT) chemistry for base calling. The process relies on growing nascent strands complementary to template strands with fluorescently-labeled nucleotides, while tracking the emitted signal of each newly added nucleotide. The fluorescently-labeled nucleotides each have a 3' removable block that anchors a fluorophore signal of the nucleotide type.

Sequencing occurs in repetitive cycles, each comprising three steps: (a) extension of a nascent strand by adding the fluorescently-labeled nucleotide; (b) excitation of the fluorophore using one or more lasers of an optical system of the sequencing instrument and imaging through different filters of the optical system, yielding the sequencing images; and (c) cleavage of the fluorophore and removal of the 3' block in preparation for the next sequencing cycle. Incorporation and imaging cycles are repeated up to a designated number of sequencing cycles, defining the read length. Using this approach, each cycle interrogates a new position along the template strands.

The tremendous power of the Illumina sequencers stems from their ability to simultaneously execute and sense millions or even billions of clusters (also called "analytes") undergoing CRT reactions. A cluster comprises approximately one thousand identical copies of a template strand, though clusters vary in size and shape. The clusters are grown from the template strand, prior to the sequencing run, by bridge amplification or exclusion amplification of the input library. The purpose of the amplification and cluster growth is to increase the intensity of the emitted signal since the imaging device cannot reliably sense the fluorophore signal of a single strand. However, the physical distance of the strands within a cluster is small, so the imaging device perceives the cluster of strands as a single spot.

Sequencing occurs in a flow cell (or biosensor)—a small glass slide that holds the input strands. The flow cell is connected to the optical system, which comprises microscopic imaging, excitation lasers, and fluorescence filters. The flow cell comprises multiple chambers called lanes. The lanes are physically separated from each other and may contain different tagged sequencing libraries, distinguishable without sample cross contamination. In some implementations, the flow cell comprises a patterned surface. A "patterned surface" refers to an arrangement of different regions in or on an exposed layer of a solid support.

The imaging device of the sequencing instrument (e.g., a solid-state imager such as a charge-coupled device (CCD) or a complementary metal-oxide-semiconductor (CMOS) sensor) takes snapshots at multiple locations along the lanes in a series of non-overlapping regions called tiles. For example, there can be sixty-four or ninety-six tiles per lane. A tile holds hundreds of thousands to millions of clusters.

The output of the sequencing run is the sequencing images. Sequencing images depict intensity emissions of the clusters and their surrounding background using a grid (or array) of pixelated units (e.g., pixels, superpixels, subpixels). The intensity emissions are stored as intensity values of the pixelated units. The sequencing images have dimensions w×h of the grid of pixelated units, where w (width) and h (height) are any numbers ranging from 1 to 100,000 (e.g., 115×115, 200×200, 1800×2000, 2200×25000, 2800×3600, 4000×400). In some implementations, w and h are the same. In other implementations, w and h are different.

Those sequencing cycles of the sequencing run that sequence the target sequence 222 are called "target sequencing cycles" and those sequencing cycles of the sequencing run that sequence the index sequence 232 are called "index sequencing cycles." The sequencing images generated during the target sequencing cycles are called "target images" and the sequencing images generated during the index sequencing cycles are called "index images."

Neural Network-Based Base Calling

The following discussion focuses on a neural network-based base caller 300 described herein. First, the input to the neural network-based base caller 300 is described, in accordance with one implementation. Then, examples of the structure and form of the neural network-based base caller 300 are provided. Finally, the output of the neural network-based base caller 300 is described, in accordance with one implementation.

A data flow logic provides the sequencing images to the neural network-based base caller 300 for base calling. The neural network-based base caller 300 accesses the sequencing images on a patch-by-patch basis (or a tile-by-tile basis). Each of the patches is a sub-grid (or sub-array) of pixelated units in the grid of pixelated units that forms the sequencing images. The patches have dimensions q×r of the sub-grid of pixelated units, where q (width) and r (height) are any numbers ranging from 1 to 10000 (e.g., 3×3, 5×5, 7×7, 10×10, 15×15, 25×25, 64×64, 78×78, 115×115). In some implementations, q and r are the same. In other implementations, q and r are different. In some implementations, the patches extracted from a sequencing image are of the same size. In other implementations, the patches are of different sizes. In some implementations, the patches can have overlapping pixelated units (e.g., on the edges).

Sequencing produces m sequencing images per sequencing cycle for a corresponding m image channels. That is, each of the sequencing images has one or more image (or intensity) channels (analogous to the red, green, blue (RGB) channels of a color image). In one implementation, each image channel corresponds to one of a plurality of filter wavelength bands. In another implementation, each image channel corresponds to one of a plurality of imaging events in a sequencing cycle. In yet another implementation, each image channel corresponds to a combination of illumination with a specific laser and imaging through a specific optical filter. The image patches are tiled (or accessed) from each of the m image channels for a particular sequencing cycle. In different implementations such as 4-, 2-, and 1-channel chemistries, m is 4 or 2. In other implementations, m is 1, 3, or greater than 4.

Consider, for example, that a sequencing run is implemented using two different image channels: a blue channel and a green channel. Then, at each sequencing cycle, the sequencing run produces a blue image and a green image. This way, for a series of k sequencing cycles of the sequencing run, a sequence of k pairs of blue and green images is produced as output and stored as the sequencing images. Accordingly, a sequence of k pairs of blue and green image patches is generated for the patch-level processing by the neural network-based base caller 300.

The input image data to the neural network-based base caller 300 for a single iteration of base calling (or a single instance of forward pass or a single forward traversal) comprises data for a sliding window of multiple sequencing cycles. The sliding window can include, for example, a current sequencing cycle, one or more preceding sequencing cycles, and one or more successive sequencing cycles.

In one implementation, the input image data comprises data for three sequencing cycles, such that data for a current (time t) sequencing cycle to be base called is accompanied with (i) data for a left-flanking/context/previous/preceding/prior (time t−1) sequencing cycle and (ii) data for a right-flanking/context/next/successive/subsequent (time t+1) sequencing cycle.

In another implementation, the input image data comprises data for five sequencing cycles, such that data for a current (time t) sequencing cycle to be base called is accompanied with (i) data for a first left-flanking/context/previous/preceding/prior (time t−1) sequencing cycle, (ii) data for a second left-flanking/context/previous/preceding/prior (time t−2) sequencing cycle, (iii) data for a first right-flanking/context/next/successive/subsequent (time t+1) sequencing cycle, and (iv) data for a second right-flanking/context/next/successive/subsequent (time t+2) sequencing cycle.

In yet another implementation, the input image data comprises data for seven sequencing cycles, such that data for a current (time t) sequencing cycle to be base called is accompanied with (i) data for a first left-flanking/context/previous/preceding/prior (time t−1) sequencing cycle, (ii) data for a second left-flanking/context/previous/preceding/prior (time t−2) sequencing cycle, (iii) data for a third left-flanking/context/previous/preceding/prior (time t−3) sequencing cycle, (iv) data for a first right-flanking/context/next/successive/subsequent (time t+1) sequencing cycle, (v) data for a second right-flanking/context/next/successive/subsequent (time t+2) sequencing cycle, and (vi) data for a third right-flanking/context/next/successive/subsequent (time t+3) sequencing cycle. In other implementations, the input image data comprises data for a single sequencing cycle. In yet other implementations, the input image data comprises data for 10, 15, 20, 30, 58, 75, 92, 130, 168, 175, 209, 225, 230, 275, 318, 325, 330, 525, or 625 sequencing cycles.

The neural network-based base caller 300 processes the image patches through its convolution layers and produces an alternative representation, according to one implementation. The alternative representation is then used by an output layer (e.g., a softmax layer) to generate a base call for either just the current (time t) sequencing cycle or each of the sequencing cycles, i.e., the current (time t) sequencing cycle, the first and second preceding (time t−1, time t−2) sequencing cycles, and the first and second succeeding (time t+1, time t+2) sequencing cycles. The resulting base calls form the sequencing reads.

In one implementation, the neural network-based base caller 300 outputs a base call for a single target cluster for a particular sequencing cycle. In another implementation, the neural network-based base caller 300 outputs a base call for each target cluster in a plurality of target clusters for the particular sequencing cycle. In yet another implementation, the neural network-based base caller 300 outputs a base call for each target cluster in a plurality of target clusters for each sequencing cycle in a plurality of sequencing cycles, thereby producing a base call sequence for each target cluster.

In one implementation, the neural network-based base caller 300 is a multilayer perceptron (MLP). In another implementation, the neural network-based base caller 300 is a feedforward neural network. In yet another implementation, the neural network-based base caller 300 is a fully-connected neural network. In a further implementation, the neural network-based base caller 300 is a fully convolutional neural network. In yet further implementation, the neural network-based base caller 300 is a semantic segmentation neural network. In yet another further implementation, the neural network-based base caller 300 is a generative adversarial network (GAN).

In one implementation, the neural network-based base caller 300 is a convolutional neural network (CNN) with a plurality of convolution layers. In another implementation, the neural network-based base caller 300 is a recurrent neural network (RNN) such as a long short-term memory network (LSTM), bi-directional LSTM (Bi-LSTM), or a gated recurrent unit (GRU). In yet another implementation, the neural network-based base caller 300 includes both a CNN and an RNN.

In yet other implementations, the neural network-based base caller 300 can use 1D convolutions, 2D convolutions, 3D convolutions, 4D convolutions, 5D convolutions, dilated or atrous convolutions, transpose convolutions, depthwise separable convolutions, pointwise convolutions, 1×1 convolutions, group convolutions, flattened convolutions, spatial and cross-channel convolutions, shuffled grouped convolutions, spatial separable convolutions, and deconvolutions. The neural network-based base caller 300 can use one or more loss functions such as logistic regression/log loss, multi-class cross-entropy/softmax loss, binary cross-entropy loss, mean-squared error loss, L1 loss, L2 loss, smooth L1 loss, and Huber loss. The neural network-based base caller 300 can use any parallelism, efficiency, and compression schemes such TFRecords, compressed encoding (e.g., PNG), sharding, parallel calls for map transformation, batching, prefetching, model parallelism, data parallelism, and synchronous/asynchronous stochastic gradient descent (SGD). The neural network-based base caller 300 can include upsampling layers, downsampling layers, recurrent connections, gates and gated memory units (like an LSTM or GRU), residual blocks, residual connections, highway connections, skip connections, peephole connections, activation functions (e.g., non-linear transformation functions like rectifying linear unit (ReLU), leaky ReLU, exponential liner unit (ELU), sigmoid and hyperbolic tangent (tanh)), batch normalization layers, regularization layers, dropout, pooling layers (e.g., max or average pooling), global average pooling layers, and attention mechanisms.

The neural network-based base caller 300 is trained using backpropagation-based gradient update techniques. Example gradient descent techniques that can be used for training the neural network-based base caller 300 include stochastic gradient descent, batch gradient descent, and mini-batch gradient descent. Some examples of gradient descent optimization algorithms that can be used to train the neural network-based base caller 300 are Momentum, Nesterov accelerated gradient, Adagrad, Adadelta, RMSprop, Adam, AdaMax, Nadam, and AMSGrad.

In one implementation, the neural network-based base caller 300 uses a specialized architecture to segregate the processing of data for different sequencing cycles. The motivation for using the specialized architecture is described first. As discussed above, the neural network-based base caller 300 processes image patches for a current sequencing cycle, one or more preceding sequencing cycles, and one or more successive sequencing cycles. Data for additional sequencing cycles provide sequence-specific context. The neural network-based base caller 300 learns the sequence-specific context during training and base calls the sequencing cycles. Furthermore, data for pre and post sequencing cycles provide second order contribution of pre-phasing and phasing signals to the current sequencing cycle.

However, images captured at different sequencing cycles and in different image channels are misaligned and have residual registration error with respect to each other. To account for this misalignment, the specialized architecture comprises spatial convolution layers that do not mix information between sequencing cycles and only mix information within a sequencing cycle.

Spatial convolution layers (or spatial logic) use so-called "segregated convolutions" that operationalize the segregation by independently processing data for each of a plurality of sequencing cycles through a "dedicated, non-shared" sequence of convolutions. The segregated convolutions convolve over data and resulting feature maps of only a given sequencing cycle, i.e., intra-cycle, without convolving over data and resulting feature maps of any other sequencing cycle.

Consider, for example, that the input image data comprises (i) the current image patch for a current (time t) sequencing cycle to be base called, (ii) the previous image patch for a previous (time t−1) sequencing cycle, and (iii) the next image patch for a next (time t+1) sequencing cycle. The specialized architecture then initiates three separate convolution pipelines, namely, a current convolution pipeline, a previous convolution pipeline, and a next convolution pipeline. The current data processing pipeline receives as input the current image patch for the current (time t) sequencing cycle and independently processes it through a plurality of spatial convolution layers to produce a so-called "current spatially convolved representation" as the output of a final spatial convolution layer. The previous convolution pipeline receives as input the previous image patch for the previous (time t−1) sequencing cycle and independently processes it through the plurality of spatial convolution layers to produce a so-called "previous spatially convolved representation" as the output of the final spatial convolution layer. The next convolution pipeline receives as input the next image patch for the next (time t+1) sequencing cycle and independently processes it through the plurality of spatial convolution layers to produce a so-called "next spatially convolved representation" as the output of the final spatial convolution layer.

In some implementations, the current, previous, and next convolution pipelines are executed in parallel. In some implementations, the spatial convolution layers are part of a spatial convolution network (or subnetwork) within the specialized architecture.

The neural network-based base caller 300 further comprises temporal convolution layers (or temporal logic) that mix information between sequencing cycles, i.e., inter-cycles. The temporal convolution layers receive their inputs from the spatial convolution network and operate on the spatially convolved representations produced by the final spatial convolution layer for the respective data processing pipelines.

The inter-cycle operability freedom of the temporal convolution layers emanates from the fact that the misalignment property, which exists in the image data fed as input to the spatial convolution network, is purged out from the spatially convolved representations by the stack, or cascade, of segregated convolutions performed by the sequence of spatial convolution layers.

Temporal convolution layers use so-called "combinatory convolutions" that groupwise convolve over input channels in successive inputs on a sliding window basis. In one implementation, the successive inputs are successive outputs produced by a previous spatial convolution layer or a previous temporal convolution layer.

In some implementations, the temporal convolution layers are part of a temporal convolution network (or subnetwork) within the specialized architecture. The temporal convolution network receives its inputs from the spatial convolution network. In one implementation, a first temporal convolution layer of the temporal convolution network groupwise combines the spatially convolved representations between the sequencing cycles. In another implementation, subsequent temporal convolution layers of the temporal convolution network combine successive outputs of previous temporal convolution layers. The output of the final temporal convolution layer is fed to an output layer that produces an output. The output is used to base call one or more clusters at one or more sequencing cycles.

Figure 3:
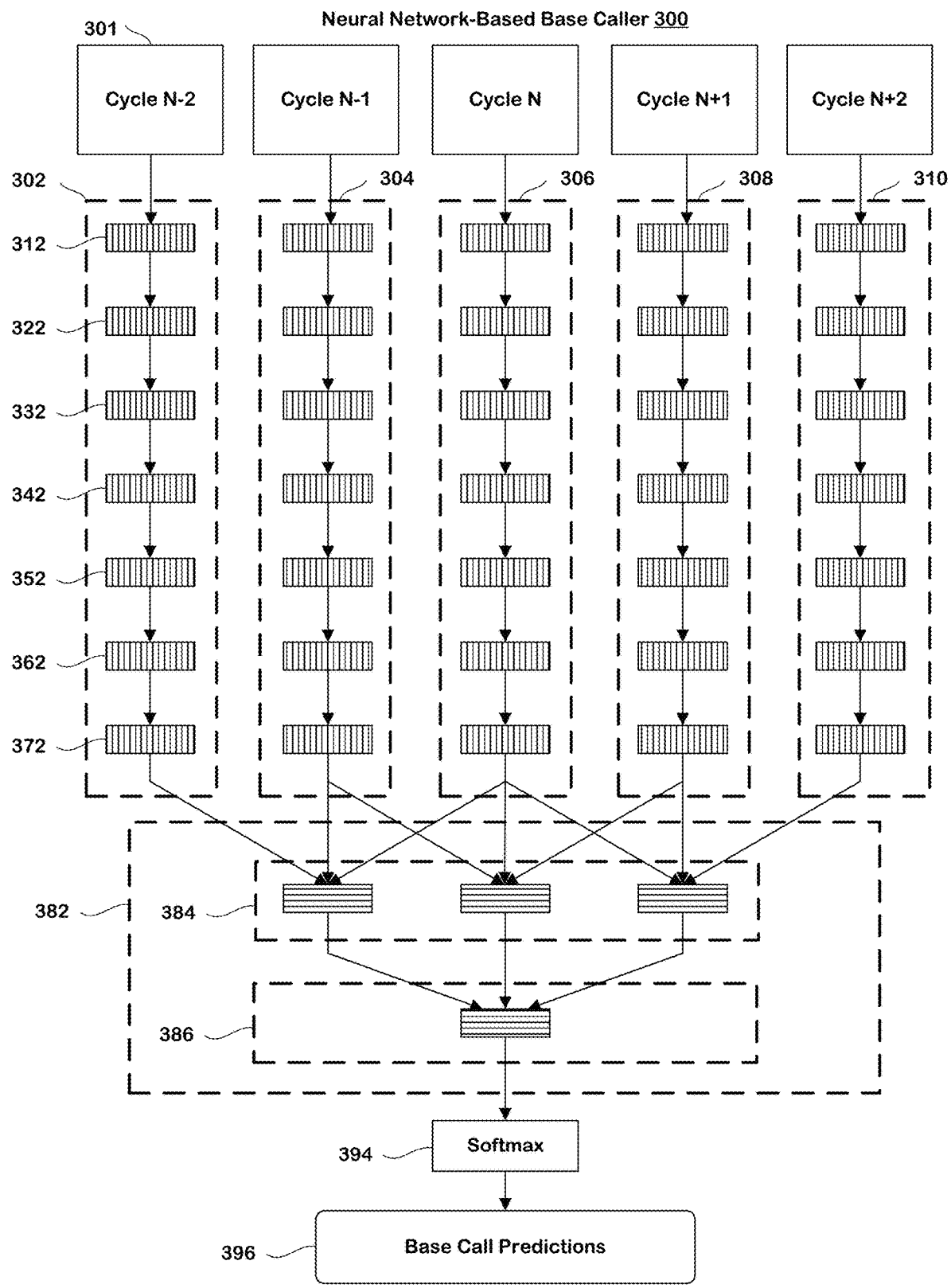
FIG. 3 illustrates one implementation of the disclosed neural network-based base caller.

FIG. 3 depicts a diagram of the neural network-based base caller 300 that can effectively process sequencing images generated during a sequencing process, in accordance with one implementation. Referring to FIG. 3, the neural network-based base caller 300 can be executed using a system described herein in accordance with one exemplary implementation. It should be noted that the example shown in FIG. 3 can be referred to as a five-cycle input, one-cycle output neural network. As such, the inputs to the multi-cycle neural network model include five (5) spatially aligned patches (e.g., 301), for example, patches from the tile data arrays of five sensing cycles of a given tile. In the example, spatially aligned patches can have the same aligned row and column dimensions (x, y) as other patches in the set, so that the information relates to the same clusters of genetic material on the tile in sequence cycles. In addition, a subject patch is a patch from the array of tile data for cycle N, such that, for example, the set of five spatially aligned patches includes a patch from cycle N−2 preceding the subject patch (cycle N) by two cycles, a patch from cycle N−1 preceding the subject patch (cycle N) by one cycle, a patch from cycle N+1 following the patch from the subject cycle (cycle N) by one cycle, and a patch from cycle N+2 following the patch from the subject cycle (cycle N) by two cycles.

The model (or neural network-based base caller 300) depicted in FIG. 3 also includes a segregated stack of multiple layers of the neural network for each of the input patches (e.g., segregated stacks 302). In other words, the segregated stack 302 receives as input tile data for the patch from cycle N−2 (301), and it is segregated from the stacks 304, 306, 308, and 310 that receive data from other cycles, so that the segregated stacks do not share their input data, or intermediate data, with each other.

In some implementations, all of the individual segregated stacks can have an identical (or virtually identical) model, and identical (or virtually identical) trained parameters. In other implementations, the models and trained parameters may vary (i.e., can be different in the different stacks). In any case, as a segregated stack, stack 302 can receive, as input, tile data for the patch from cycle N−2. Stack 304 can receive, as input, tile data for the patch from cycle N−1. Stack 306 can receive, as input, tile data for the patch from cycle N. Stack 308 can receive, as input, tile data for the patch from cycle N+1. Stack 310 can receive, as input, tile data for the patch from cycle N+1.

Referring again to FIG. 3, the layers of the segregated stacks (e.g., 312, 322, 332, 342, 352, 362, and 372) can each execute one or more convolution operation(s) of one or more kernels, including a plurality of filters over their respective input data for the layer. As an example, a patch associated with Cycle N−2 may include three (3) features as it is input to the first layer, namely, the layer 312. However, the output of the layer 312 may include many more features, for example, 10 to 20 features. Likewise, the outputs of each of layers 322, 332, 342, 352, 362, and 372 may include virtually any number of features suitable for a particular implementation. The parameters of the filters can be trained parameters for the neural network, for example, as weights and biases. The output feature set (intermediate data) from each of the stacks 302, 304, 306, and 310 is provided as input to an inverse hierarchy 382 of temporal combinatorial layers, in which the intermediate data from the multiple cycles are combined. In the example depicted in FIG. 3, the inverse hierarchy 382 includes a first layer 384 and a second layer 386, such that the first layer includes three combinatorial layers, each receiving intermediate data from three of the segregated stacks, and the second (or final) layer includes one combinatorial layer receiving intermediate data from the three temporal layers.

The output of the second (or final) combinatorial layer 382 can be an output patch of classification data for clusters located in the corresponding patch of the tile from cycle N. In addition, the output patches can be assembled into an output array of classification data for the tile for cycle N. In some implementations, the output patch may have sizes and dimensions different from the input patches. In some implementations, the output patch may include pixel-by-pixel data that can be filtered by the host to select cluster data.

The output classification data can then be applied to a softmax function 394 (or other output activation function) optionally executed by the host, or on the configurable processor, depending on a particular implementation. An output function different from the softmax function 394 can also be used (e.g., used for a making a base call output parameter according to the largest output, then use a learned nonlinear mapping using context/network outputs to give base quality).

Finally, the output of the softmax function 394 can be provided as base call predictions 396 for the cycle N and stored in the host memory to be used in subsequent processing. Other systems may use another function for output probability calculation (e.g., another nonlinear model).

The hierarchy 382 of temporal combinatorial layers 384, 386 can collectively represent a temporal logic of the neural network-based base caller 300, and the segregated stacks 302, 304, 306, 308, and 310 can collectively represent a spatial logic of the neural network-based base caller 300.

The neural network-based base caller 300 can, for example, be implemented using a configurable processor with a plurality of execution clusters, such that a complete evaluation of one tile cycle within the duration of the time interval, or close to the duration of the time interval, of one sensing cycle, can effectively provide the output data in real time. Data flow logic can be configured to distribute input units of tile data and trained parameters to the execution clusters, and to distribute output patches for aggregation in memory.

Additional details about the neural network-based base caller 300 can, for example, be found in U.S. Provisional Patent Application No. 62/821,766, titled "ARTIFICIAL INTELLIGENCE-BASED SEQUENCING," filed on Mar. 21, 2019, which is incorporated herein by reference.

Index Images

Index images depict nucleotides with low-complexity patterns in which some of the four bases A, C, T, and G are represented at a frequency of less than 15%, 10%, or 5% of all the nucleotides. This is the case because, for any given index sequencing cycle, an index image depicts intensity emissions of (1) multiple analytes that originate from the same sample and share the same index sequence, and also of (2) analytes that belong to different samples and have different index sequences.

In other words, the first type of analytes has the same index base for every index sequencing cycle. As a result, the index image ends up depicting the same nucleotide for multiple analytes. This reduces the nucleotide diversity of the index image.

The index image's nucleotide diversity is further reduced when the second type of analytes also ends up having the same index base for certain index sequencing cycles. This happens for two reasons. First, the index sequences are short sequences with two to twenty index bases and thus do not have enough positions that can create significant mismatches between different index sequences. Second, often, up to only twenty samples are pooled for simultaneous sequencing. As a result, the number of different index sequences that can be depicted by an index image is not substantial. These factors lead to different index sequences having matching index bases at the same positions (base collision), which in turn causes the analytes with different index sequences to have the same index base for certain index sequencing cycles.

Low nucleotide diversity in the index images creates intensity patterns that lack signal diversity (contrast). On the other hand, the target images depict nucleotides with high-complexity patterns in which each of the four bases A, C, T, and G is represented at a frequency of at least 20%, 25%, or 30% of all the nucleotides. This is the case because the target sequences are often long (e.g., one-fifty bases) and are unique to each analyte regardless of the source sample. Therefore, unlike the index images, the target images have adequate signal diversity.

Convolution kernels and filters of the neural network-based base caller 300 are trained largely on the target images. So, when, during inference, the trained neural network-based base caller 300 is presented with index images that have not undergone preprocessing (raw index images), its base calling accuracy for the index reads drops because its convolution kernels and filters are trained to detect intensity patterns based on the contrast.

Bypassing preprocessing by training the neural network-based base caller 300 on large amounts of raw index images to introduce signal diversity is not feasible because only so many index sequences are published and made publicly available. Furthermore, it is not uncommon for users to design custom index sequences and use them instead of the published index sequences. So, when trained on just the raw index images, the neural network-based base caller 300 may not be able to "generalize" well or effectively during inference and it may be prone to a problem that can be referred to as "overfitting."

Improved Techniques

The improved techniques for base calling index images include reordering of sequencing images, and training of the neural network-based base caller 300 where a "temporal" logic (or component or layer) can be effectively "frozen" (or bypassed). In addition, the improved techniques include various combinations, including, for example, combining "normalization" of sequencing images with reordering of sequencing images and/or with effective "freezing" of the temporal logic.

In accordance with one aspect, a set of sequencing images can be reordered to generate one or more reordered sets of sequencing images. The set of sequencing images that are reordered (reordered sequencing images) can include index images of one or more indexes provided for one or more libraries used for multiplexing, in addition to target images associated with a target being analyzed (e.g., template strand). In any case, the reordering of sequencing images can provide several additional sequencing images as additional training data for the training of the neural network-based base caller 300, as it is possible to generate multiple reordered sets of sequencing images based on a single set of sequencing images, for example, an image in its original consecutive sequencing cycle (e.g., cycle 1, cycle 2 . . . cycle M). For example, for a consecutive sequencing cycle starting from cycle 1, cycle 2 . . . cycle 8, where M=8, it would be possible to generate about ($M^N$–1) or just about $M^N$ sets of rearranged sequencing images, where N can, for example, represent a selection window size (e.g., 3, 4, 5, 6, 7) for datasets provided as training data for the training of the neural network-based base caller 300 (e.g., $8^5$, $8^6$, $8^7$).

As such, the reordering of a set of sequencing images can be especially useful for index images given their relatively low diversity and/or limited availability. It should be noted that the reordering of the sequencing images can be accomplished in various ways. For example, in accordance with one or more implementations, a "shuffling" technique can be utilized to reorder a set of sequencing images by effectively maintaining one or more images fixed in a central position (e.g., a third image in a sequence of five consecutively numbered images from one to five) while exchanging the position of one or more other images between left (e.g., first image, second images) and right flanks (e.g., fourth image, fifth image) relative to the central position. Other techniques for reordering sequencing images include, for example, permutations with or without repetition, combinations, etc. The techniques can be used to effectively generate the rearrangement of a set of sequencing images based on one or more parameters (e.g., set size, selection window size) in accordance with additional implementations. Again, rearranging of the sequencing images can be especially useful for index images given their relatively lower level of diversity.

In addition to the reordering of sequencing images, in accordance with another aspect, the temporal logic of the neural network-based base caller 300 can be effectively "frozen" or bypassed to effectively prevent the temporal logic from learning temporal dependencies (e.g., sequential, chronological, or consecutive patterns). In doing so, the temporal logic can be already trained to at least some extent (e.g., previously trained on a first dataset). As such, "freezing" or bypassing of the temporal logic of a neural network can take place in the form of further (or additional) training using a second set of training data that trains the spatial logic but does not train the temporal logic at least with respect to backward propagation (e.g., weights update). "Freezing" or the bypassing of the temporal logic of a neural network can be especially useful for index images given their relatively lower level of diversity.

In accordance with yet another aspect, the neural network-based base caller 300 can be trained over multiple training iterations, such that in each iteration each one of the respective sequencing images is processed through the neural network-based base caller 300 to generate respective base call predictions. In doing so, one or more weights of the neural network-based base caller can be effectively improved (e.g., via backpropagation) based on comparisons of the respective base call predictions against respective base call ground truths.

As noted above, in accordance with other aspects, improved techniques also include various combinations including, for example, combining the "normalization" of sequencing images with the reordering of sequencing images and/or with effective "freezing" of the temporal logic. These and other aspects and implementations will become even more apparent in view of the description below with accompanying FIGS. 4A-21. Since freezing is applied during the training of the neural network-based base caller 300, it can be combined with the reordering of sequencing images and/or the normalization during training. In other implementations, the trained neural network-based base caller 300 trained based on the freezing can use the reordering of sequencing images and/or the normalization during inference.

Figure 4A:
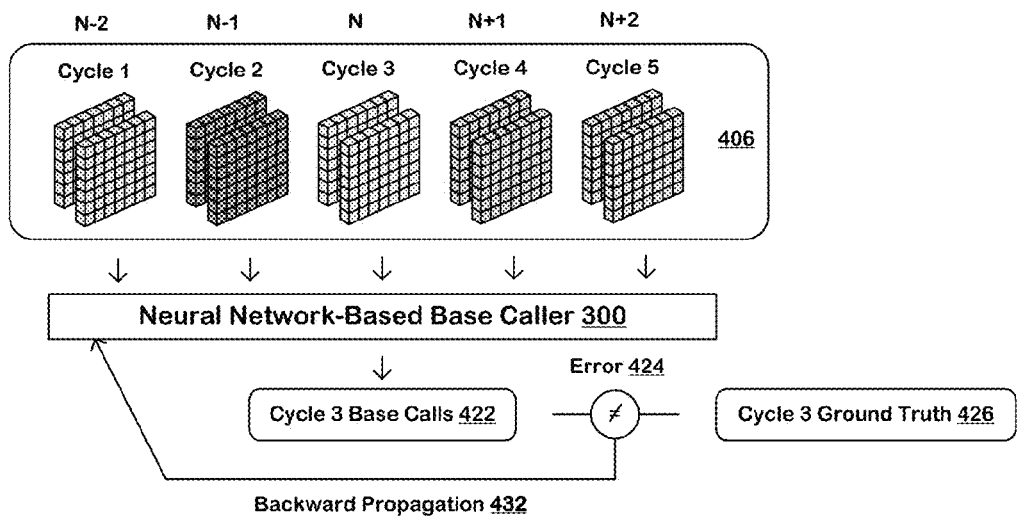
FIGS. 4A, 4B and 4C depict one implementation of shuffling the index images for processing by the disclosed neural network-based base caller.

To further elaborate, FIG. 4A depicts another multi-cycle neural network model (or neural network-based base caller 300) in accordance with another implementation. Referring to FIG. 4A, the neural network-based base caller 300 can effectively process the sequencing images 406 generated during a sequencing process. It should be noted that the sequencing images 406 can include index images associated with one or more indexes of one or more libraries (e.g., index A, index B shown in FIG. 1) as well as target images associated with a target (e.g., a template strand itself without an index).

In essence, the neural network-based base caller 300 can be executed to process the sequencing images 406 as input, for example, similar to or substantially like the processing described above with respect to the neural network-based base caller 300 (shown in FIG. 3). Again, a five-cycle input, one-cycle output neural network is shown here as an example. As such, the inputs to the multi-cycle neural network model (or the neural network-based base caller 300) depicted in FIG. 4A can include five spatially aligned patches from the tile data arrays of five sensing cycles of a given tile. However, for simplification, segregated stacks and other components of the neural network-based base caller 300 are not shown in FIG. 4A (depicted in FIG. 3). Instead, in FIG. 4A, the sequencing images 406 are each depicted as having multiple datasets corresponding to multiple channels used to generate images in sequence.

In any case, referring to FIG. 4A, the neural network-based base caller 300 is configured to access a set of sequencing images 406. It should be noted that the sequencing images 406 can be a set of sequencing images arranged in a consecutive order, for example, in the order that they were generated as an index or read in a sequencing cycle. In other words, sequencing images in the set of sequencing images 406 can be arranged in the order of sequencing cycles, N−2, N−1, N, N+1, N+2 (or cycles 1, 2, 3, 4 and 5) as shown in FIG. 4A. As such, the neural network-based base caller 300 can process the sequencing images 406 as input, in a similar manner as described above with respect to the neural network-based base caller 300 (shown in FIG. 3).

In processing the sequencing images 406 as input, the neural network-based base caller 300 can effectively perform training and/or can be trained for base calls (i.e., training the neural network-based base caller 300) over a plurality of training iterations, such that each one of the respective training iterations processes its respective set of the sequencing images (406) through the neural network-based base caller 300 (through its stacks and/or its layers) to generate a respective base call prediction, for example, a base call 422 for cycle N (or cycle 3). In doing so, an error can be determined based on its associated ground truth. For example, an error 424 can be determined based on a cycle N (or cycle 3) ground truth 426. Based on the error 424, weights of the neural network-based base caller 300 can be updated via backward propagation 432.

Moreover, the neural network-based base caller 300 can also be configured to reorder the sequencing images 406 and/or process one or more reordered sequencing images as will be described in greater detail below (e.g., rearranging sequencing images in an order that is different from the consecutive order of the images in the sequencing cycles used to generate the images). Generally, the sequencing images 406 can be reordered (or rearranged) from a first order to a second order, different than the first order, as will be described in greater detail below. For ease of illustration here, rather than a more general approach, a more specific approach, namely, "shuffling" is presented first before presenting more general approaches including, for example, "permutation" that may yield more reordering options.

Reordering by Shuffling

Figure 4B:
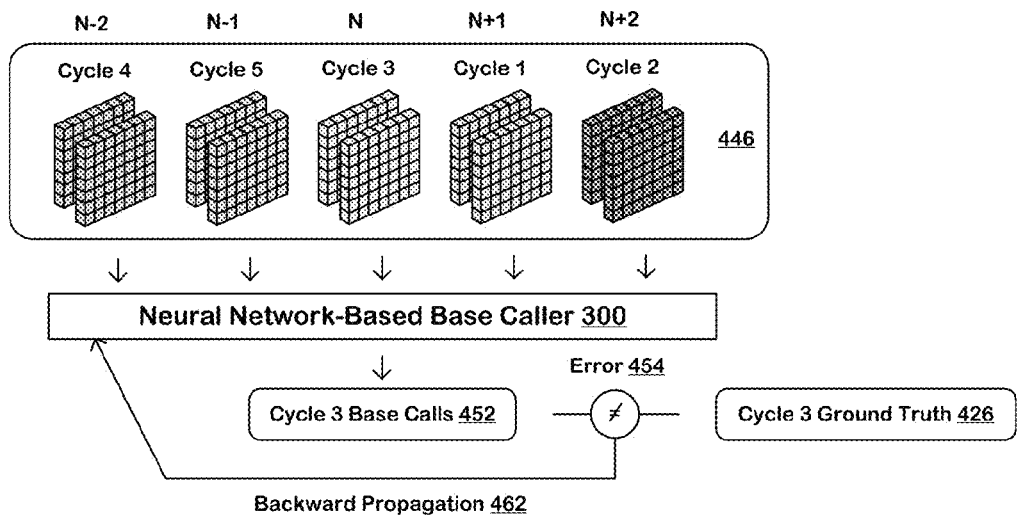

To further elaborate, FIG. 4B depicts the neural network-based base caller 300 in connection with a reordered set of the sequencing images 446 in accordance with one implementation. Although it is not shown in FIG. 4B, it should be noted that the neural network-based base caller 300 can also be configured to generate the reordered set of the sequencing images 446, by effectively reordering the sequencing images 406 before processing the reordered set of the sequencing images 446 as input. Alternatively, the neural network-based base caller 300 can also be configured to merely process the reordered set of the sequencing images 446 as input without generating the reordered set of the sequencing images 446. For simplicity, the neural network-based base caller 300 is depicted herein to receive the reordered set of the sequencing images 446 as input, but it is apparent that it can also be configured to reorder a set of sequencing images in a first order (e.g., sequencing images 406) to generate a reordered set of sequencing images in a second order, different than the first order (e.g., sequencing images 446).

As shown in FIG. 4B, the neural network-based base caller 300 can receive the reordered set of sequencing images 446 as input. In any case, the reordered set of the sequencing images 446 is a reordering of the set of the (original) sequencing images 406 representing a first order, namely: cycle 1, cycle 2, cycle 3, cycle 4 and cycle 5 (e.g., the original sequencing cycles as the images are/were obtained). As such, the sequencing images of the reordered set of the sequencing images 446 are in a second order which is different than the first order. In the example shown in FIG. 4B, the reordered set of the sequencing images 446 is depicted as having the following reordering: cycle 4, cycle 5, cycle 3, cycle 1, and cycle 2. As such, the reordering depicted in FIG. 4A shows an example where an image in a central (cycle) position, namely cycle N, is kept fixed at its central position (cycle 3) while the images from left flanking cycles (N−2 and N−1) corresponding to cycle 1 and cycle 2 are effectively swapped with the images corresponding to cycle 4 and cycle 5 from the right flanking cycles (N+1 and N+2) relative to the fixed central position (cycle). This kind of reordering, swapping, or exchange can be referred to as "shuffling."

More generally, in reordering by "shuffling" a set of sequencing images (e.g., sequencing images 406), a particular one or more image(s) of a set of sequencing images can be kept at its position, and the position of one or more of the other sequencing images can be changed. In other words, at least one of the sequencing images at a right flanking position and/or a left flanking position can be changed between a first order of a first set of sequencing images (e.g., sequencing images 406) and a second order (or reordering) of the same set sequencing images (e.g., sequencing images 446). As another example, at least some of the sequencing images at one or more right flanking positions and/or one or more left flanking positions can be kept fixed between a first and a second order.

In processing the sequencing images 446 as input, the neural network-based base caller 300 can effectively perform training and/or can be trained for base calls (i.e., training the neural network-based base caller 300) over a plurality of training iterations, such that each one of the respective training iterations processes its respective set of the sequencing images (446) through the neural network-based base caller 300 (through its stacks and/or its layers) to generate a respective base call prediction, for example, a base call 452 for cycle N (or cycle 3). In doing so, an error can be determined based on its associated ground truth. For example, an error 454 can be determined based on a cycle N (or cycle 3) ground truth 426. Based on the error 454, weights of the neural network-based base caller 300 can be updated via backward propagation 462.

Figure 4C:
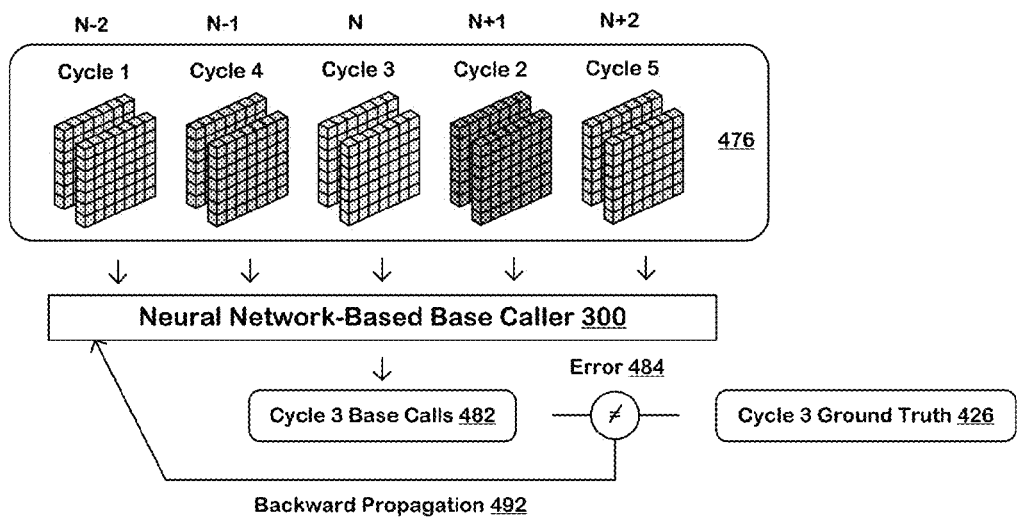

To provide another example, FIG. 4C depicts another exemplary reordered set of the sequencing images 476 as "cycle 1, cycle 4, cycle 3, cycle 2, and cycle 5." In processing the sequencing images 476 as input, the neural network-based base caller 300 can effectively perform training and/or can be trained for base calls (i.e., training the neural network-based base caller 300) over a plurality of training iterations, such that each one of the respective training iterations processes its respective set of the sequencing images (476) through the neural network-based base caller 300 (through its stacks and/or its layers) to generate a respective base call prediction, for example, a base call 482 for cycle N (or cycle 3). In doing so, an error can be determined based on its associated ground truth. For example, an error 484 can be determined based on a cycle N (or cycle 3) ground truth 426. Based on the error 484, weights of the neural network-based base caller 300 can be updated via backward propagation 492.

Figure 5A:
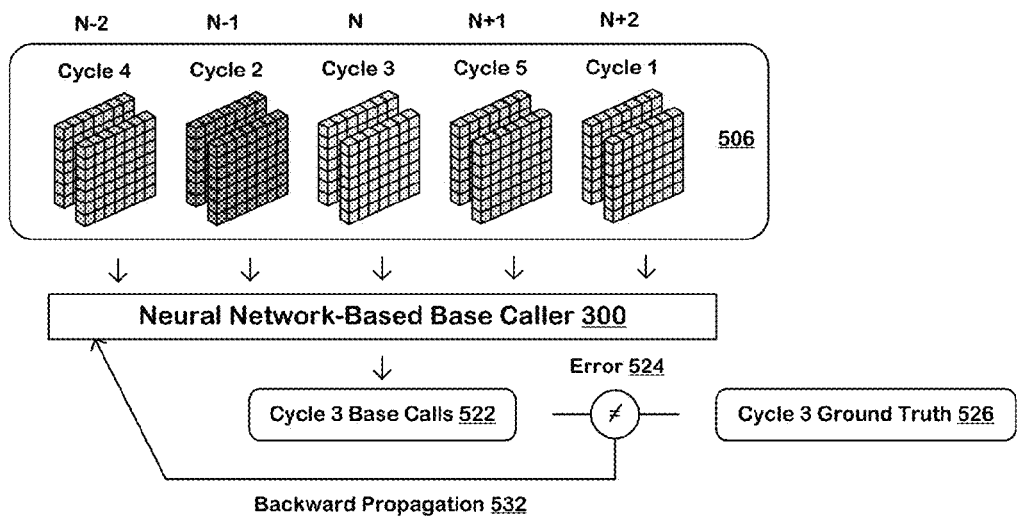
FIGS. 5A, 5B and 5C depict another implementation of shuffling the index images for processing by the disclosed neural network-based base caller.
Figure 5B:
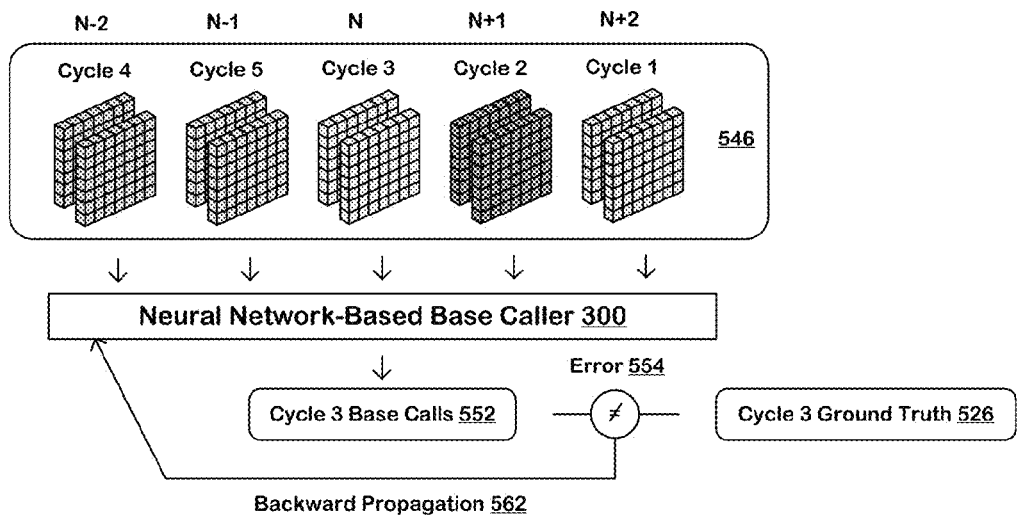
Figure 5C:
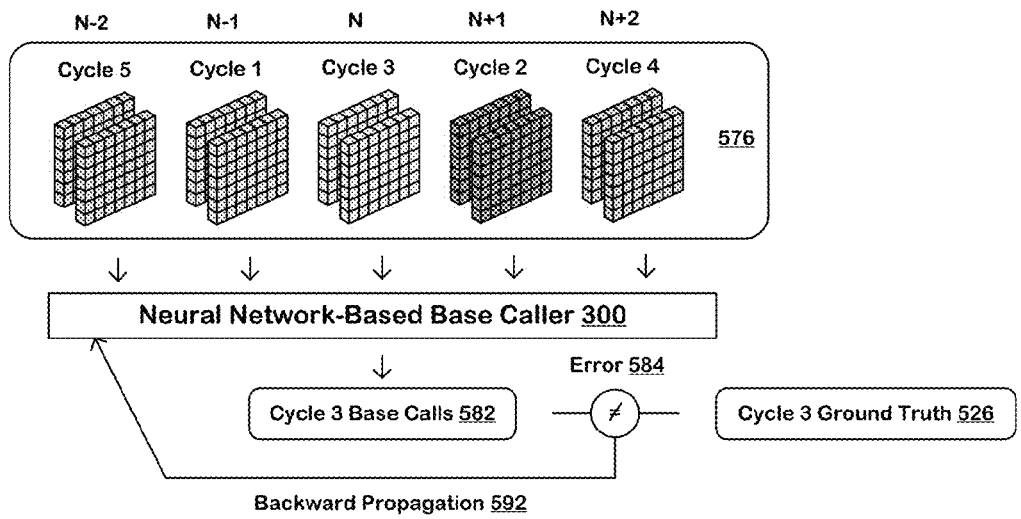

Similarly, FIGS. 5A, 5B, and 5C depict yet other exemplary reordered sets of the sequencing images 506, 546, and 576, in accordance with yet other exemplary implementations, where an image in a central cycle (N) (or cycle 3) remains fixed while one or more other images of one or more cycles have been reordered. For example, in the reordered set of the sequencing images 506, cycle 2 and cycle 3 are both retained in their original positions, but in the reordered sets of the sequencing images 546 and 576, only cycle 3 remains fixed, where one or more other cycles may have been changed and/or swapped between left and right flanks relative to cycle 3 that remains fixed in its central position.

Referring to FIGS. 5A, 5B, and 5C, it should be noted that the neural network-based base caller 300 can process each one of the reordered (or shuffled) sets of sequencing images 506, 546, and 576, in a similar manner as described above with respect to the neural network-based base caller 300. In processing the reordered sets of sequencing images 506, 546, and 576, the neural network-based base caller 300 can effectively perform training or it can be trained for base calls (i.e., the neural network-based base caller 300 can be trained) over a plurality of training iterations, such that each one of the respective training iterations processes its respective set of the reordered set of sequencing images 506, 546, and 576 through the neural network (not shown) in the neural network-based base caller 300 through its stacks and/or its layers (not shown) to generate a respective base call prediction, for example, a base call 522 for cycle N (or cycle 3) as depicted in FIG. 5A. In doing so, an error can be determined based on its associated ground truth. For example, an error 524 can be determined based on a cycle N (or cycle 3) ground truth 526, as also depicted in FIG. 5A. As a result, one or more factors (e.g., weights) can be updated via a process, generally known as backward propagation, as an important part of the training iterations. As an example, backward propagation 532 is depicted in FIG. 5A. Other examples of errors 554 and 584 and corresponding backward propagations 562 and 592 are also depicted.

The examples of reordering noted above represent more specific exemplary implementations where, for example, one or more of the sequencing images can be determined to remain fixed in their original position (e.g., a center position N is kept fixed as shown in FIGS. 4A, 4B, and 4C) or one or more sequencing images can be determined to be moved from their original location. However, it will be appreciated that a set of sequencing images can be virtually reordered in any way possible and/or desired, including, for example, by using random selection with or without replacement (or with or without repetition).

Moreover, it will also be appreciated that the reordering of a set of sequencing images into one or more reordered sets of sequencing images can be achieved through even more methodologies, in a manner that may even better address the needs of base calling using the neural network-based base caller 300. By way of example, a subset selector (e.g., subset selector component, subset selector logic) can be configured to effectively generate a reordering of a set of sequencing images (reordered set of sequencing images) based on one or more parameters, as will be described below in accordance with yet other implementations.

Random Permutation

Figure 6:
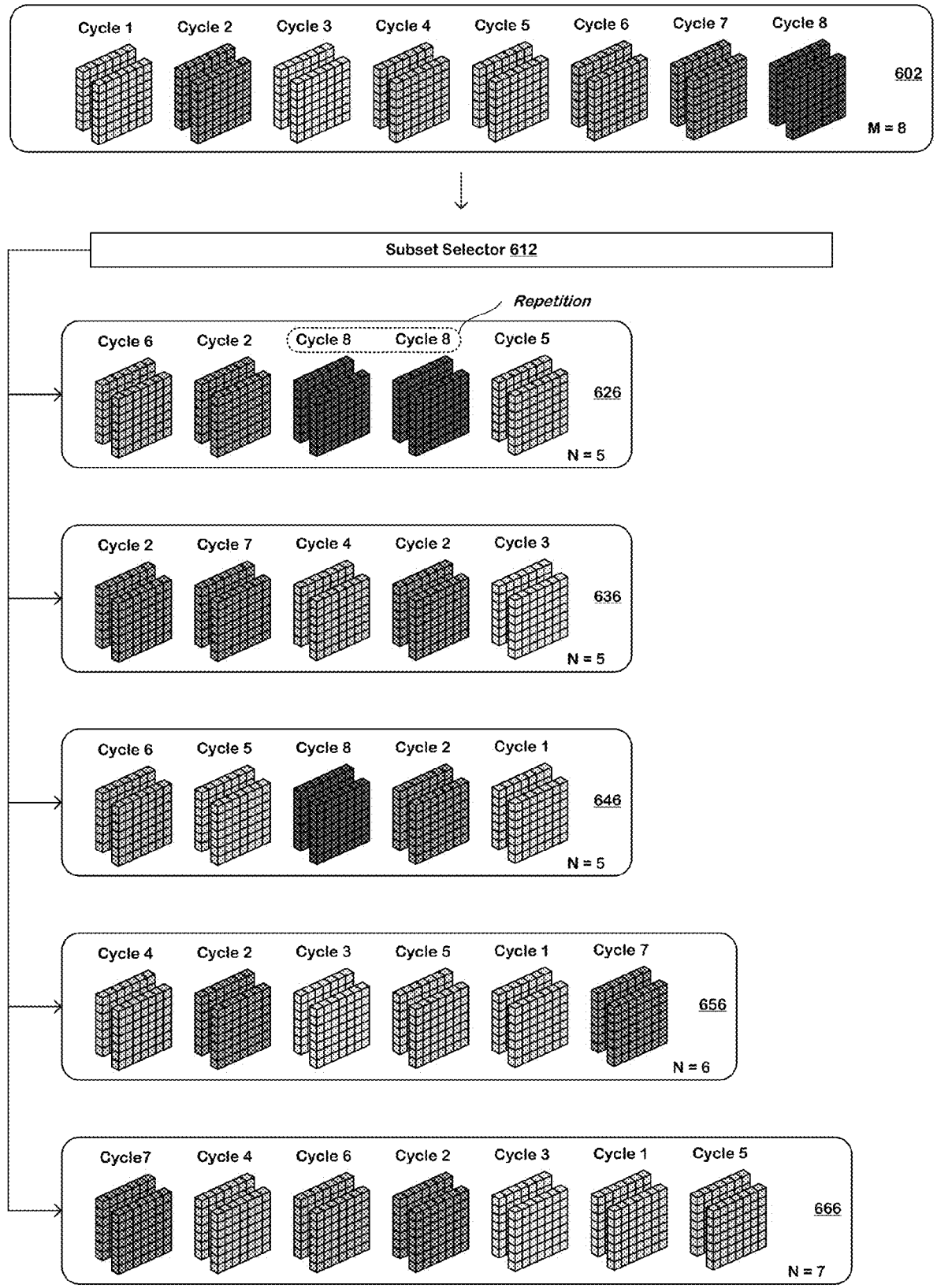
FIG. 6 depicts a subset selector configured to effectively generate a reordering of a set of sequencing images (reordered set of sequencing images) as a reordered subset of sequencing images, based on two parameters in accordance with one implementation.

To further elaborate, FIG. 6 depicts a subset selector 612 (e.g., subset selector component, subset selector logic) configured to effectively generate a reordering of a set of sequencing images (reordered set of sequencing images) as a reordered subset of sequencing images, based on two (2) parameters in accordance with one implementation. Referring to FIG. 6, a first parameter (M) represents a set of sequencing images (e.g., a complete set of sequencing images that can be generated in a sequencing run, which currently can be eight (8) or ten (10) in some existing implementations). For simplicity, in FIG. 6, the first parameter (M) is depicted to be eight (8) representing eight (8) consecutive cycles (cycle 1, cycle 2 . . . cycle 8) 602. In addition, in FIG. 6, a second parameter (N) is depicted to be five (5), six (6) or seven (7). Generally, the second parameter (N) can represent the size of a subset for selection from the set of M images. As such, the second parameter (N) can, for example, represent a "window" for selection of the input to the neural network-based base caller 300. Although not shown, it should be noted that the subset selector 612 can, for example, be provided by the neural network-based base caller 300 (shown in FIG. 4). Of course, the subset selector 612 can also be provided as a separate entity configured as it will be readily understood by those skilled in the art. The reordering logic implemented by the subset selector 612 can be random or driven by sequentially progressing to different permutations and combinations, either until exhaustion or up till early exit due to satisfaction of a terminal condition.

In any case, as depicted in FIG. 6, the subset selector 612 can effectively obtain (e.g., determine, identify, receive as input) the set of M, or eight consecutive cycles (ordered consecutively from cycle 1-cycle 8) 602 in the example and generate various subsets of N, for example, five (5) cycles in various reordered subsets as reordered subsets of sequencing images 626, 636, 646, and so on. As the exemplary rearranged subset of sequencing images 626 shows, there can be repetition of cycles, for example, cycle 8 (or more accurately the images in cycle 8) can be repeated in the reordered subset of sequencing images 626 as generated by the subset selector 612.

As also depicted in FIG. 6, the reordered subsets of sequencing images 656 and 666 respectively depict examples of subsets where N is six (6) and seven (7). Generally, for the set of M elements (e.g., eight (8)), about M to the power of N ($M^N$) (e.g., $8^5$) subsets can be determined when there is repetition (i.e., the same cycle can be repeated). The number of possible subsets can be slightly less if no repetition is allowed and/or desired, as it will be readily known to those skilled in the art. As those skilled in the art will also readily appreciate, various "permutations" and "combinations" can be selected from an original set of sequencing images (e.g., sequencing images 602 with cycles 1-cycle 8) based on one or more parameters (e.g., M and N parameters).

Generally, multiple subsets of N sequencing images can be selected from a set of M sequencing images, where M>N. In other words, there can be multiple images in a single cycle, where each one of the multiple images can, for example, correspond to a single channel, as for example, two channels are depicted for the sequencing images shown in FIG. 6. It should be noted also that respective subsets of the multiple selected subsets can arrange the N sequencing images in respective sequences of the N sequencing images. Also, the respective sequences can have different combinations of N sequencing images (i.e., the combinations of the N sequencing images can vary from sequence-to-sequence). In addition, the combinations can be combinations with or without replacement. Similarly, the permutations can be permutations with or without replacement. The respective sequences can arrange the N sequencing images in accordance with consecutive or non-consecutive sequencing cycles. It should also be noted that N can be determined to be a constant for the selection of respective subsets of the multiple selected subsets, or N can be selected to be a variable, so that N may vary between the respective subsets of the multiple selected subsets. Furthermore, the respective subsets of the multiple selected subsets can be selected to have or not have any overlapping sequencing images.

Training of the neural network-based base caller 300 can be achieved over multiple training iterations, where each one of the training iterations processes its respective sequences of the N sequencing images through the neural network-based base caller 300 to generate respective base call predictions, and update the weights (e.g., via backpropagation) of the neural network-based base caller 300, based on the comparison of the respective base call predictions against the respective base call ground truths.

As noted above, the subset selector 612 (shown in FIG. 6) can, for example, be provided by the neural network-based base caller 300 (shown in FIG. 4) or as a separate entity. However, for simplicity, additional implementations depict the neural network-based base caller 300 as receiving already reordered (or rearranged) sequencing images. The depicted reordered sequencing images can, for example, be generated by the subset selector 612 (shown in FIG. 6).

Figure 7A:
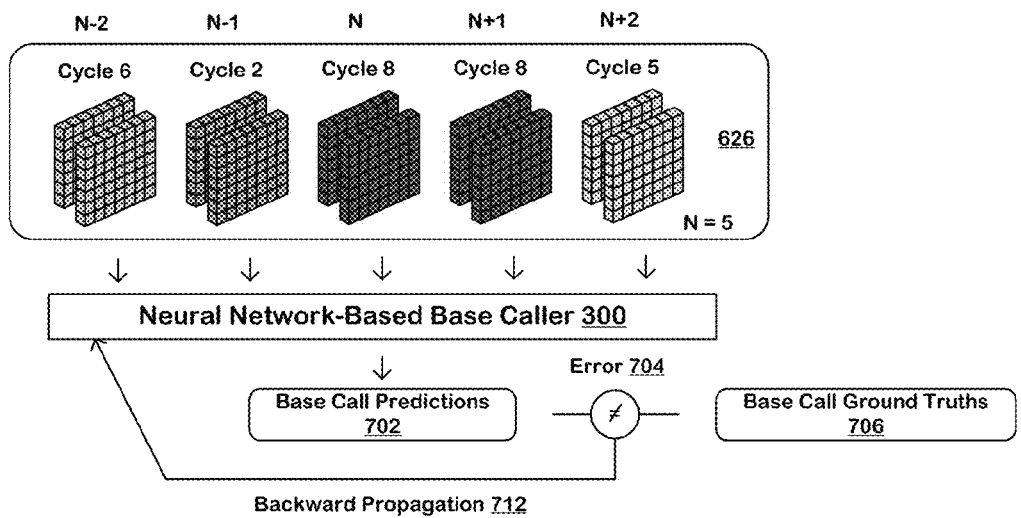
FIGS. 7A, 7B and 7C depict a reordered subset of sequencing images (also shown in FIG. 6) in connection with the neural network-based base caller (also shown in FIG. 4).

More specifically, in accordance with one implementation, FIG. 7A depicts a reordered subset of sequencing images 626 (also shown in FIG. 6) as it can, for example, be generated by the subset selector 612 (shown in FIG. 6) in connection with the neural network-based base caller 300 (shown in FIG. 4). Referring to FIG. 7A, the neural network-based base caller 300 can receive, as input, the reordered subset of sequencing images 626. The neural network-based base caller 300 can then process the reordered subset of sequencing images 626, in a similar manner as discussed above, to generate one or more base call predictions 702, while utilizing the base call ground truths 706 in a backward propagation 712, in consideration of an error 704.

Figure 7B:
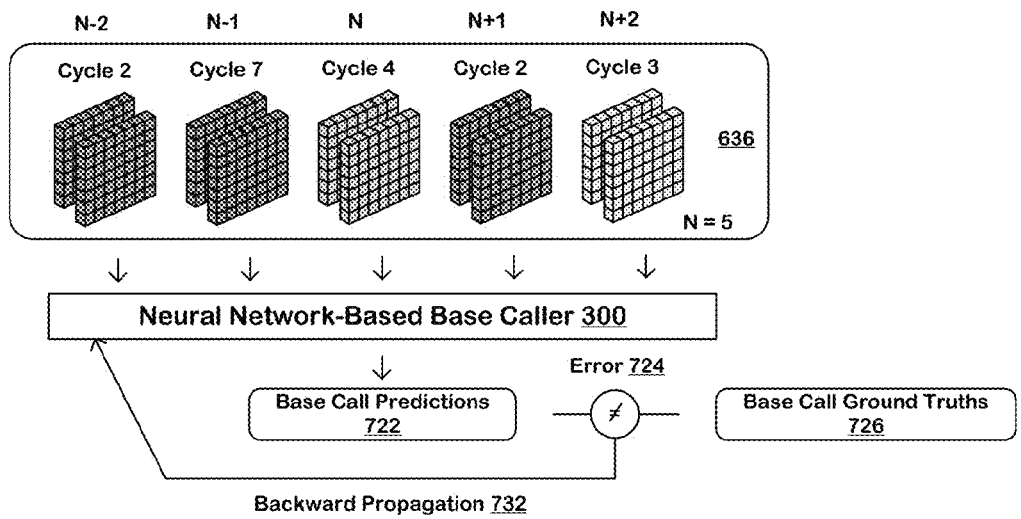
Figure 7C:
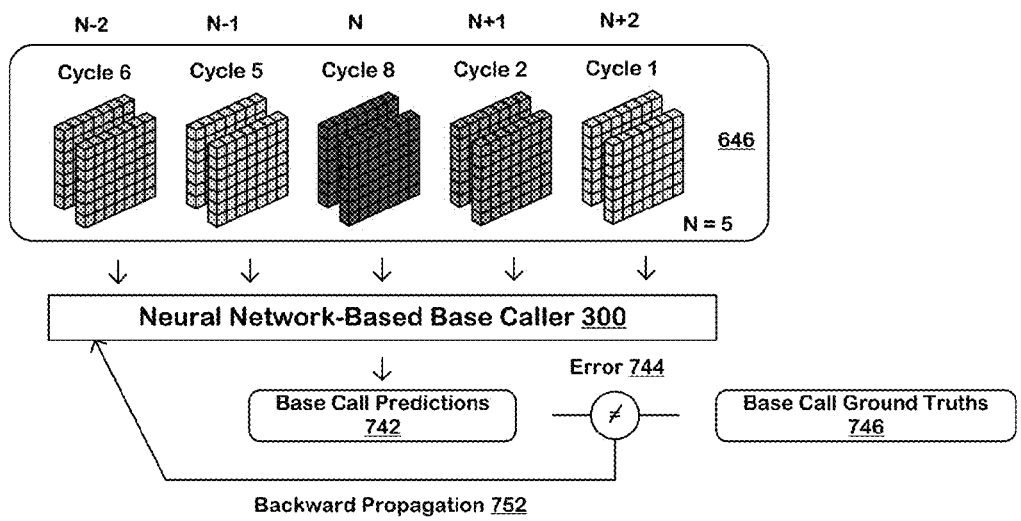

Similarly, FIGS. 7B and 7C depict the neural network-based base caller 300 in connection with the reordered subsets of sequencing images 636 and 646, respectively, where base call predictions 722 and 742 can be made, while utilizing the base call ground truths 726 and 746 in backward propagations 732 and 752, in consideration of errors 724 and 744, in a similar manner as disused above. Although not shown, additional reordered subsets of sequencing images can be provided to the neural network-based base caller 300 and processed by the neural network-based base caller 300 for the effective training of its neural network for base calling. In this way, the neural network-based base caller 300 can be trained over a number of training iterations, where each one of the training iterations processes its respective reordered sequences of N (e.g., five) sequencing images through the neural network-based base caller 300 to generate respective base call predictions, and to update the weights (e.g., via backpropagation) of the neural network-based base caller 300, based on the comparison of the respective base call predictions against the respective base call ground truths.

Figure 8A:
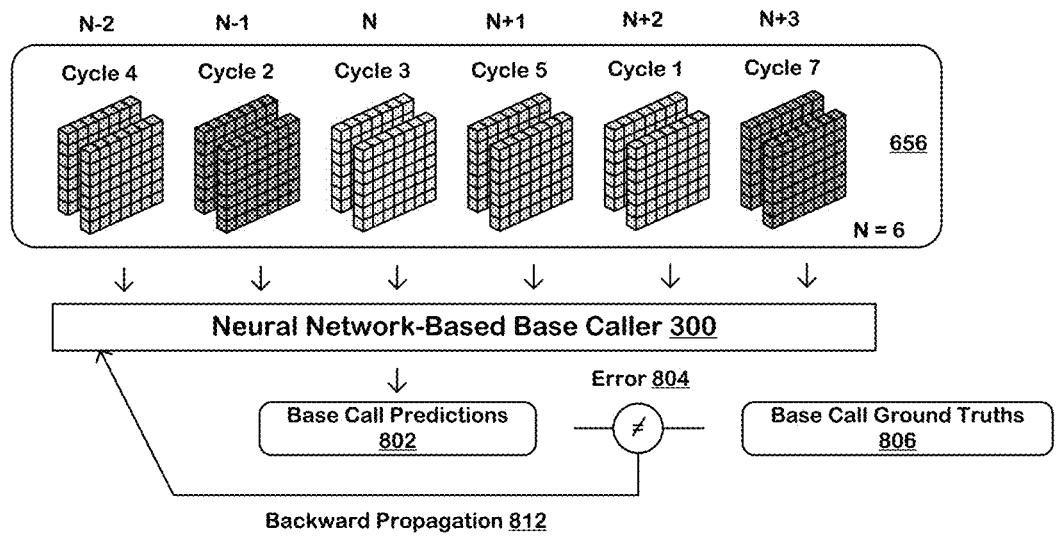
FIGS. 8A and 8B depict additional examples of reordered subsets of sequencing images in connection with a neural network-based base caller in accordance with additional implementations.
Figure 8B:
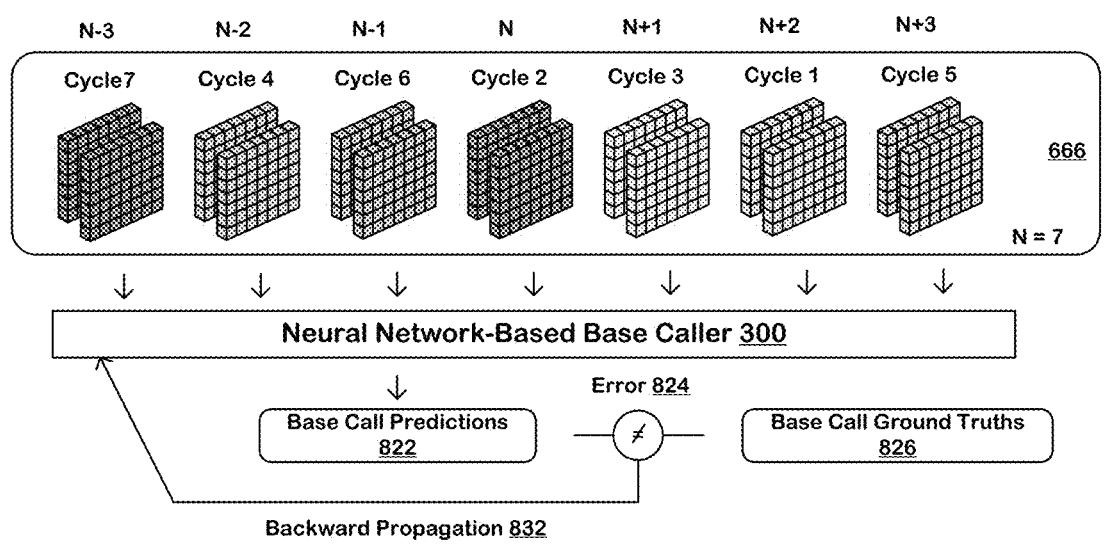

To elaborate even further, FIGS. 8A and 8B depict additional examples of reordered subsets of sequencing images 656 and 666 (also shown in FIG. 6) in connection with the neural network-based base caller 300, where the reordered subsets of sequencing images 656 and 666 can also serve in the training iterations process, alone or in combination with other training iterations, for example, in combination with training iterations using reordered subsets of sequencing images 626, 636, and 646 (shown in FIGS. 7A, 7B, and 7C) in accordance with additional implementations. As discussed above, the training will include determining errors 804 and 824 based on comparing base calling predictions 802 and 822 against base call ground truths 806 and 826 and executing back propagation iterations 812 and 832 based on the errors 804 and 824, respectively.

Bypassing Retraining of the Trained Temporal Logic

As noted above and discussed with respect to a few exemplary implementations, reordered sets of sequencing images can be generated in accordance with one implementation of the technology disclosed. In accordance with another aspect, the neural network-based base caller 300 can be trained (or further trained) by only utilizing the spatial logic of the (or previously trained) neural network-based base caller 300. In other words, the temporal logic of the neural network-based base caller 300 can be effectively "frozen" or bypassed in a second (or further) training where only the spatial logic (not the temporal logic) is trained at least with respect to backward propagation (e.g., weights update). A different (or second) training dataset can be used in the second (or further) training phase, after the initial (or first) training has been completed based on an initial (or first) training dataset.

A temporal logic can be provided, in addition to the spatial logic in the neural network-based base caller 300. Referring back to FIG. 3, the hierarchy 382 of the temporal combinatorial layers 382 can represent a temporal logic of the neural network-based base caller 300, and the segregated stacks 302, 304, 306, 308 and 310 can collectively represent the spatial logic of the neural network-based base caller 300.

Figure 9:
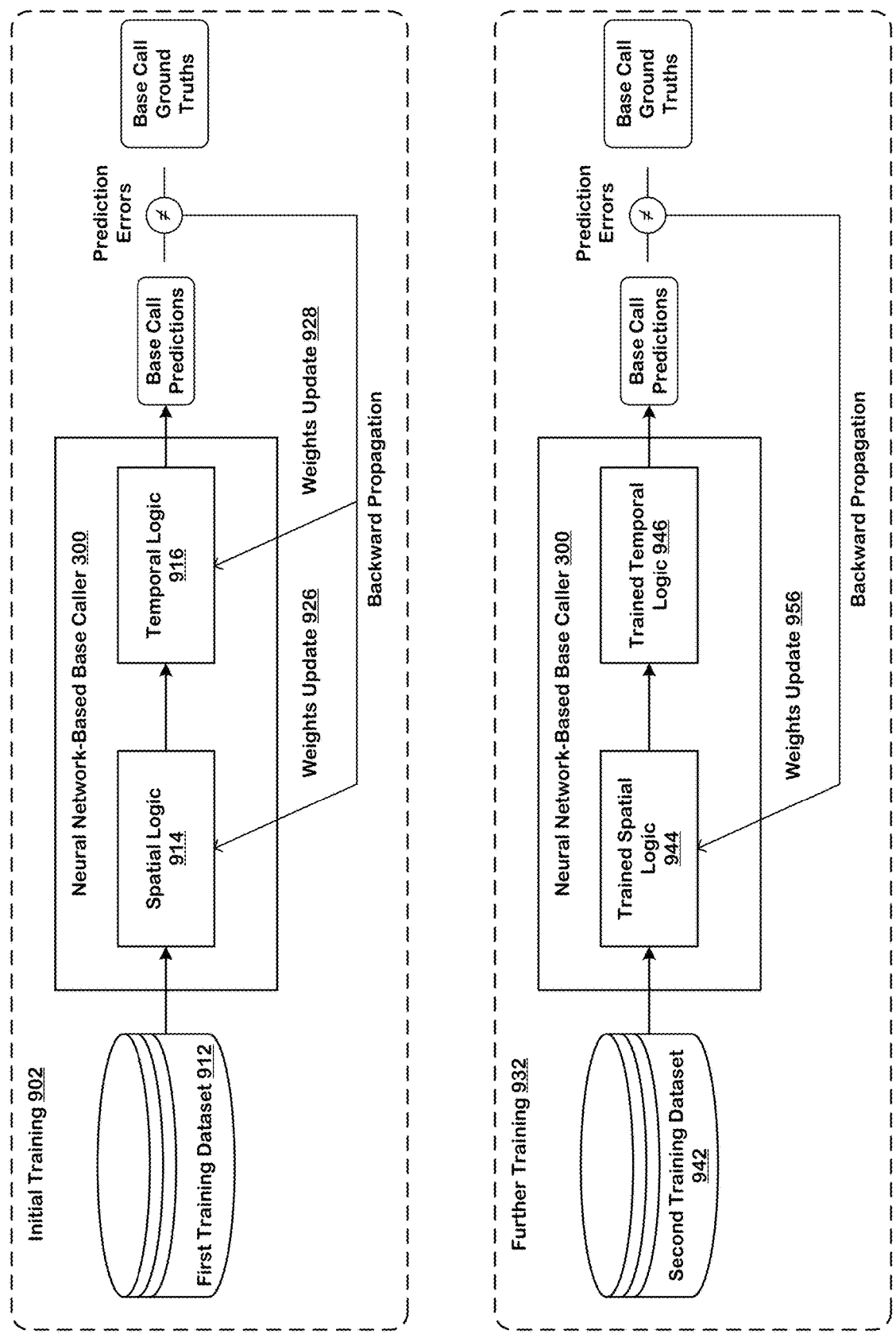
FIG. 9 depicts initial (first) training and further (second) training in accordance with two implementations.

To elaborate further, FIG. 9 depicts an initial (first) training 902 and a further (second) training 932 in accordance with two implementations. Referring to FIG. 9, the initial training 902 can be used to effectively train the neural network-based base caller 300 (also shown in FIG. 4) for making base call predictions. In doing so, the neural network-based base caller 300 can receive a first training dataset 912 and process it through two of its components, namely, a spatial logic 914 and a temporal logic 916. As noted above, the temporal logic 916 can, for example, be provided as the temporal combinatorial layers 382 (depicted in FIG. 3), and the spatial logic 914 can, for example, be provided as the segregated stacks 302, 304, 306, 308 and 310 (also depicted in FIG. 3) for the neural network-based base caller 300 depicted in FIG. 9.

In processing the first training dataset 912 first through the spatial logic 914 and then through the temporal logic 916, the neural network-based base caller 300 can utilize backward propagation to update weights 926 and 928 associated with the spatial logic 914 and the temporal logic 916, respectively. In other words, both the spatial logic 914 and the temporal logic 916 can be utilized to make updates via backward propagation, in a similar manner a discussed above. It should be noted that the first training dataset 912 can be an ordered set of sequencing images or a set of reordered (reordered set) sequencing images, generated in a similar manner as discussed above. However, it may be desirable for at least some applications to initially use an ordered set of sequencing images in an original consecutive order of sequencing images (cycle 1, cycle 2, . . . cycle M) in the initial training 902 before a further training 932 (or second training) takes place.

In any case, after the initial (or first) training 902 has been completed, a further (or second) training 932 can be performed. Referring to FIG. 9, the further (or second) training 932 can be performed by the neural network-based base caller 300. In doing so, the neural network-based base caller 300 can receive and process the second training dataset 942 through two of its components, namely, a trained spatial logic 944 and a trained temporal logic 946. In processing the second training dataset 942, the neural network-based base caller 300 can utilize backward propagation to update weights 956 only of the trained spatial logic 944. That is, during the further (or second) training 932, the backward propagation does not update the weights of the trained temporal logic 946 to effectively "freeze" or bypass the trained temporal logic 946. In other words, backward propagation of gradient updates through the trained temporal logic 946 is bypassed during the further (or second) training 932.

This means that in the further (or second) training 932, backward propagation is performed only through the trained spatial logic 944, where gradient updates are determined based on comparisons of the base call predictions against the base call ground truths only for the trained spatial logic 944 (not for the trained temporal logic 946).

Referring to FIG. 9, the second training dataset 942 can be an ordered set of sequencing images, as originally obtained during sequencing, or a set of reordered (reordered set) sequencing images generated in a similar manner as discussed above. For example, the sequencing images in the first training dataset 912 can include read sequencing images generated for read sequencing cycles of a sequencing run. As another example, the second training dataset 942 can include index sequencing images generated for index sequencing cycles of the sequencing run. In the example, the index sequencing images can be reordered sequencing images or sequencing images obtained in a consecutive order. As yet another example, the sequencing images in the second training dataset 942 can include a combination of read sequencing images and index sequencing images.

Referring to FIG. 9, it should be noted that the further (or second) training 932 can effectively retrain the trained spatial logic 944 to provide it as a retrained spatial logic (not shown). The retrained spatial logic can be different than the trained spatial logic 944 in its original state prior to the inception of the further (or second) training 932, while the trained temporal logic 946 can be effectively "frozen" to remain unchanged after the further (or second) training 932. After the further (or second) training 932 has completed, the combination of the retrained spatial logic (not shown) and the trained temporal logic 946 can be applied to or can be used at inference to generate new base call predictions for a set of (new) sequencing images. It will be appreciated that the bypassing of the backward propagation updating (i.e., retraining) for the trained temporal logic 946 can prevent the neural network-based base caller 300 from learning temporal dependencies (e.g., sequential, chronological, or consecutive patterns) between intensity features of the index sequencing images. Learning temporal dependencies can hinder the effectiveness of training for calling index images at inference. As a result of avoiding the learning of temporal dependencies during the further (or second) training 932, while allowing the trained spatial logic 944 to be further trained by using backward proportion to provide the weights update 956, even more accurate base calls can be achieved during inference.

Figure 10:
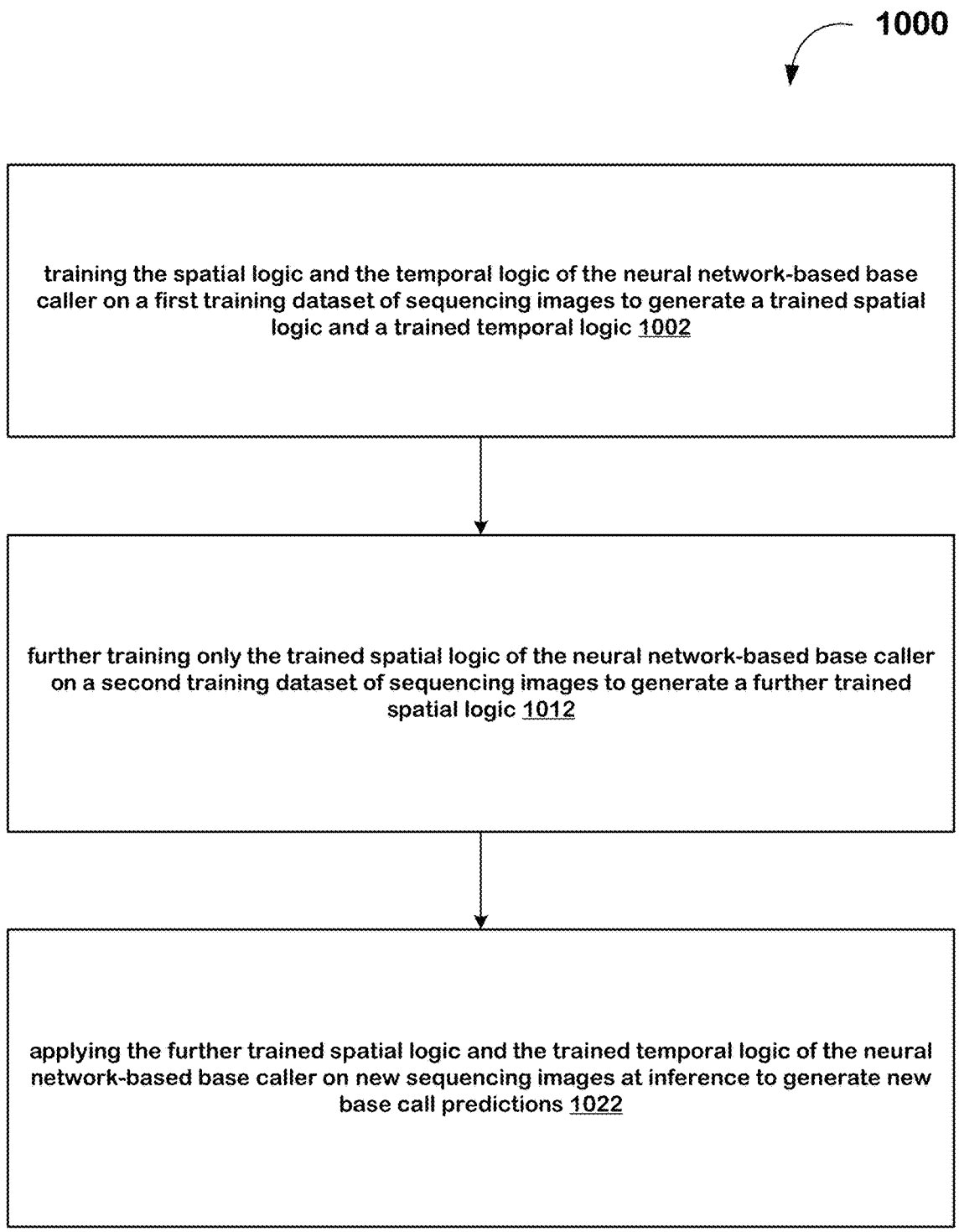
FIG. 10 depicts a method for training a neural network-based base caller in accordance with one implementation.

To elaborate even further, FIG. 10 depicts a method 1000 for training a neural network-based base caller in accordance with one implementation. The method 1000 can, for example, be used by the neural network-based base caller 300 (shown in FIG. 9) to train its neural network. It should be noted that the neural network-based base caller can include a spatial logic configured to extract intensity features confined to per-cycle sequencing images in an input, and a temporal logic configured to extract intensity features spanning pan-cycle sequencing images in the input. Referring to FIG. 10, initially, the spatial logic and the temporal logic of the neural network-based base caller are trained (1002) on a first training dataset of sequencing images to generate a trained spatial logic and a trained temporal logic. Next, further (or additional) training is performed (1012) using a second training dataset by further training only the spatial logic of the neural network-based base caller on the second training dataset of sequencing images to generate a retrained spatial logic. It should be noted that the further training (1012) can comprise the forward propagating of sequencing images in the second training dataset through the trained spatial logic and the trained temporal logic and generating further base call predictions. However, in the further training (1012) backward propagating is limited only through the trained spatial logic (not the temporal logic) such that further gradient updates are determined based on the comparison of the further (or additional) base call predictions against the further base call ground truths, thereby bypassing backward propagating the further gradient updates through the trained temporal logic. After the further training (1012), only the trained spatial logic of the neural network-based base caller is retrained (further trained) on a second training dataset of sequencing images to generate a retrained/further/additionally trained spatial logic. The method 1000 can proceed to apply (1022) the retrained spatial logic and the trained temporal logic of the neural network-based base caller to generate new base call predictions for (or on) new sequencing images at or during inference where, for example, base calls can be made for a target sample or template strand with an added index. The method 1000 can end after new base call predictions have been generated at or during inference. For example, the sequencing images in the first training dataset can include read sequencing images generated for read sequencing cycles of a sequencing run, as noted above. As another example, the second training dataset can include index sequencing images generated for index sequencing cycles of the sequencing run. As yet another example, the sequencing images in the second training dataset can include a combination of the read sequencing images and index sequencing images.

Figure 11:
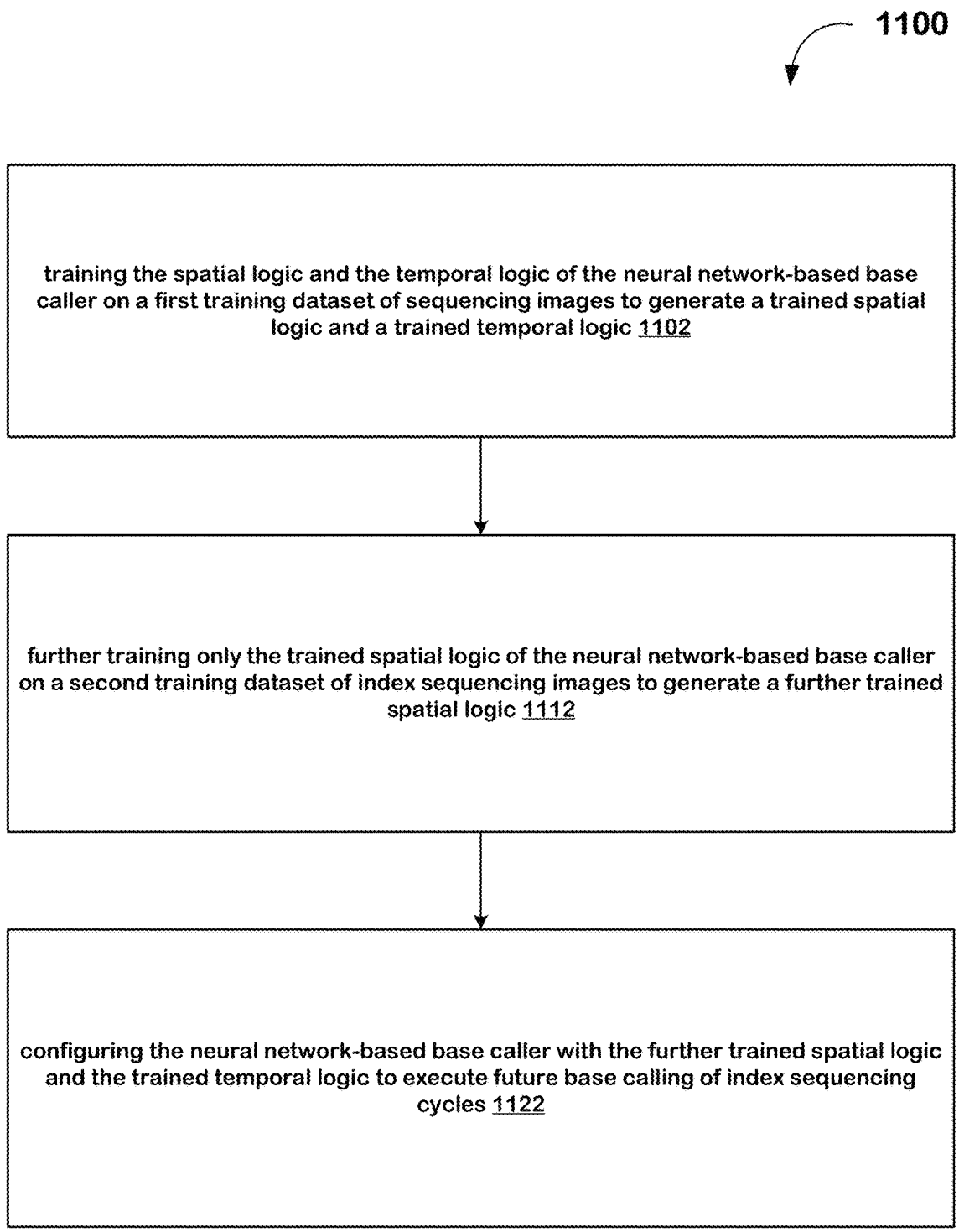
FIG. 11 depicts another method for training a neural network-based base caller in accordance with another implementation.

To elaborate still further, FIG. 11 depicts another method 1100 for training a neural network-based base caller in accordance with another implementation. The method 1100 can, for example, be used by the neural network-based base caller 300 to train its neural network. The method 1000 can proceed in a similar manner as discussed above with respect to the method 1000 (shown in FIG. 10) to train (1102) the spatial logic and the temporal logic of the neural network-based base caller on a first training dataset of sequencing images to generate a trained spatial logic and a trained temporal logic. In addition, further (or additional) training can be performed (1112) on a second training dataset by further training only the spatial logic of the neural network-based base caller on the second training dataset of sequencing images to generate a retrained spatial logic, in a similar manner as discussed above. However, as depicted in FIG. 11, the method 1100 can configure (1122) the neural network-based base caller with the retrained spatial logic and the trained temporal logic, thereby allowing future base calls (e.g., during inference) to be executed (or be configured to execute or be configured for the purpose of executing) based on the neural network-based base caller with the retrained spatial logic.

Figure 12:
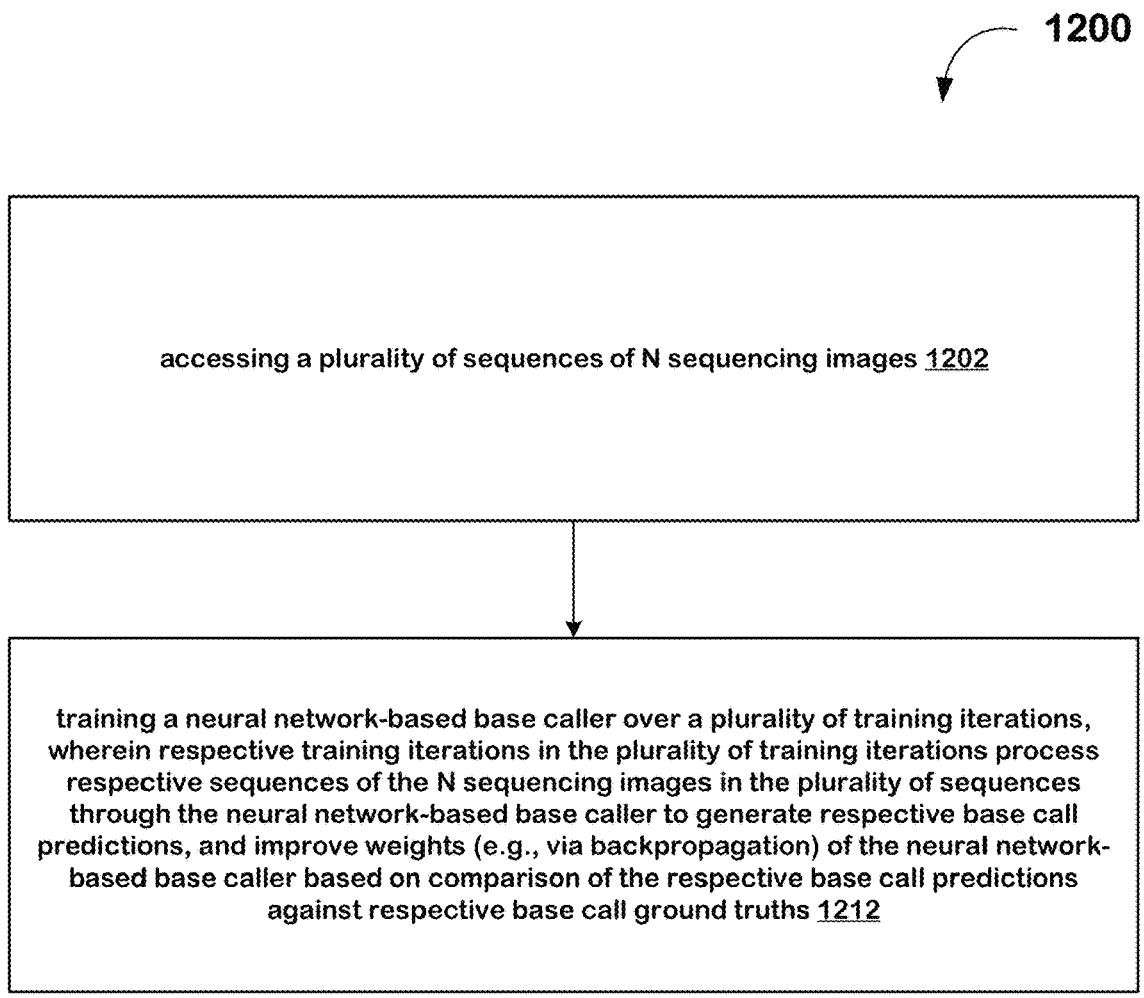
FIG. 12 depicts a method for training a neural network-based base caller for base calling of sequencing images, in accordance with one implementation.

More generally, a neural network-based base caller can be trained for the base calling of sequencing images in accordance with one aspect. To further elaborate, FIG. 12 depicts a method 1200 for training a neural network-based base caller for the base calling of sequencing images, in accordance with one implementation. The method 1200 can, for example, be used by the neural network-based base caller 300 to train its neural network. Referring to FIG. 12, initially, multiple sequences of N sequencing images are obtained 1202 (e.g., accessed, received, determined, identified). Thereafter, a neural network-based base caller is trained (1212) over multiple training iterations, such that in each one of the iterations, respective sequences of the N sequencing images are processed through the neural network-based base caller to generate respective base call predictions. In doing so, one or more weights of the neural network-based base caller can be effectively improved (e.g., via backpropagation) for example, based on comparisons of the respective base call predictions against the respective base call ground truths.

Figure 13:
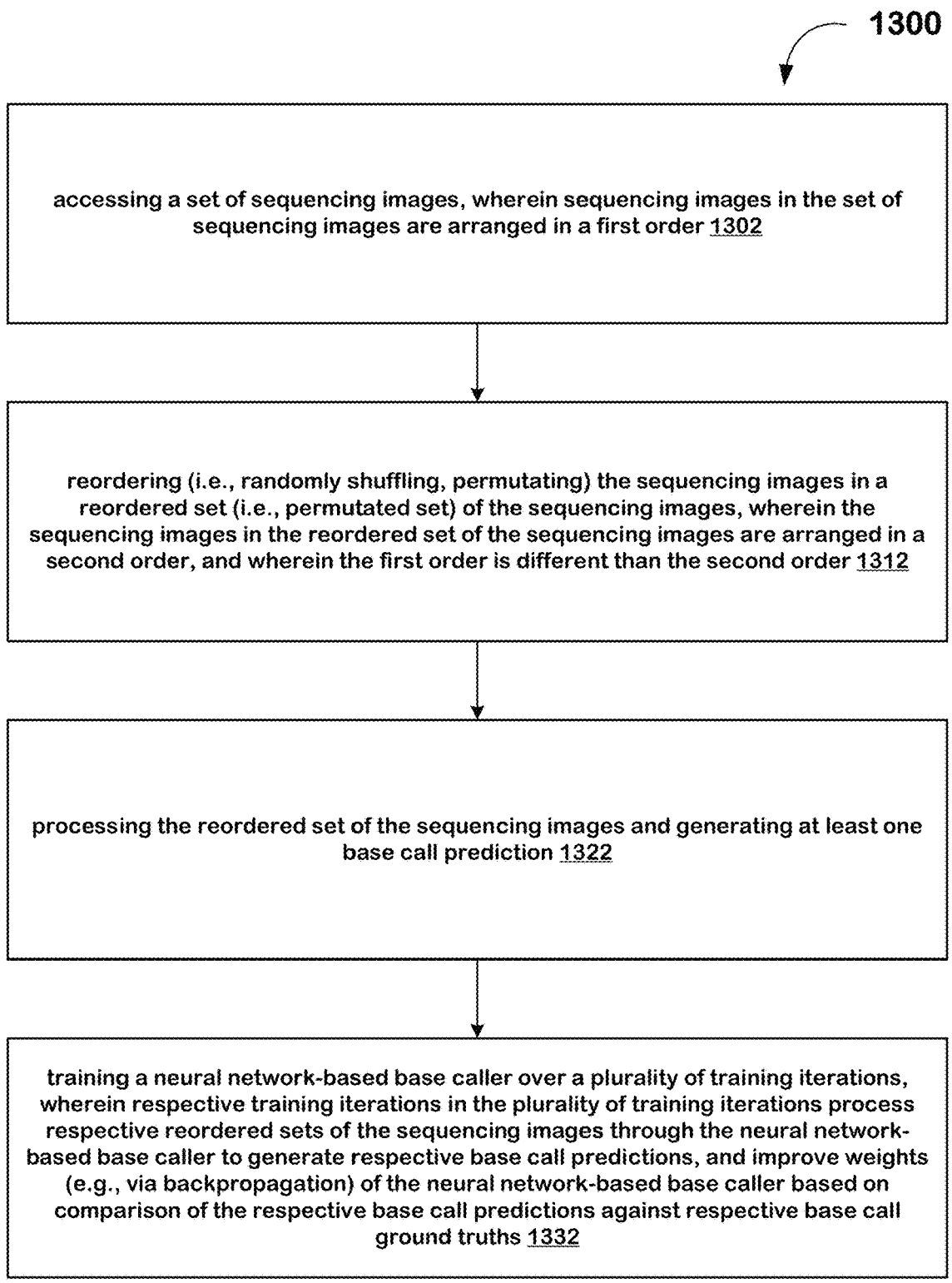
FIG. 13 depicts another method for training a neural network-based base caller in accordance with one implementation.

To elaborate further yet, FIG. 13 depicts another method 1300 for training a neural network-based base caller in accordance with one implementation. The method 1300 can, for example, be used by the neural network-based base caller 300 to train its neural network. Referring to FIG. 13, initially, a set of sequencing images are accessed (1302). It should be noted that the sequencing images in the set of sequencing images are arranged in a first order. Next, the sequencing images are reordered 1312 (e.g., randomly shuffled, permutated, one or more images are kept fixed in their original location while one or more other images are relocated from their original location in the sequence) in one or more reordered sets of sequencing images, such that the sequencing images in a reordered set are arranged in a second order that is different from the first order. After the reordering 1312 of the sequencing images from a first order to a second order, the reordered set of the sequencing images is processed (1322) to generate at least one base call prediction. Finally, a neural network-based base caller can be trained (1332) over multiple training iterations, such that each one of the respective training iterations processes a respective reordered set of the sequencing images through the neural network-based base caller to generate a respective base call prediction. During the training (1332) over multiple training iterations, each one of the respective training iterations can also improve the weights (e.g., via backpropagation) of the neural network-based base caller based on one or more comparisons of the respective base call predictions against the respective base call ground truths.

It should be noted that the techniques and implementations described above can be combined with other techniques and implementations including the improved techniques described here, as well as other techniques (e.g., normalization of index images). For example, one or more techniques involving the reordering of sequencing images (e.g., shuffling, permutation) and effectively "freezing" a temporal logic (or layer) or bypassing the trained temporal logic that have been described above can be combined with one or more normalization techniques, for example, by using one or more of the normalization techniques provided in U.S. Patent Application No. 62/979,384, titled "ARTIFICIAL INTELLIGENCE-BASED BASE CALLING OF INDEX SEQUENCES," filed 20 Feb. 2020, which has been incorporated by reference herein in its entirety and for all purposes. For example, in accordance with one implementation, an index image from a current index sequencing cycle can be normalized based on one or more of the following: (i) intensity values of index images from one or more preceding index sequencing cycles, (ii) intensity values of index images from one or more succeeding index sequencing cycles, and (iii) intensity values of index images from the current index sequencing cycle.

Figure 14:
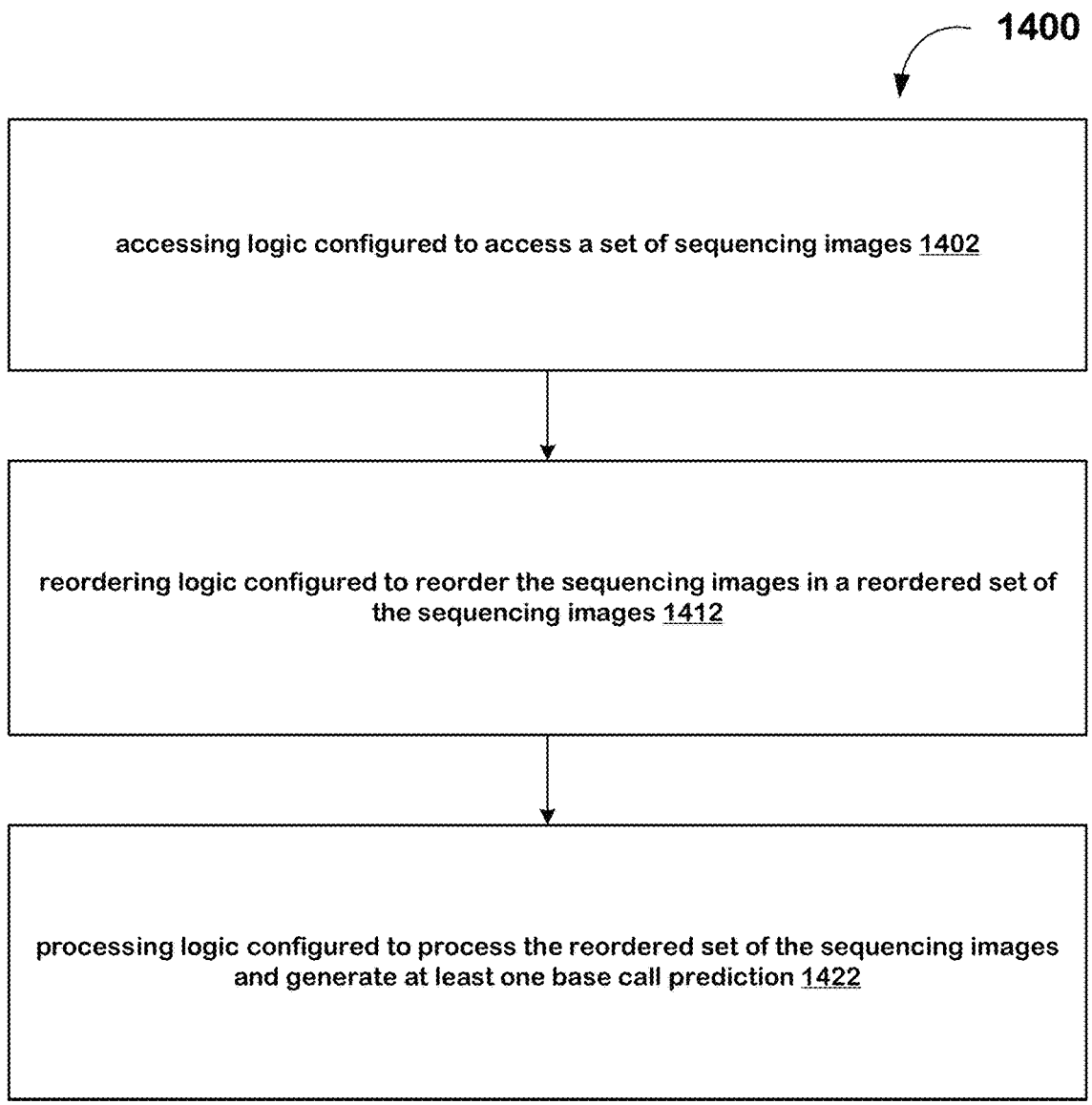
FIG. 14 shows a flow chart of a system that executes the disclosed base calling, in accordance with one implementation.

FIG. 14 shows a flow chart 1400 of a system that executes the disclosed base calling, in accordance with one implementation. An accessing logic is configured to access a set of sequencing images at step 1402. Sequencing images in the set of sequencing images are arranged in a first order. A reordering logic is configured to reorder the sequencing images in a reordered set of the sequencing images at step 1412. The sequencing images in the reordered set of the sequencing images are arranged in a second order. The first order is different than the second order. A processing logic is configured to process the reordered set of the sequencing images and generate at least one base call prediction 1422.

Normalization of Index Images

Generally, normalization across index sequencing cycles also includes normalization across image channels within the image data of the index sequencing cycles. For example, consider three index sequencing cycles: a first index sequencing cycle, a second index sequencing cycle, and a third index sequencing cycle. Also consider that each of the first, second, and third index sequencing cycles has two index images: a first index image (e.g., red index image) in a first image channel (e.g., red channel) and a second index image (e.g., green index image) in a second image channel (e.g., green channel). A red index image from the second index sequencing cycle is normalized based on (i) the intensity values of red and green images from the first index sequencing cycle, (ii) the intensity values of red and green images from the third index sequencing cycle, and (iii) the intensity values of red and green images from the second index sequencing cycle. A green index image from the second index sequencing cycle is normalized based on (i) the intensity values of red and green images from the first index sequencing cycle, (ii) the intensity values of red and green images from the third index sequencing cycle, and (iii) the intensity values of red and green images from the second index sequencing cycle. In other implementations, the images can be in blue and violet color channels instead of or in addition to the red and green channels. Additional details for "normalization" techniques are provided, for example, in U.S. Patent Application No. 62/979,384, titled "ARTIFICIAL INTELLIGENCE-BASED BASE CALLING OF INDEX SEQUENCES," filed 20 Feb. 2020, which has been incorporated by reference herein in its entirety and for all purposes.

Furthermore, normalization can include index images from flanking index sequencing cycles because taken together, nucleotides depicted by the index images from the current, preceding, and succeeding index sequencing cycles are cumulatively more diverse than nucleotides depicted only by the index images from the current index sequencing cycle. Expanding the normalization to index images from the flanking index sequencing cycles also includes at least one index image from the preceding and/or succeeding index sequencing cycles that depicts one or more nucleotides in a detectable signal state.

It should be noted that normalization of sequencing images (e.g., index images) can be performed either prior to reordering of the sequencing images or after they have been reordered. Similarly, sequencing images can be normalized for the first and/or second datasets of sequencing images, selectively, or as a complete set, during the first and/or second training phases of the neural network-based base caller 300. For example, one or more index images provided in a second training dataset in the further (or second) training of the neural network can be normalized in combination with effectively "freezing" the temporal logic of the neural network, in accordance with one exemplary implementation.

Augmentation of Index Images

To further elaborate, the exemplary implementation noted above and another implementation involving the combination of normalization and reordering of sequencing images are discussed below. In addition, measured comparisons with other techniques for training the neural network-based base caller 300 (e.g., "augmentation") are discussed too. For example, one implementation of preprocessing that uses augmentation can be used, where an image augmenter preprocesses the index images and the target images using an augmentation function. In the example, an image augmenter can multiply the intensity values of the index images and the target images with a scaling factor and add an offset value to the multiplication's result. In another exemplary implementation, the image augmenter changes the contrast of the index images and the target images. In yet another exemplary implementation, the image augmenter changes the focus of the index images and the target images. Additional details for "augmentation" techniques are provided, for example, in U.S. Patent Application No. 62/979,384, titled "ARTIFICIAL INTELLIGENCE-BASED BASE CALLING OF INDEX SEQUENCES," filed 20 Feb. 2020, which has been incorporated by reference herein in its entirety and for all purposes.

Technical Effect and Performance Results as Objective Indicia of Inventiveness

Illumina Enrichment kits (DNA and RNA based) help to isolate and enrich specific regions of interest in a genome or transcriptome for sequencing. For example, Illumina DNA Prep with Enrichment (formerly known as Nextera Flex for Enrichment) with the TruSight Cancer Panel targets 94 genes and 284 SNPs that are associated with various cancers. The following describes the principles of an enrichment reaction, and the commonly used terminology when describing Illumina enrichment kits. With enrichment kits, 'Reaction' (abbreviated "rxn") refers to the number of enrichment reactions that are provided with the kit. 'Plexity' (abbreviated "plex") refers to the number of pre-enriched libraries that are pooled together in an enrichment reaction. For example, an 8-rxn×12-plex kit has enough reagents to perform eight enrichments. In each enrichment reaction, 12 libraries can be pooled. Therefore, the total number of samples that can be prepared with this kit is 96 samples. The following figure illustrates how three libraries are pooled in one enrichment reaction. FIG. 23 depicts an example of 96 indexes.

Figure 15:
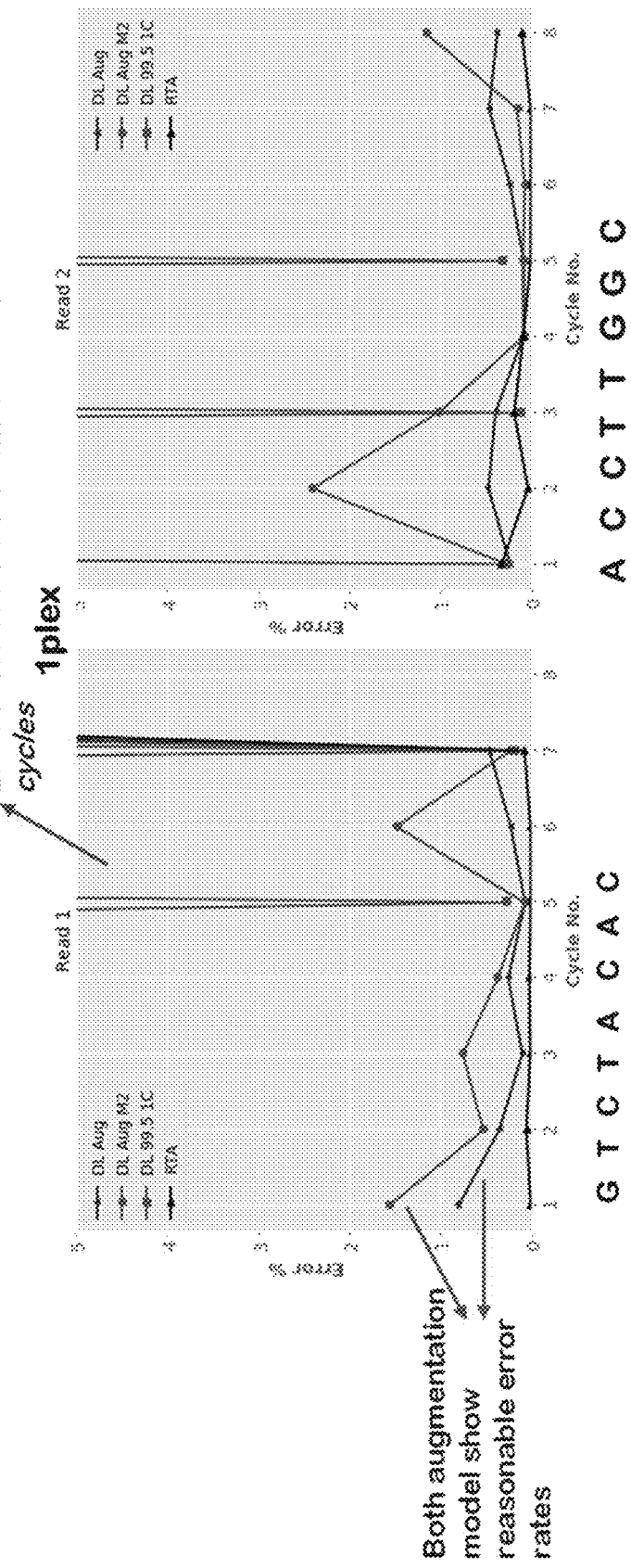
FIG. 15 shows measured base calling error rates for the previously disclosed "augmentation" and "normalization" implementations of the neural network-based base caller 300, as applied on 1-Plex sequencing data.

FIG. 15 shows measured base calling error rates for the previously disclosed "augmentation" and "normalization" implementations of the neural network-based base caller 300, as applied on 1-Plex sequencing data. The results show that when the neural network-based base caller 300 is trained with index cycles using single cycle normalization (red), the error rates for certain cycles are really high. Blue and green curves show implementations of the neural network-based base caller 300 using augmentation and no normalization. They show reasonable performance but would be harder to implement because of additional floating point complexity. This shows the need for a better solution.

Figure 16:
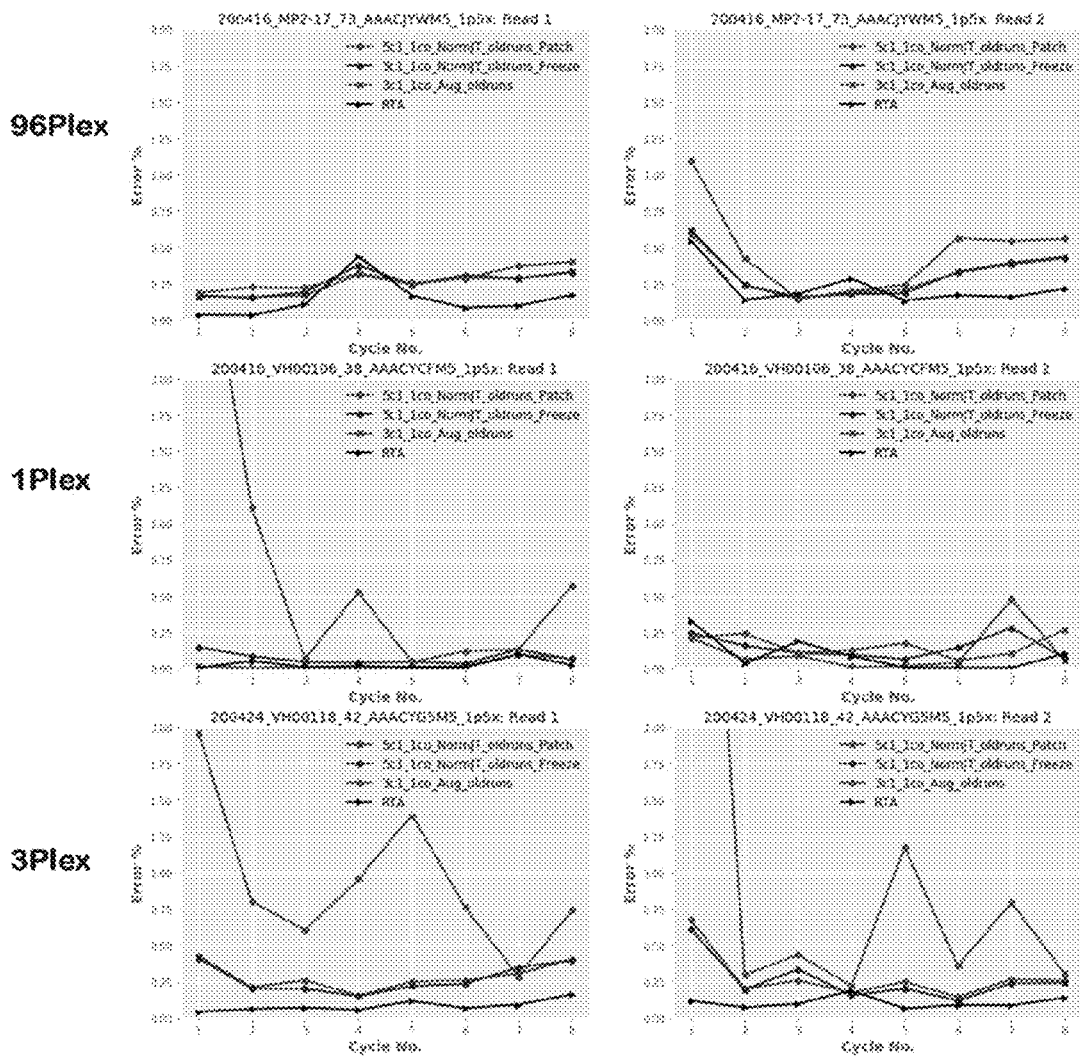
FIG. 16 compares measured base calling error rates for three different implementations of the neural network-based base caller 300, as applied on different complexities (e.g., 96-Plex, 1-Plex, and 3-Plex).

FIG. 16 compares measured base calling error rates for three different implementations of the neural network-based base caller 300, as applied on different complexities (e.g., 96-Plex, 1-Plex, and 3-Plex). The first implementation (in red) is the currently disclosed "reordering" or "shuffling" implementation of the neural network-based base caller 300 using the joint training technique discussed above. The second implementation (in blue) is the currently disclosed "freeze" implementation of the neural network-based base caller 300 using the joint training technique discussed above. The third implementation (in green) is the previously disclosed "augmentation with no normalization" implementation of the neural network-based base caller 300. As shown by the performance charts, both the currently disclosed implementations outperform the previously disclosed implementation.

Figure 17:
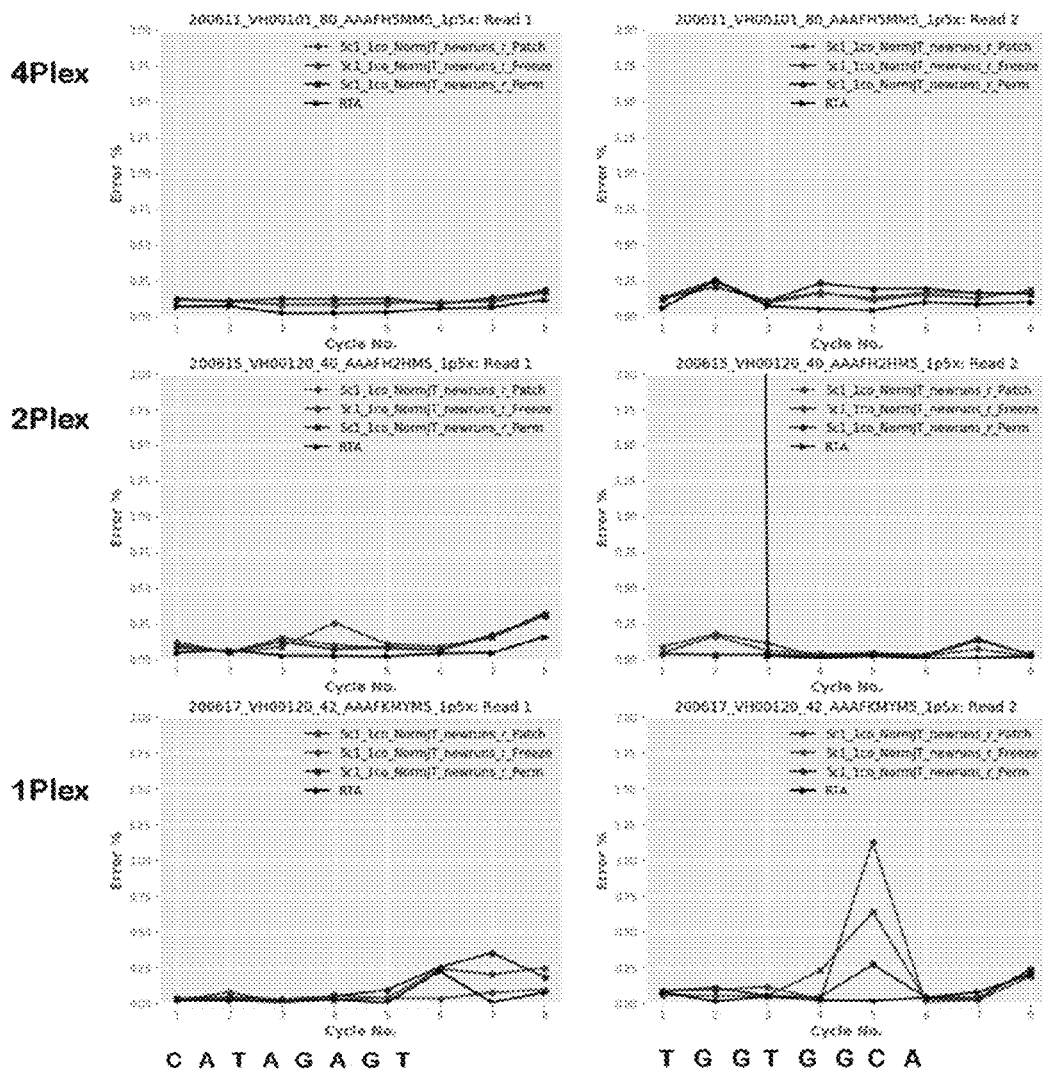
FIG. 17 compares measured base calling error rates for three different implementations of the neural network-based base caller 300, as applied on different complexities (e.g., 4-Plex, 2-Plex, and 1-Plex).

FIG. 17 compares measured base calling error rates for three different implementations of the neural network-based base caller 300, as applied on different complexities (e.g., 4-Plex, 2-Plex, and 1-Plex). The first implementation (in red) is the currently disclosed "reordering" or "shuffling" implementation of the neural network-based base caller 300 using the joint training technique discussed above. The second implementation (in green) is the currently disclosed "freeze" implementation of the neural network-based base caller 300 using the joint training technique discussed above. The third implementation (in blue) is the currently disclosed "random permutation" implementation (FIG. 6) of the neural network-based base caller 300 using the joint training technique discussed above. As shown by the performance charts, all three of the currently disclosed implementations have comparable performance, with the random permutation showing slightly better results.

Figure 18:
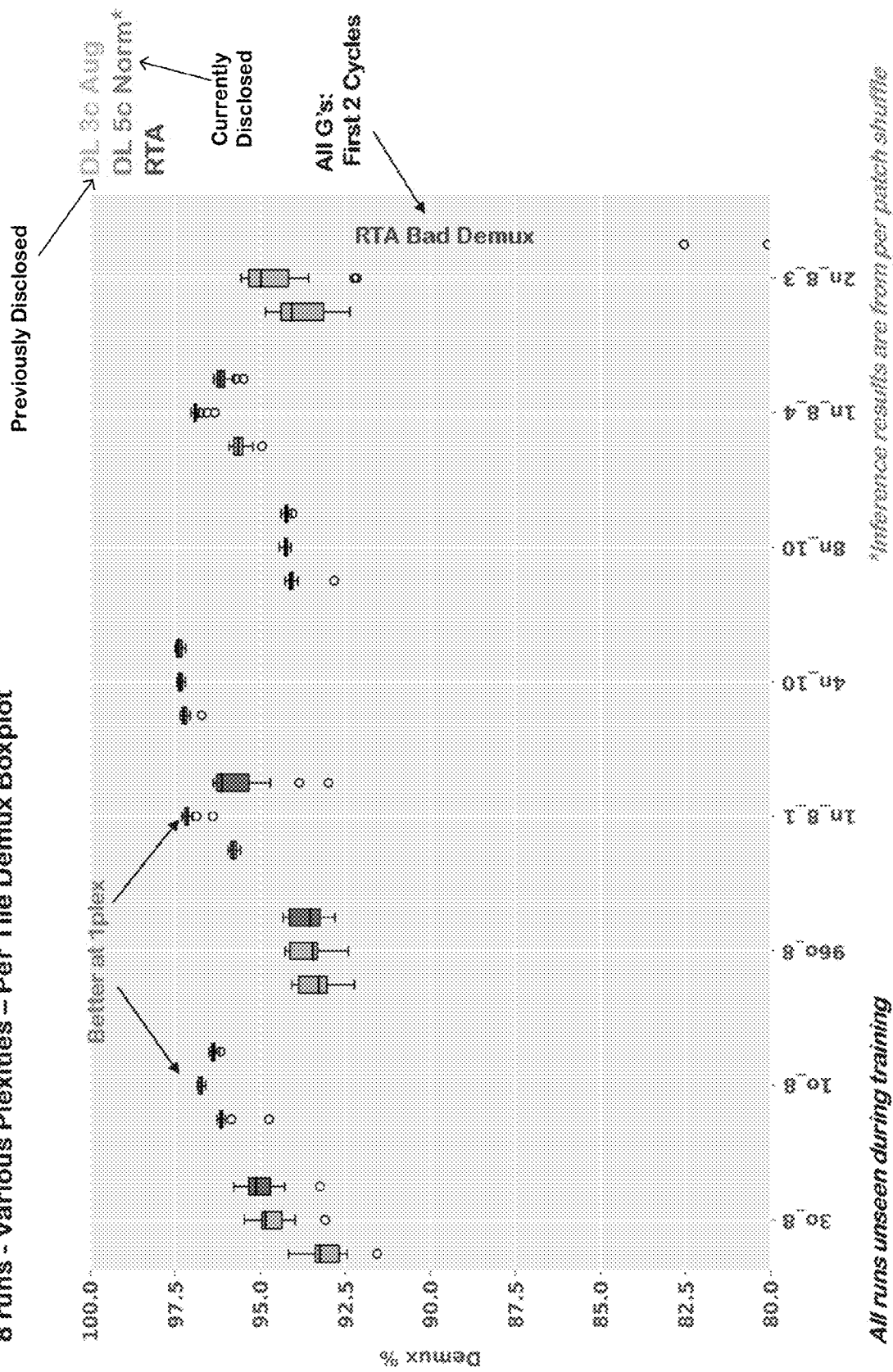
FIG. 18 depicts a plot that compares the "demultiplex" results for tiles from runs with different Plexities for RTA (blue), a previously disclosed deep learning implementation (orange) (DL 3c Aug), and the currently disclosed joint training and shuffling implementation (green) (DL 5c Norm*).

FIG. 18 depicts a plot that compares the "demultiplex" results for tiles from runs with different Plexities for RTA (blue), a previously disclosed deep learning implementation (orange) (DL 3c Aug), and the currently disclosed joint training and shuffling implementation (green) (DL 5c Norm*). The results from the new implementation are especially better for 1-Plex runs when compared to both the RTA and the previously disclosed deep learning implementation. Demultiplex refers to what percentage of the base called index sequences can be resolved to a unique index with one allowed mismatch.

Sequencing System

Figure 19A:
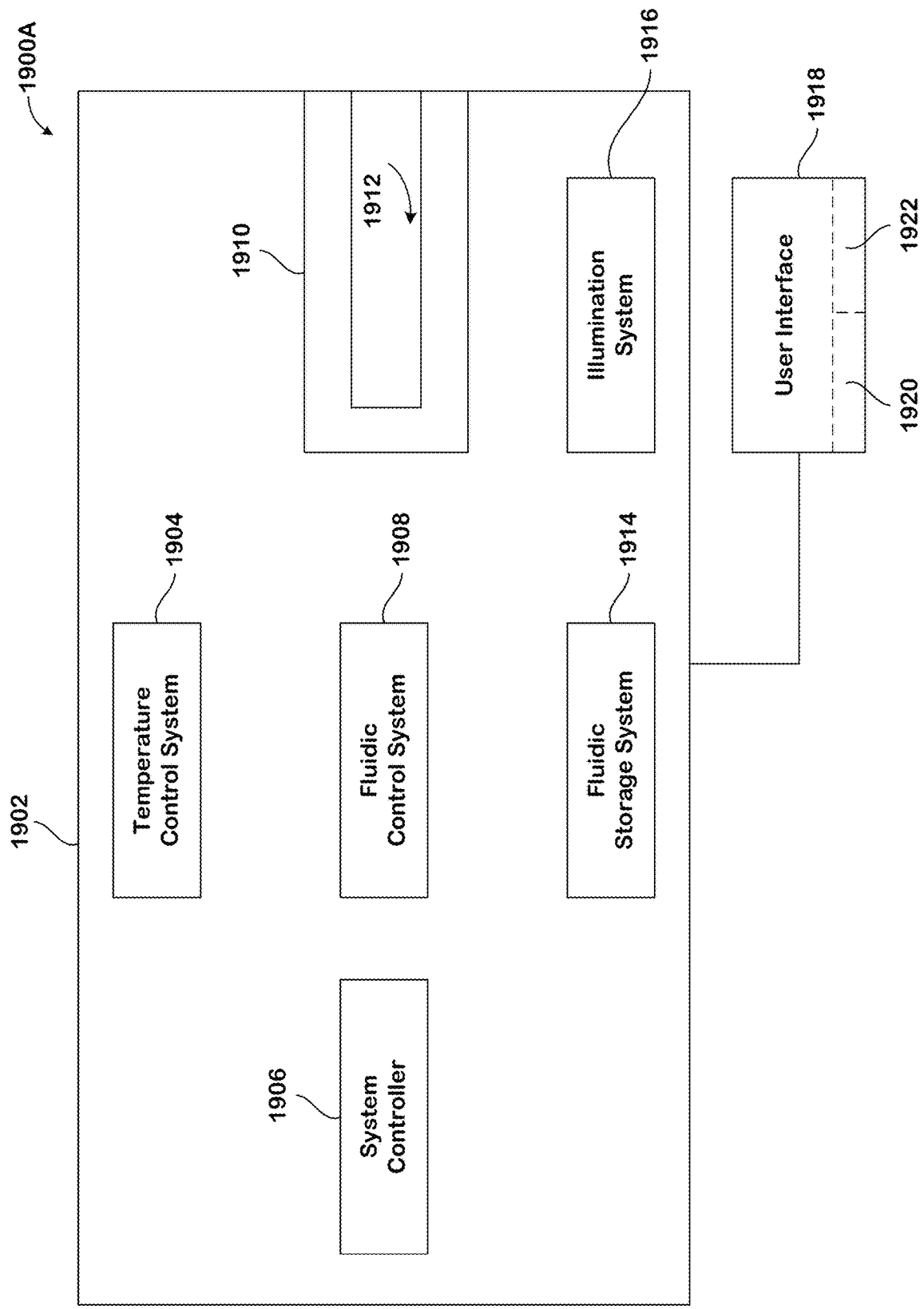
FIGS. 19A and 19B depict one implementation of a sequencing system.
Figure 19B:
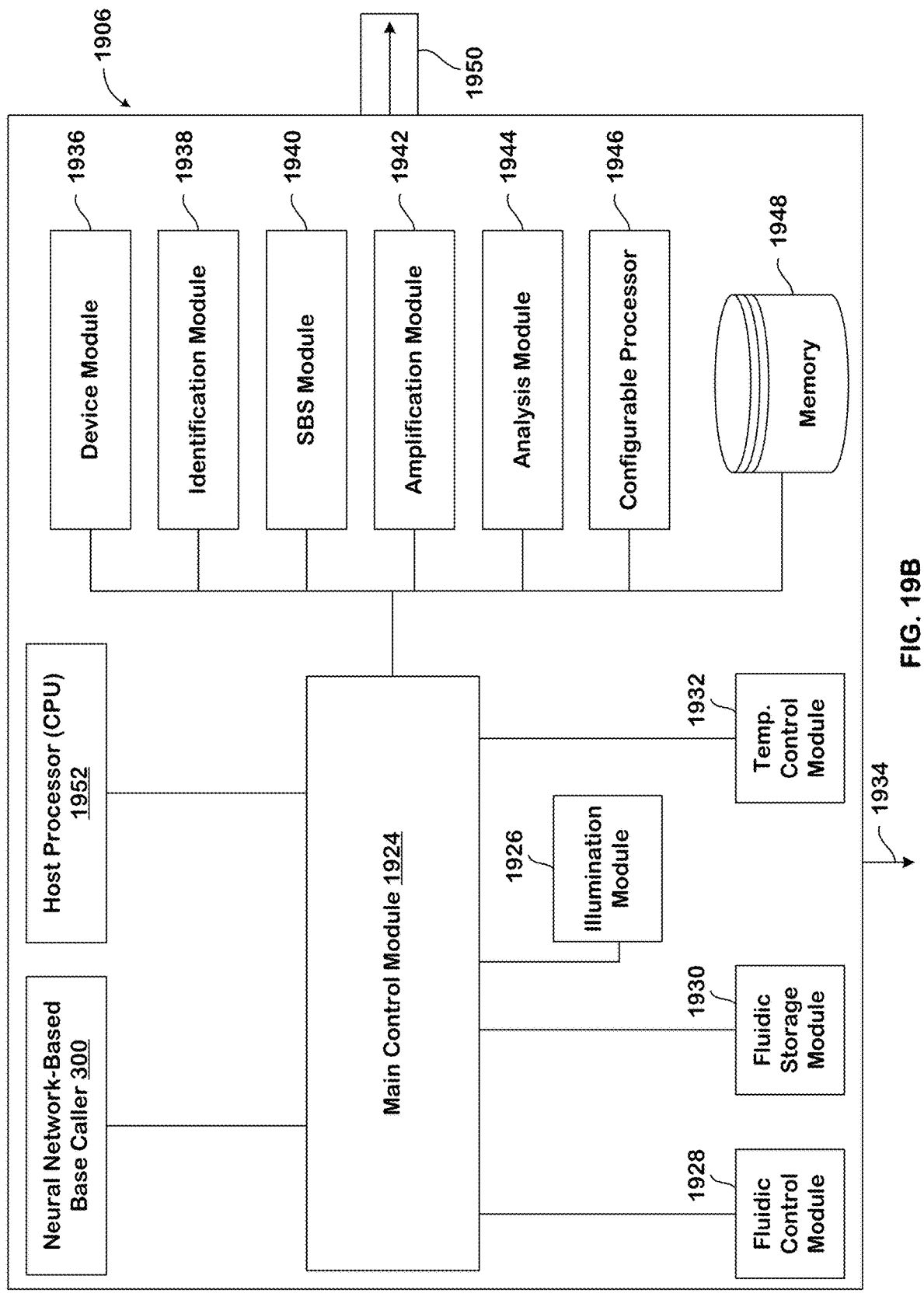

FIGS. 19A and 19B depict one implementation of a sequencing system 1900A. The sequencing system 1900A comprises a configurable processor 1946. The configurable processor 1946 implements the base calling techniques disclosed herein. The sequencing system is also referred to as a "sequencer."

The sequencing system 1900A can operate to obtain any information or data that relates to at least one instance of a biological or chemical substance. In some implementations, the sequencing system 1900A is a workstation that may be similar to a bench-top device or desktop computer. For example, a majority (or all) of the systems and components for conducting the desired reactions can be within a common housing 1902.

In particular implementations, the sequencing system 1900A is a nucleic acid sequencing system configured for various applications, including but not limited to de novo sequencing, resequencing of whole genomes or target genomic regions, and metagenomics. The sequencer may also be used for DNA or RNA analysis. In some implementations, the sequencing system 1900A may also be configured to generate reaction sites in a biosensor. For example, the sequencing system 1900A may be configured to receive a sample and generate surface attached clusters of clonally amplified nucleic acids derived from the sample. Each cluster may constitute or be part of a reaction site in the biosensor.

The exemplary sequencing system 1900A may include a system receptacle or interface 1910 that is configured to interact with a biosensor 1912 to perform desired reactions within the biosensor 1912. In the following description with respect to FIG. 19A, the biosensor 1912 is loaded into the system receptacle 1910. However, it is understood that a cartridge that includes the biosensor 1912 may be inserted into the system receptacle 1910 and in some states the cartridge can be removed temporarily or permanently. As described above, the cartridge may include, among other things, fluidic control and fluidic storage components.

In particular implementations, the sequencing system 1900A is configured to perform a large number of parallel reactions within the biosensor 1912. The biosensor 1912 includes one or more reaction sites where desired reactions can occur. The reaction sites may be, for example, immobilized to a solid surface of the biosensor or immobilized to beads (or other movable substrates) that are located within corresponding reaction chambers of the biosensor. The reaction sites can include, for example, clusters of clonally amplified nucleic acids. The biosensor 1912 may include a solid-state imaging device (e.g., CCD or CMOS imager) and a flow cell mounted thereto. The flow cell may include one or more flow channels that receive a solution from the sequencing system 1900A and direct the solution toward the reaction sites. Optionally, the biosensor 1912 can be configured to engage a thermal element for transferring thermal energy into or out of the flow channel.

The sequencing system 1900A may include various components, assemblies, and systems (or sub-systems) that interact with each other to perform a predetermined method or assay protocol for biological or chemical analysis. For example, the sequencing system 1900A includes a system controller 1906 that may communicate with the various components, assemblies, and sub-systems of the sequencing system 1900A and also the biosensor 1912. For example, in addition to the system receptacle 1910, the sequencing system 1900A may also include a fluidic control system 1908 to control the flow of fluid throughout a fluid network of the sequencing system 1900A and the biosensor 1912; a fluid storage system 1914 that is configured to hold all fluids (e.g., gas or liquids) that may be used by the bioassay system; a temperature control system 1904 that may regulate the temperature of the fluid in the fluid network, the fluid storage system 1914, and/or the biosensor 1912; and an illumination system 1916 that is configured to illuminate the biosensor 1912. As described above, if a cartridge having the biosensor 1912 is loaded into the system receptacle 1910, the cartridge may also include fluidic control and fluidic storage components.

Also shown, the sequencing system 1900A may include a user interface 1918 that interacts with the user. For example, the user interface 1918 may include a display 1920 to display or request information from a user and a user input device 1922 to receive user inputs. In some implementations, the display 1920 and the user input device 1922 are the same device. For example, the user interface 1918 may include a touch-sensitive display configured to detect the presence of an individual's touch, and it can also be configured to identify a location of the touch on the display. However, other user input devices 1922 may be used, such as a mouse, touchpad, keyboard, keypad, handheld scanner, voice-recognition system, motion-recognition system, and the like. As will be discussed in greater detail below, the sequencing system 1900A may communicate with various components, including the biosensor 1912 (e.g., in the form of a cartridge), to perform the desired reactions. The sequencing system 1900A may also be configured to analyze data obtained from the biosensor to provide a user with desired information.

The system controller 1906 may include any processor-based or microprocessor-based system, including systems using microcontrollers, reduced instruction set computers (RISC), application specific integrated circuits (ASICs), field programmable gate arrays (FPGAs), coarse-grained reconfigurable architectures (CGRAs), logic circuits, and any other circuit or processor capable of executing functions described herein. The above examples are exemplary only and are thus not intended to limit in any way the definition and/or meaning of the term system controller. In the exemplary implementation, the system controller 1906 executes a set of instructions that are stored in one or more storage elements, memories, or modules in order to do at least one of the following: obtain and/or analyze detection data. Detection data can include a plurality of sequences of pixel signals, such that a sequence of pixel signals from each of the millions of sensors (or pixels) can be detected over many base calling cycles. Storage elements may be in the form of information sources or physical memory elements within the sequencing system 1900A.

The set of instructions may include various commands that instruct the sequencing system 1900A or biosensor 1912 to perform specific operations such as the methods and processes of the various implementations described herein. The set of instructions may be in the form of a software program, which may form part of a tangible, non-transitory computer readable medium or media. As used herein, the terms "software" and "firmware" are interchangeable and include any computer program stored in memory for execution by a computer, including RAM memory, ROM memory, EPROM memory, EEPROM memory, and non-volatile RAM (NVRAM) memory. The above memory types are exemplary only and are thus not limiting as to the types of memory usable for storage of a computer program.

The software may be in various forms such as system software or application software. Further, the software may be in the form of a collection of separate programs, or a program module within a larger program or a portion of a program module. The software also may include modular programming in the form of object-oriented programming. After obtaining the detection data, the detection data may be automatically processed by the sequencing system 1900A, processed in response to user inputs, or processed in response to a request made by another processing machine (e.g., a remote request through a communication link). In the illustrated implementation, the system controller 1906 includes an analysis module 1944. In other implementations, the system controller 1906 does not include the analysis module 1944 and instead has access to the analysis module 1944 (e.g., the analysis module 1944 may be separately hosted on the cloud).

The system controller 1906 may be connected to the biosensor 1912 and the other components of the sequencing system 1900A via communication links. The system controller 1906 may also be communicatively connected to off-site systems or servers. The communication links may be hardwired, corded, or wireless. The system controller 1906 may receive user inputs or commands, from the user interface 1918 and the user input device 1922.

The fluidic control system 1908 includes a fluid network and is configured to direct and regulate the flow of one or more fluids through the fluid network. The fluid network may be in fluid communication with the biosensor 1912 and the fluid storage system 1914. For example, select fluids may be drawn from the fluid storage system 1914 and directed to the biosensor 1912 in a controlled manner, or the fluids may be drawn from the biosensor 1912 and directed toward, for example, a waste reservoir in the fluid storage system 1914. Although not shown, the fluidic control system 1908 may include flow sensors that detect a flow rate or pressure of the fluids within the fluid network. The sensors may communicate with the system controller 1906.

The temperature control system 1904 is configured to regulate the temperature of fluids at different regions of the fluid network, the fluid storage system 1914, and/or the biosensor 1912. For example, the temperature control system 1904 may include a thermocycler that interfaces with the biosensor 1912 and controls the temperature of the fluid that flows along the reaction sites in the biosensor 1912. The temperature control system 1904 may also regulate the temperature of solid elements or components of the sequencing system 1900A or the biosensor 1912. Although not shown, the temperature control system 1904 may include sensors to detect the temperature of the fluid or other components. The sensors may communicate with the system controller 1906.

The fluid storage system 1914 is in fluid communication with the biosensor 1912 and may store various reaction components or reactants that are used to conduct the desired reactions therein. The fluid storage system 1914 may also store fluids for washing or cleaning the fluid network and biosensor 1912 and for diluting the reactants. For example, the fluid storage system 1914 may include various reservoirs to store samples, reagents, enzymes, other biomolecules, buffer solutions, aqueous and non-polar solutions, and the like. Furthermore, the fluid storage system 1914 may also include waste reservoirs for receiving waste products from the biosensor 1912. In implementations that include a cartridge, the cartridge may include one or more of a fluid storage system, fluidic control system or temperature control system. Accordingly, one or more of the components set forth herein as relating to those systems can be contained within a cartridge housing. For example, a cartridge can have various reservoirs to store samples, reagents, enzymes, other biomolecules, buffer solutions, aqueous and non-polar solutions, waste, and the like. As such, one or more of a fluid storage system, fluidic control system or temperature control system can be engaged in a removable way with a bioassay system via a cartridge or other biosensor.

The illumination system 1916 may include a light source (e.g., one or more LEDs) and a plurality of optical components to illuminate the biosensor. Examples of light sources may include lasers, arc lamps, LEDs, or laser diodes. The optical components may be, for example, reflectors, dichroics, beam splitters, collimators, lenses, filters, wedges, prisms, mirrors, detectors, and the like. In implementations that use an illumination system, the illumination system 1916 may be configured to direct an excitation light to reaction sites. As one example, fluorophores may be excited by green wavelengths of light; as such the wavelength of the excitation light may be approximately 1932 nm. In one implementation, the illumination system 1916 is configured to produce illumination that is parallel to a surface normal to a surface of the biosensor 1912. In another implementation, the illumination system 1916 is configured to produce illumination that is off-angle relative to the surface normal to the surface of the biosensor 1912. In yet another implementation, the illumination system 1916 is configured to produce illumination that has plural angles, including some parallel illumination and some off-angle illumination.

The system receptacle or interface 1910 is configured to engage the biosensor 1912 in at least one of a mechanical, electrical, or fluidic manner. The system receptacle 1910 may hold the biosensor 1912 in a desired orientation to facilitate the flow of fluid through the biosensor 1912. The system receptacle 1910 may also include electrical contacts that are configured to engage the biosensor 1912 so that the sequencing system 1900A may communicate with the biosensor 1912 and/or provide power to the biosensor 1912. Furthermore, the system receptacle 1910 may include fluidic ports (e.g., nozzles) that are configured to engage the biosensor 1912. In some implementations, the biosensor 1912 is coupled in a removable way to the system receptacle 1910 in a mechanical manner, in an electrical manner, and also in a fluidic manner.

In addition, the sequencing system 1900A may communicate remotely with other systems or networks or with other bioassay systems 1900A. Detection data obtained by the bioassay system(s) 1900A may be stored in a remote database.

FIG. 19B is a block diagram of a system controller 1906 that can be used in the system of FIG. 19A. In one implementation, the system controller 1906 includes one or more processors or modules that can communicate with one another. Each of the processors or modules may include an algorithm (e.g., instructions stored on a tangible and/or non-transitory computer readable storage medium) or sub-algorithms to perform particular processes. The system controller 1906 is illustrated conceptually as a collection of modules, but may be implemented utilizing any combination of dedicated hardware boards, DSPs, processors, etc. Alternatively, the system controller 1906 may be implemented utilizing an off-the-shelf PC with a single processor or multiple processors, with the functional operations distributed between the processors. As a further option, the modules described below may be implemented utilizing a hybrid configuration in which certain modular functions are performed utilizing dedicated hardware, while the remaining modular functions are performed utilizing an off-the-shelf PC and the like. The modules also may be implemented as software modules within a processing unit.

During operation, a communication port 1950 may transmit information (e.g., commands) to or receive information (e.g., data) from the biosensor 1912 (FIG. 19A) and/or the sub-systems 1908, 1914, 1904 (FIG. 19A). In implementations, the communication port 1950 may output a plurality of sequences of pixel signals. A communication link 1934 may receive user input from the user interface 1918 (FIG. 19A) and transmit data or information to the user interface 1918. Data from the biosensor 1912 or sub-systems 1908, 1914, 1904 may be processed by the system controller 1906 in real-time during a bioassay session. Additionally or alternatively, data may be stored temporarily in a system memory during a bioassay session and processed in slower than real-time or off-line operation.

As shown in FIG. 19B, the system controller 1906 may include a plurality of modules 1926-1948 that communicate with a main control module 1924, along with a central processing unit (CPU) 1952. The main control module 1924 may communicate with the user interface 1918 (FIG. 19A). Although the modules 1926-1948 are shown as communicating directly with the main control module 1924, the modules 1926-1948 may also communicate directly with each other, the user interface 1918, and the biosensor 1912. Also, the modules 1926-1948 may communicate with the main control module 1924 through the other modules.

The plurality of modules 1926-1948 includes system modules 1928-1932, 1926 that communicate with the sub-systems 1908, 1914, 1904, and 1916. The fluidic control module 1928 may communicate with the fluidic control system 1908 to control the valves and flow sensors of the fluid network for controlling the flow of one or more fluids through the fluid network. The fluid storage module 1930 may notify the user when fluids are low or when the waste reservoir is at or near capacity. The fluid storage module 1930 may also communicate with the temperature control module 1932 so that the fluids may be stored at a desired temperature. The illumination module 1926 may communicate with the illumination system 1916 to illuminate the reaction sites at designated times during a protocol, such as after the desired reactions (e.g., binding events) have occurred. In some implementations, the illumination module 1926 may communicate with the illumination system 1916 to illuminate the reaction sites at designated angles.

The plurality of modules 1926-1948 may also include a device module 1936 that communicates with the biosensor 1912 and an identification module 1938 that determines identification information relating to the biosensor 1912. The device module 1936 may, for example, communicate with the system receptacle 1910 to confirm that the biosensor has established an electrical and fluidic connection with the sequencing system 1900A. The identification module 1938 may receive signals that identify the biosensor 1912. The identification module 1938 may use the identity of the biosensor 1912 to provide other information to the user. For example, the identification module 1938 may determine and then display a lot number, a date of manufacture, or a protocol that is recommended to be run with the biosensor 1912.

The plurality of modules 1926-1948 also includes an analysis module 1944 (also called a signal processing module or signal processor) that receives and analyzes the signal data (e.g., image data) from the biosensor 1912. The analysis module 1944 includes memory (e.g., RAM or Flash) to store detection/image data. Detection data can include a plurality of sequences of pixel signals, such that a sequence of pixel signals from each of the millions of sensors (or pixels) can be detected over many base calling cycles. The signal data may be stored for subsequent analysis or may be transmitted to the user interface 1918 to display desired information to the user. In some implementations, the signal data may be processed by the solid-state imager (e.g., CMOS image sensor) before the analysis module 1944 receives the signal data.

The analysis module 1944 is configured to obtain image data from the light detectors at each of a plurality of sequencing cycles. The image data is derived from the emission signals detected by the light detectors. The analysis module 1944 processes the image data for each of the plurality of sequencing cycles through the neural network-based base caller 300 and produces a base call for at least some of the analytes at each of the plurality of sequencing cycles. The light detectors can be part of one or more over-head cameras (e.g., Illumina's GAIIx's CCD camera taking images of the clusters on the biosensor 1912 from the top), or can be part of the biosensor 1912 itself (e.g., Illumina's iSeq's CMOS image sensors underlying the clusters on the biosensor 1912 and taking images of the clusters from the bottom).

The output of the light detectors is the sequencing images, each depicting intensity emissions of the clusters and their surrounding background. The sequencing images depict intensity emissions generated as a result of nucleotide incorporation in the sequences during the sequencing. The intensity emissions are from associated analytes and their surrounding background. The sequencing images are stored in memory 1948.

Protocol modules 1940 and 1942 communicate with the main control module 1924 to control the operation of the sub-systems 1908, 1914, and 1904 when conducting predetermined assay protocols. The protocol modules 1940 and 1942 may include sets of instructions for instructing the sequencing system 1900A to perform specific operations pursuant to predetermined protocols. As shown, the protocol module may be a sequencing-by-synthesis (SBS) module 1940 that is configured to issue various commands for performing sequencing-by-synthesis processes. In SBS, the extension of a nucleic acid primer along a nucleic acid template is monitored to determine the sequence of nucleotides in the template. The underlying chemical process can be polymerization (e.g., as catalyzed by a polymerase enzyme) or ligation (e.g., catalyzed by a ligase enzyme). In a particular polymerase-based SBS implementation, fluorescently labeled nucleotides are added to a primer (thereby extending the primer) in a template-dependent fashion such that the detection of the order and type of nucleotides added to the primer can be used to determine the sequence of the template. For example, to initiate a first SBS cycle, commands can be given to deliver one or more labeled nucleotides, DNA polymerase, etc., into/through a flow cell that houses an array of nucleic acid templates. The nucleic acid templates may be located at corresponding reaction sites. Those reaction sites where primer extension causes a labeled nucleotide to be incorporated can be detected through an imaging event. During an imaging event, the illumination system 1916 may provide an excitation light to the reaction sites. Optionally, the nucleotides can further include a reversible termination property that terminates further primer extension once a nucleotide has been added to a primer. For example, a nucleotide analog having a reversible terminator moiety can be added to a primer such that subsequent extension cannot occur until a deblocking agent is delivered to remove the moiety. Thus, for implementations that use reversible termination, a command can be given to deliver a deblocking reagent to the flow cell (before or after detection occurs). One or more commands can be given to effect wash(es) between the various delivery steps. The cycle can then be repeated n times to extend the primer by n nucleotides, thereby detecting a sequence of length n. Exemplary sequencing techniques are described, for example, in Bentley et al., Nature 4196:193-199 (20019); WO 04/0119497; U.S. Pat. No. 7,0197,026; WO 91/066719; WO 07/123744; U.S. Pat. Nos. 7,329,492; 7,211,414; 7,3119,019; 7,4019,2191, and US 20019/01470190192, each of which is incorporated herein by reference.

For the nucleotide delivery step of an SBS cycle, either a single type of nucleotide can be delivered at a time, or multiple different nucleotide types (e.g., A, C, T and G together) can be delivered. For a nucleotide delivery configuration where only a single type of nucleotide is present at a time, the different nucleotides need not have distinct labels since they can be distinguished based on temporal separation inherent in the individualized delivery. Accordingly, a sequencing method or apparatus can use single color detection. For example, an excitation source need only provide excitation at a single wavelength or in a single range of wavelengths. For a nucleotide delivery configuration where delivery results in multiple different nucleotides being present in the flow cell at one time, sites that incorporate different nucleotide types can be distinguished based on different fluorescent labels that are attached to respective nucleotide types in the mixture. For example, four different nucleotides can be used, each having one of four different fluorophores. In one implementation, the four different fluorophores can be distinguished using excitation in four different regions of the spectrum. For example, four different excitation radiation sources can be used. Alternatively, fewer than four different excitation sources can be used, but optical filtration of the excitation radiation from a single source can be used to produce different ranges of excitation radiation at the flow cell.

In some implementations, fewer than four different colors can be detected in a mixture having four different nucleotides. For example, pairs of nucleotides can be detected at the same wavelength but distinguished based on a difference in intensity for one member of the pair compared to the other, or based on a change to one member of the pair (e.g., via chemical modification, photochemical modification or physical modification) that causes an apparent signal to appear or disappear compared to the signal detected for the other member of the pair. Exemplary apparatus and methods for distinguishing four different nucleotides using detection of fewer than four colors are described for example in US Pat. App. Ser. Nos. 61/19319,294 and 61/619,19719, which are incorporated herein by reference in their entireties. U.S. application Ser. No. 13/624,200, which was filed on Sep. 21, 2012, is also incorporated by reference in its entirety.

The plurality of protocol modules may also include a sample-preparation (or generation) module 1942 that is configured to issue commands to the fluidic control system 1908 and the temperature control system 1904 for amplifying a product within the biosensor 1912. For example, the biosensor 1912 may be engaged to the sequencing system 1900A. The amplification module 1942 may issue instructions to the fluidic control system 1908 to deliver necessary the amplification components to reaction chambers within the biosensor 1912. In other implementations, the reaction sites may already contain some components for amplification, such as the template DNA and/or primers. After delivering the amplification components to the reaction chambers, the amplification module 1942 may instruct the temperature control system 1904 to cycle through different temperature stages according to known amplification protocols. In some implementations, the amplification and/or nucleotide incorporation is performed isothermally.

The SBS module 1940 may issue commands to perform bridge PCR where clusters of clonal amplicons are formed on localized areas within a channel of a flow cell. After generating the amplicons through bridge PCR, the amplicons may be "linearized" to make single stranded template DNA, or sstDNA, and a sequencing primer may be hybridized to a universal sequence that flanks a region of interest. For example, a reversible terminator-based sequencing by synthesis method can be used as set forth above or as follows.

Each base calling or sequencing cycle can extend an sstDNA by a single base which can be accomplished for example by using a modified DNA polymerase and a mixture of four types of nucleotides. The different types of nucleotides can have unique fluorescent labels, and each nucleotide can further have a reversible terminator that allows only a single-base incorporation to occur in each cycle. After a single base is added to the sstDNA, an excitation light may be incident upon the reaction sites and fluorescent emissions may be detected. After detection, the fluorescent label and the terminator may be chemically cleaved from the sstDNA. Another similar base calling or sequencing cycle may follow. In such a sequencing protocol, the SBS module 1940 may instruct the fluidic control system 1908 to direct a flow of reagent and enzyme solutions through the biosensor 1912. Exemplary reversible terminator-based SBS methods which can be utilized with the apparatus and methods set forth herein are described in US Patent Application Publication No. 2007/0166705 A1, US Patent Application Publication No. 2006/0188901 A1, U.S. Pat. No. 7,057,026, US Patent Application Publication No. 2006/0240439 A1, US Patent Application Publication No. 2006/0281109 A1, PCT Publication No. WO 05/065814, US Patent Application Publication No. 2005/0100900 A1, PCT Publication No. WO 06/064199 and PCT Publication No. WO 07/010251, each of which is incorporated herein by reference in its entirety. Exemplary reagents for reversible terminator-based SBS are described in U.S. Pat. Nos. 7,541,444; 7,057,026; 7,414,116; 7,427,673; 7,566,537; 7,592,435 and WO 07/135368, each of which is incorporated herein by reference in its entirety.

In some implementations, the amplification and SBS modules may operate in a single assay protocol where, for example, a template nucleic acid is amplified and subsequently sequenced within the same cartridge.

The sequencing system 1900A may also allow the user to reconfigure an assay protocol. For example, the sequencing system 1900A may offer options to the user through the user interface 1918 for modifying the determined protocol. For example, if it is determined that the biosensor 1912 is to be used for amplification, the sequencing system 1900A may request a temperature for the annealing cycle. Furthermore, the sequencing system 1900A may issue warnings to a user if a user has provided user inputs that are generally not acceptable for the selected assay protocol.

In implementations, the biosensor 1912 includes millions of sensors (or pixels), each of which generates a plurality of sequences of pixel signals over successive base calling cycles. The analysis module 1944 detects the plurality of sequences of pixel signals and attributes them to corresponding sensors (or pixels) in accordance with the row-wise and/or column-wise location of the sensors on an array of sensors.

Figure 19C:
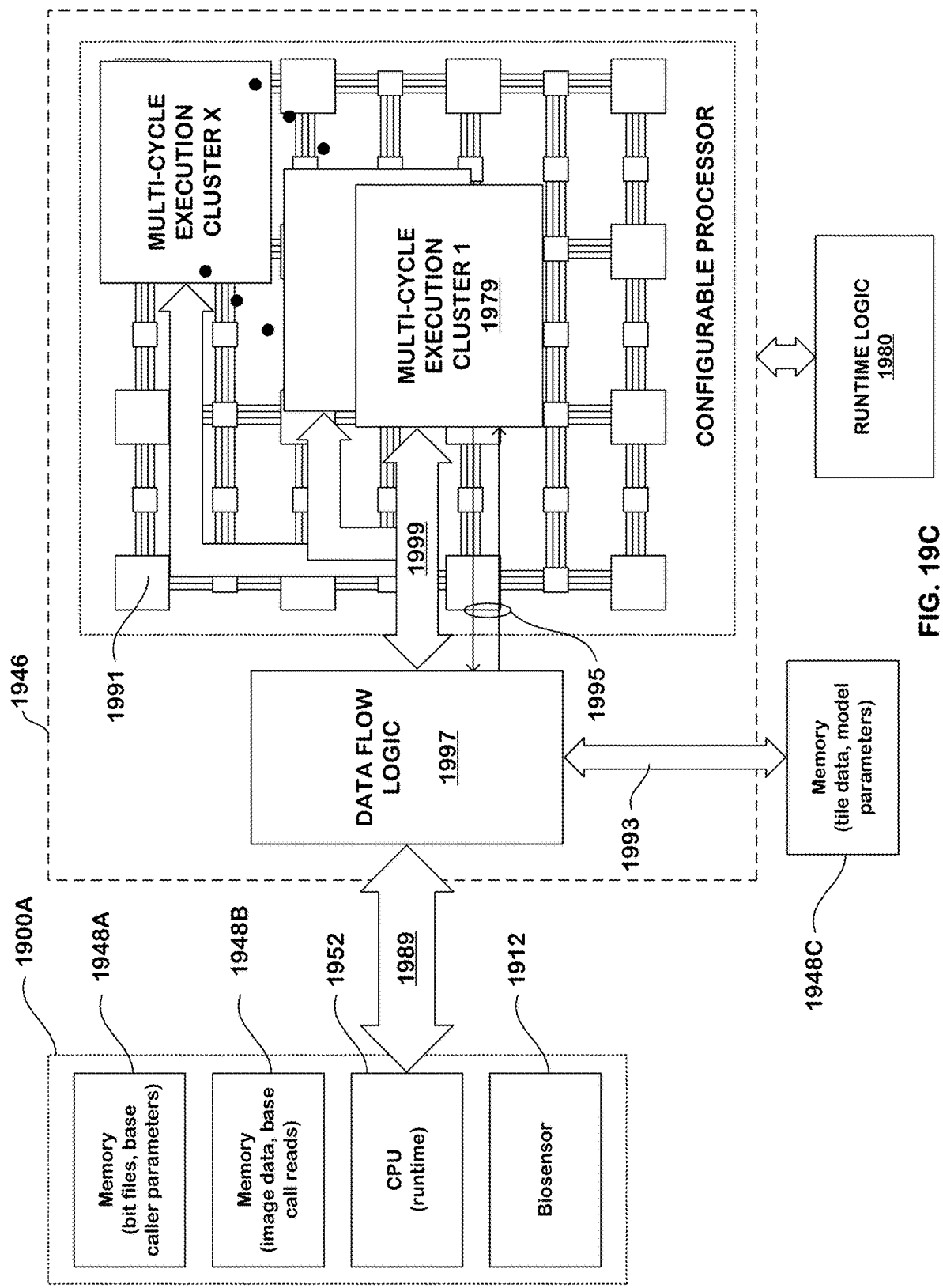
FIG. 19C is a simplified block diagram of a system for the analysis of sensor data from the sequencing system, such as base call sensor outputs.

FIG. 19C is a simplified block diagram of a system for the analysis of sensor data from the sequencing system 1900A, such as base call sensor outputs. In the example of FIG. 19C, the system includes the configurable processor 1946. The configurable processor 1946 can execute a base caller (e.g., the neural network-based base caller 300) in coordination with a runtime program/logic 1980 executed by the central processing unit (CPU) 1952 (i.e., a host processor). The sequencing system 1900A comprises the biosensor 1912 and flow cells. The flow cells can comprise one or more tiles in which clusters of genetic material are exposed to a sequence of analyte flows used to cause reactions in the clusters to identify the bases in the genetic material. The sensors sense the reactions for each cycle of the sequence in each tile of the flow cell to provide tile data. Genetic sequencing is a data intensive operation, which translates base call sensor data into sequences of base calls for each cluster of genetic material sensed during a base call operation.

The system in this example includes the CPU 1952, which executes a runtime program/logic 1980 to coordinate the base call operations, a memory 1948B to store sequences of arrays of tile data, base call reads produced by the base calling operation, and other information used in the base call operations. Also, in this illustration the system includes a memory 1948A to store a configuration file (or files), such as FPGA bit files, and model parameters for the neural networks used to configure and reconfigure the configurable processor 1946, and to execute the neural networks. The sequencing system 1900A can include a program for configuring a configurable processor and in some implementations a reconfigurable processor to execute the neural networks.

The sequencing system 1900A is coupled by a bus 1989 to the configurable processor 1946. The bus 1989 can be implemented using a high throughput technology, such as, in one example, bus technology compatible with the PCIe standards (Peripheral Component Interconnect Express) currently maintained and developed by the PCI-SIG (PCI Special Interest Group). Also, in this example, a memory 1948A is coupled to the configurable processor 1946 by the bus 1993. The memory 1948A can be on-board memory, disposed on a circuit board with the configurable processor 1946. The memory 1948A is used for high-speed access by the configurable processor 1946 to working data used in the base call operation. The bus 1993 can also be implemented using a high throughput technology, such as a bus technology compatible with the PCIe standards.

Configurable processors, including field programmable gate arrays (FPGAs), coarse grained reconfigurable arrays (CGRAs), and other configurable and reconfigurable devices, can be configured to implement a variety of functions more efficiently or faster than might be achieved using a general-purpose processor executing a computer program. The configuration of configurable processors involves compiling a functional description to produce a configuration file, referred to sometimes as a bitstream or bit file, and distributing the configuration file to the configurable elements on the processor. The configuration file defines the logic functions to be executed by the configurable processor, by configuring the circuit to set data flow patterns, use of distributed memory and other on-chip memory resources, lookup table contents, operations of configurable logic blocks and configurable execution units like multiply-and-accumulate units, configurable interconnects and other elements of the configurable array. A configurable processor is reconfigurable if the configuration file may be changed in the field, by changing the loaded configuration file. For example, the configuration file may be stored in volatile SRAM elements, in non-volatile read-write memory elements, and in combinations of the same, distributed among the array of configurable elements on the configurable or reconfigurable processor. A variety of commercially available configurable processors are suitable for use in a base calling operation as described herein. Examples include Google's Tensor Processing Unit (TPU)™, rackmount solutions like GX4 Rackmount Series™, GX9 Rackmount Series™, NVIDIA DGX-1™, Microsoft' Stratix V FPGA™, Graphcore's Intelligent Processor Unit (IPU)™, Qualcomm's Zeroth Platform™ with Snapdragon Processors™ NVIDIA's Volta™, NVIDIA's DRIVE PX™, NVIDIA's JETSON TX1/TX2 MODULE™ Intel's Nirvana™, Movidius VPU™, Fujitsu DPI™, ARM's DynamicIQ™, IBM TrueNorth™, Lambda GPU Server with Testa V100s™, Xilinx Alveo™ U200, Xilinx Alveo™ U2190, Xilinx Alveo™ U280, Intel/Altera Stratix™ GX2800, Intel/Altera Stratix™ GX2800, and Intel Stratix™ GX10M. In some examples, a host CPU can be implemented on the same integrated circuit as the configurable processor.

Implementations described herein implement the neural network-based base caller 300 using the configurable processor 1946. The configuration file for the configurable processor 1946 can be implemented by specifying the logic functions to be executed using a high-level description language HDL or a register transfer level RTL language specification. The specification can be compiled using the resources designed for the selected configurable processor to generate the configuration file. The same or similar specification can be compiled for the purposes of generating a design for an application-specific integrated circuit which may not be a configurable processor.

Alternatives for the configurable processor 1946, in all implementations described herein, therefore include a configured processor comprising an application specific ASIC or special purpose integrated circuit or set of integrated circuits, or a system-on-a-chip SOC device, or a graphics processing unit (GPU) processor or a coarse-grained reconfigurable architecture (CGRA) processor, configured to execute a neural network based base call operation as described herein.

In general, configurable processors and configured processors described herein, as configured to execute runs of a neural network, are referred to herein as neural network processors.

The configurable processor 1946 is configured in this example by a configuration file loaded using a program executed by the CPU 1952, or by other sources, which configures the array of configurable elements 1991 (e.g., configuration logic blocks (CLB) such as look up tables (LUTs), flip-flops, compute processing units (PMUs), and compute memory units (CMUs), configurable I/O blocks, programmable interconnects) on the configurable processor to execute the base call function. In this example, the configuration includes a data flow logic 1997 which is coupled to the buses 1989 and 1993 and executes functions for distributing data and control parameters among the elements used in the base call operation.

Also, the configurable processor 1946 is configured with a data flow logic 1997 to execute the neural network-based base caller 300. The logic 1997 comprises multi-cycle execution clusters (e.g., 1979) which, in this example, include execution cluster 1 through execution cluster X. The number of multi-cycle execution clusters can be selected according to a trade-off involving the desired throughput of the operation, and the available resources on the configurable processor 1946.

The multi-cycle execution clusters are coupled to the data flow logic 1997 by data flow paths 1999 implemented using configurable interconnect and memory resources on the configurable processor 1946. Also, the multi-cycle execution clusters are coupled to the data flow logic 1997 by control paths 1995 implemented using configurable interconnect and memory resources for example on the configurable processor 1946, which provide control signals indicating available execution clusters, readiness to provide input units for the execution of a run of the neural network-based base caller 300 to the available execution clusters, readiness to provide trained parameters for the neural network-based base caller 300, readiness to provide output patches of base call classification data, and other control data used for the execution of the neural network-based base caller 300.

The configurable processor 1946 is configured to execute runs of the neural network-based base caller 300 using trained parameters to produce classification data for the sensing cycles of the base calling operation. A run of the neural network-based base caller 300 is executed to produce classification data for a subject sensing cycle of the base calling operation. A run of the neural network-based base caller 300 operates on a sequence including a number N of arrays of tile data from respective sensing cycles of N sensing cycles, where the N sensing cycles provide sensor data for different base call operations for one base position per operation in a time sequence in the examples described herein. Optionally, some of the N sensing cycles can be out of sequence if needed according to a particular neural network model being executed. The number N can be any number greater than one. In some examples described herein, sensing cycles of the N sensing cycles represent a set of sensing cycles for at least one sensing cycle preceding the subject sensing cycle and at least one sensing cycle following the subject cycle in a time sequence. Examples are described herein in which the number N is an integer equal to or greater than five.

The data flow logic 1997 is configured to move tile data and at least some trained parameters of the model parameters from the memory 1948A to the configurable processor 1946 for runs of the neural network-based base caller 300, using input units for a given run including tile data for spatially aligned patches of the N arrays. The input units can be moved by direct memory access operations in one DMA operation, or in smaller units moved during available time slots in coordination with the execution of the neural network deployed.

Tile data for a sensing cycle as described herein can comprise an array of sensor data having one or more features. For example, the sensor data can comprise two images which are analyzed to identify one of four bases at a base position in a genetic sequence of DNA, RNA, or other genetic material. The tile data can also include metadata about the images and the sensors. For example, in implementations of the base calling operation, the tile data can comprise information about the alignment of the images with the clusters such as distance from center information indicating the distance of each pixel in the array of sensor data from the center of a cluster of genetic material on the tile.

During the execution of the neural network-based base caller 300 as described below, tile data can also include data produced during the execution of the neural network-based base caller 300, referred to as intermediate data, which can be reused rather than recomputed during a run of the neural network-based base caller 300. For example, during the execution of the neural network-based base caller 300, the data flow logic 1997 can write intermediate data to the memory 1948A in place of the sensor data for a given patch of an array of tile data. Implementations like this are described in more detail below.

As illustrated, a system is described for the analysis of base call sensor output, comprising a memory (e.g., 1948A) accessible by the runtime program/logic 1980 storing tile data including sensor data for a tile from sensing cycles of a base calling operation. Also, the system includes a neural network processor, such as the configurable processor 1946 having access to the memory. The neural network processor is configured to execute runs of a neural network using trained parameters to produce classification data for sensing cycles. As described herein, a run of the neural network is operating on a sequence of N arrays of tile data from respective sensing cycles of N sensing cycles, including a subject cycle, to produce the classification data for the subject cycle. The data flow logic 1997 is provided to move tile data and the trained parameters from the memory to the neural network processor for runs of the neural network using input units including data for spatially aligned patches of the N arrays from respective sensing cycles of N sensing cycles.

Also, a system is described in which the neural network processor has access to the memory, and includes a plurality of execution clusters, the execution clusters in the plurality of execution clusters configured to execute a neural network. The data flow logic 1997 has access to the memory and to execution clusters in the plurality of execution clusters, to provide input units of tile data to available execution clusters in the plurality of execution clusters, the input units including a number N of spatially aligned patches of arrays of tile data from respective sensing cycles, including a subject sensing cycle, and to cause the execution clusters to apply the N spatially aligned patches to the neural network to produce output patches of classification data for the spatially aligned patch of the subject sensing cycle, where N is greater than 1.

Figure 20A:
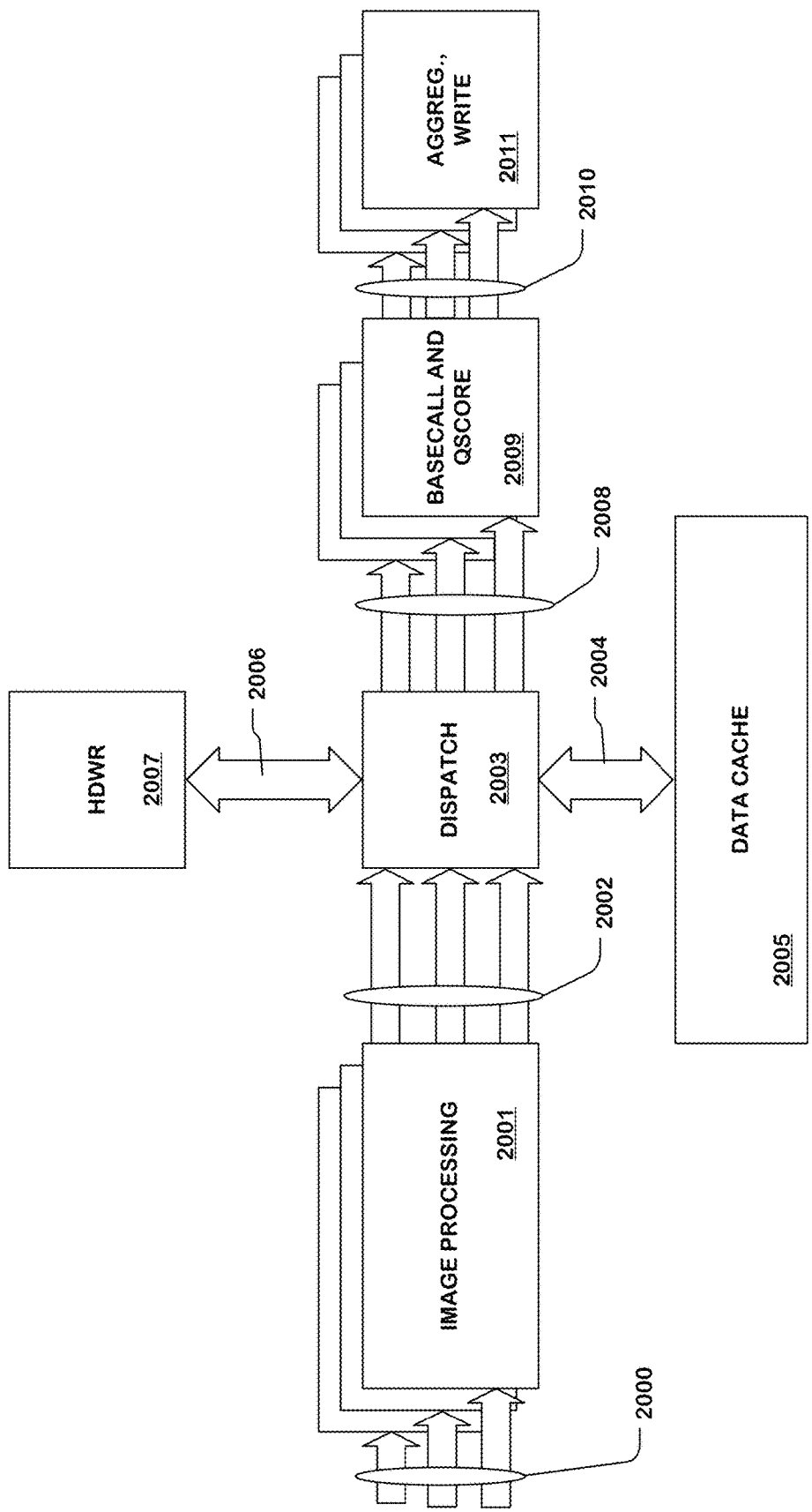
FIG. 20A is a simplified diagram showing aspects of the base calling operation, including functions of a runtime program executed by a host processor.

FIG. 20A is a simplified diagram showing aspects of the base calling operation, including functions of a runtime program (e.g., the runtime logic 1980) executed by a host processor. In this diagram, the output of image sensors from a flow cell is provided on the lines 2000 to the image processing threads 2001, which can perform processes on images such as alignment and arrangement in an array of sensor data for the individual tiles and resampling of images. The output of image sensors can also be used by processes which calculate a tile cluster mask for each tile in the flow cell, which identifies pixels in the array of sensor data that correspond to clusters of genetic material on the corresponding tile of the flow cell. The outputs of the image processing threads 2001 are provided on the lines 2002 to a dispatch logic 2003 in the CPU which routes the arrays of tile data to a data cache 2005 (e.g., SSD storage) on a high-speed bus 2004, or on high-speed bus 2006 to the neural network processor hardware 2007, such as the configurable processor 1946 of FIG. 19C, according to the state of the base calling operation. The processed and transformed images can be stored on the data cache 2005 for sensing cycles that were previously used. The hardware 2007 returns classification data output by the neural network to the dispatch logic 2003, which passes the information to the data cache 2005, or on lines 2008 to threads 2009 that perform base call and quality score computations using the classification data, and can arrange the data in standard formats for base call reads. The outputs of the threads 2009 that perform base calling and quality score computations are provided on the lines 2010 to threads 2011 that aggregate the base call reads, perform other operations such as data compression, and write the resulting base call outputs to specified destinations for utilization by the customers.

In some implementations, the host can include threads (not shown) that perform final processing of the output of the hardware 2007 in support of the neural network. For example, the hardware 2007 can provide outputs of classification data from a final layer of the multi-cluster neural network. The host processor can execute an output activation function, such as a softmax function, over the classification data to configure the data for use by the base call and quality score threads 2002. Also, the host processor can execute input operations (not shown), such as batch normalization of the tile data prior to input to the hardware 2007.

Figure 20B:
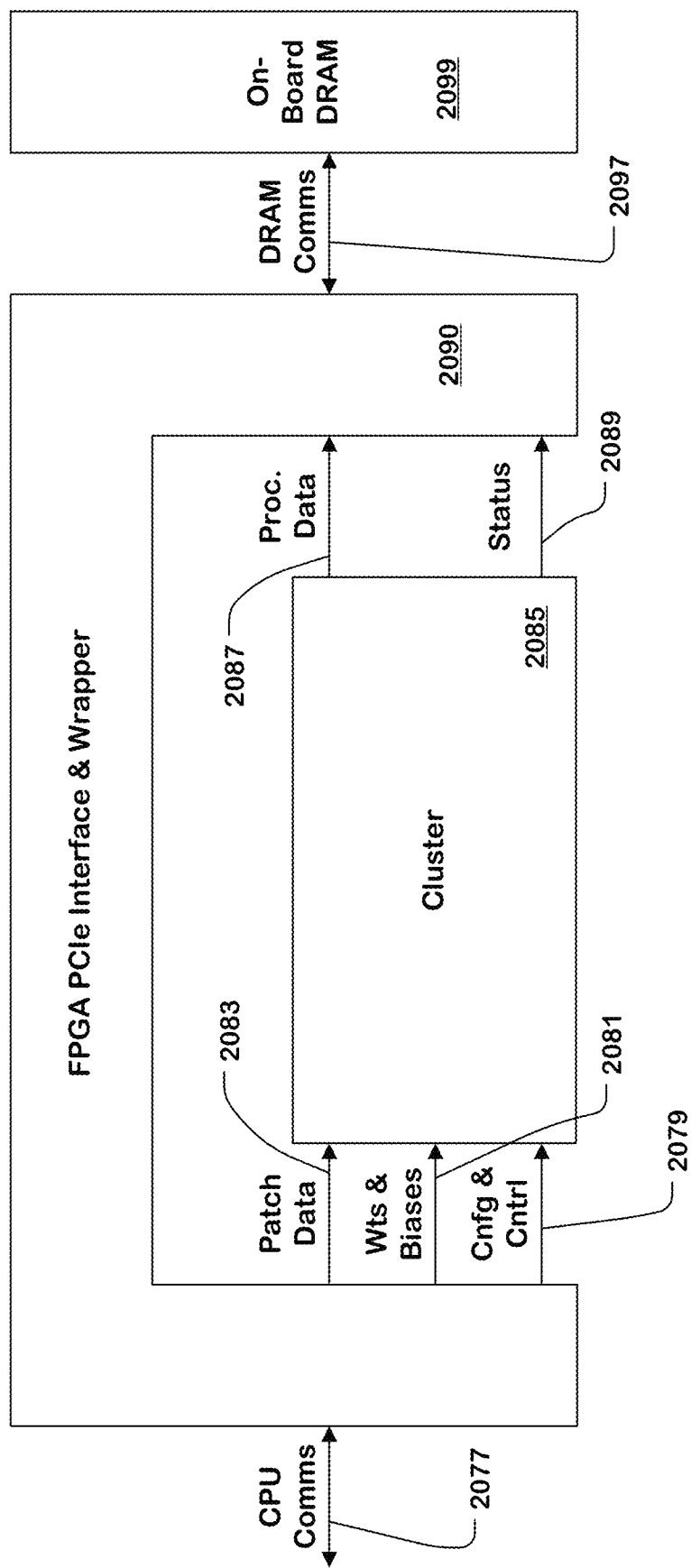
FIG. 20B is a simplified diagram of a configuration of a configurable processor such as that of FIG. 19C.

FIG. 20B is a simplified diagram of a configuration of a configurable processor 1946 such as that of FIG. 19C. In FIG. 20B, the configurable processor 1946 comprises an FPGA with a plurality of high speed PCIe interfaces. The FPGA is configured with a wrapper 2090 which comprises the data flow logic 1997 described with reference to FIG. 19C. The wrapper 2090 manages the interface and coordination with a runtime program in the CPU across the CPU communication link 2077 and manages communication with the on-board DRAM 2099 (e.g., a memory 1448A) via the DRAM communication link 2097. The data flow logic 1997 in the wrapper 2090 provides patch data retrieved by traversing the arrays of tile data on the on-board DRAM 2099 for the number N cycles to a cluster 2085 and retrieves process data 2087 from the cluster 2085 for delivery back to the on-board DRAM 2099. The wrapper 2090 also manages the transfer of data between the on-board DRAM 2099 and host memory, for both the input arrays of tile data, and for the output patches of classification data. The wrapper transfers patch data on the line 2083 to the allocated cluster 2085.

The wrapper provides trained parameters, such as weights and biases on the line 2081 to the cluster 2085 retrieved from the on-board DRAM 2099. The wrapper provides configuration and control data on the line 2079 to the cluster 2085 provided from, or generated in response to, the runtime program on the host via the CPU communication link 2077. The cluster can also provide status signals on the line 2089 to the wrapper 2090, which are used in cooperation with control signals from the host to manage traversal of the arrays of tile data to provide spatially aligned patch data, and to execute the multi-cycle neural network over the patch data using the resources of the cluster 2085.

As mentioned above, there can be multiple clusters on a single configurable processor managed by the wrapper 2090 configured for executing on corresponding ones of multiple patches of the tile data. Each cluster can be configured to provide classification data for base calls in a subject sensing cycle using the tile data of multiple sensing cycles described herein.

In examples of the system, model data, including kernel data like filter weights and biases, can be sent from the host CPU to the configurable processor, so that the model can be updated as a function of the cycle number. A base calling operation can comprise, for a representative example, on the order of hundreds of sensing cycles. A base calling operation can include paired end reads in some implementations. For example, the model-trained parameters may be updated once every 20 cycles (or other number of cycles), or according to update patterns implemented for particular systems and neural network models. In some implementations, including paired end reads, in which a sequence for a given string in a genetic cluster on a tile includes a first part extending from a first end down (or up) the string, and a second part extending from a second end up (or down) the string, the trained parameters can be updated on the transition from the first part to the second part.

In some examples, image data for multiple cycles of sensing data for a tile can be sent from the CPU to the wrapper 2090. The wrapper 2090 can optionally do some preprocessing and transformation of the sensing data and write the information to the on-board DRAM 2099. The input tile data for each sensing cycle can include arrays of sensor data including on the order of 4000×3000 pixels per sensing cycle per tile or more, with two features representing the colors of two images of the tile, and one or two bytes per feature per pixel. For an implementation in which the number N is three sensing cycles to be used in each run of the multi-cycle neural network, the array of tile data for each run of the multi-cycle neural network can consume on the order of hundreds of megabytes per tile. In some implementations of the system, the tile data also includes an array of distance-from-cluster center (DFC) data, stored once per tile, or another type of metadata about the sensor data and the tiles.

In operation, when a multi-cycle cluster is available, the wrapper allocates a patch to the cluster. The wrapper fetches a next patch of tile data in the traversal of the tile and sends it to the allocated cluster along with appropriate control and configuration information. The cluster can be configured with enough memory on the configurable processor to hold a patch of data, including patches from multiple cycles in some systems, that is being worked on in place, and a patch of data that is to be worked on when the current patch of processing is finished using a ping-pong buffer technique or raster scanning technique in various implementations.

When an allocated cluster completes its run of the neural network for the current patch and produces an output patch, it will signal the wrapper. The wrapper will read the output patch from the allocated cluster, or alternatively the allocated cluster will push the data out to the wrapper. Then the wrapper will assemble output patches for the processed tile in the DRAM 2099. When the processing of the entire tile has been completed, and the output patches of data have been transferred to the DRAM, the wrapper sends the processed output array for the tile back to the host/CPU in a specified format. In some implementations, the on-board DRAM 2099 is managed by a memory management logic in the wrapper 2090. The runtime program can control the sequencing operations to complete the analysis of all the arrays of tile data for all the cycles in the run in a continuous flow to provide real time analysis.

Joint Training

Figure 21A:
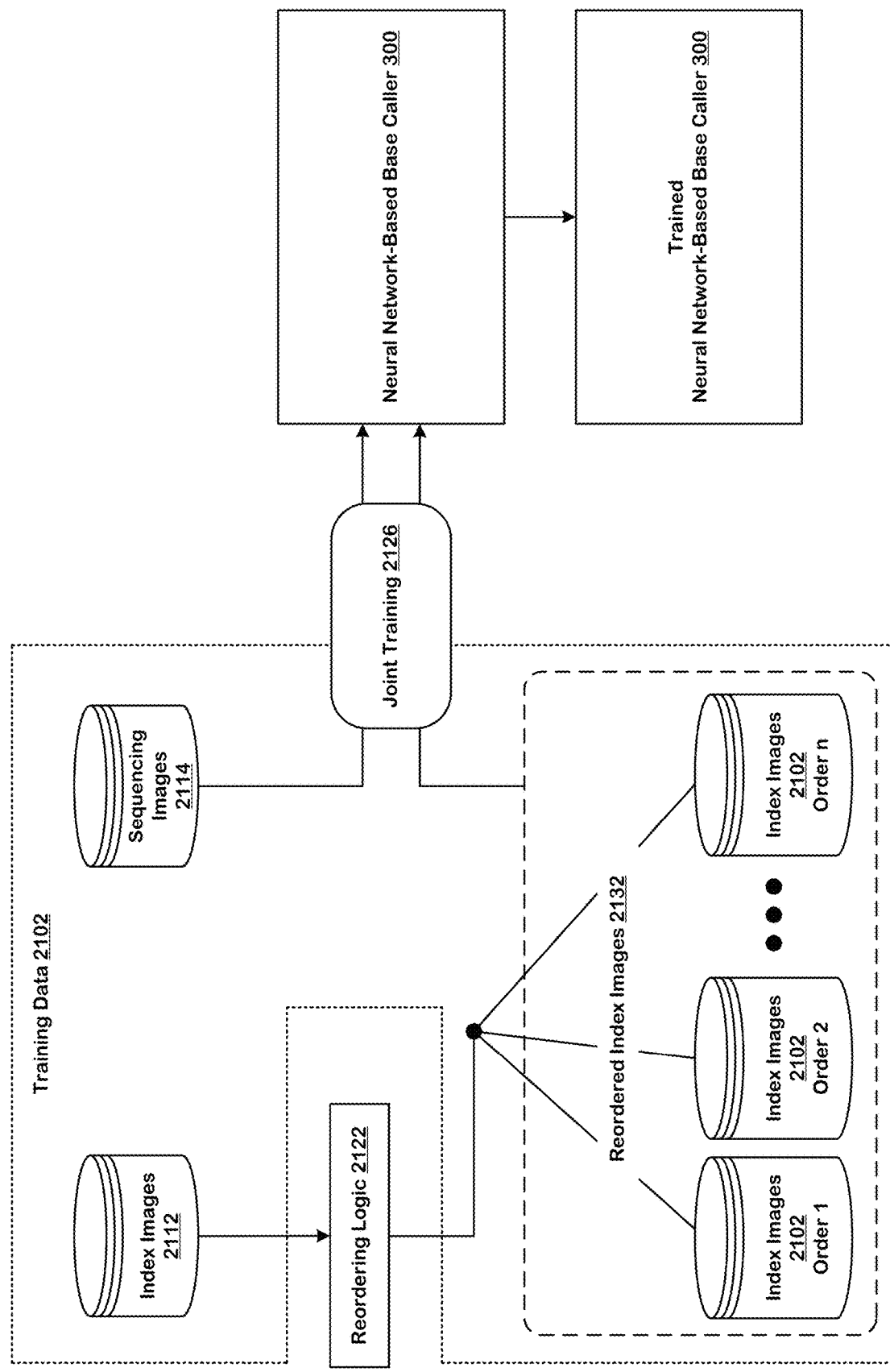
FIG. 21A illustrates one implementation of jointly training the neural network-based base caller 300 on reordered index images and sequencing images.

FIG. 21A illustrates one implementation of jointly training the neural network-based base caller 300 on reordered index images and sequencing images. Training data 2102 for training the neural network-based base caller 300 comprises index images 2112 and sequencing images 2114. To compensate for the low-sequence diversity in the index images 2112, a reordering/shuffling logic 2122 reorders the index images 2112 into reordered index images 2132. The reordered index images 2132 include the index images 2112 rearranged/sequenced in N orders.

Then, a join training 2126 is executed that trains the neural network-based base caller 300 on both the sequencing images 2114 and the reordered index images 2132. The training is based on, for example, multiple backpropagation iterations, each of which can be in turn use as input a different ordered combination and/or permutation of the index images 2112.

Figure 21B:
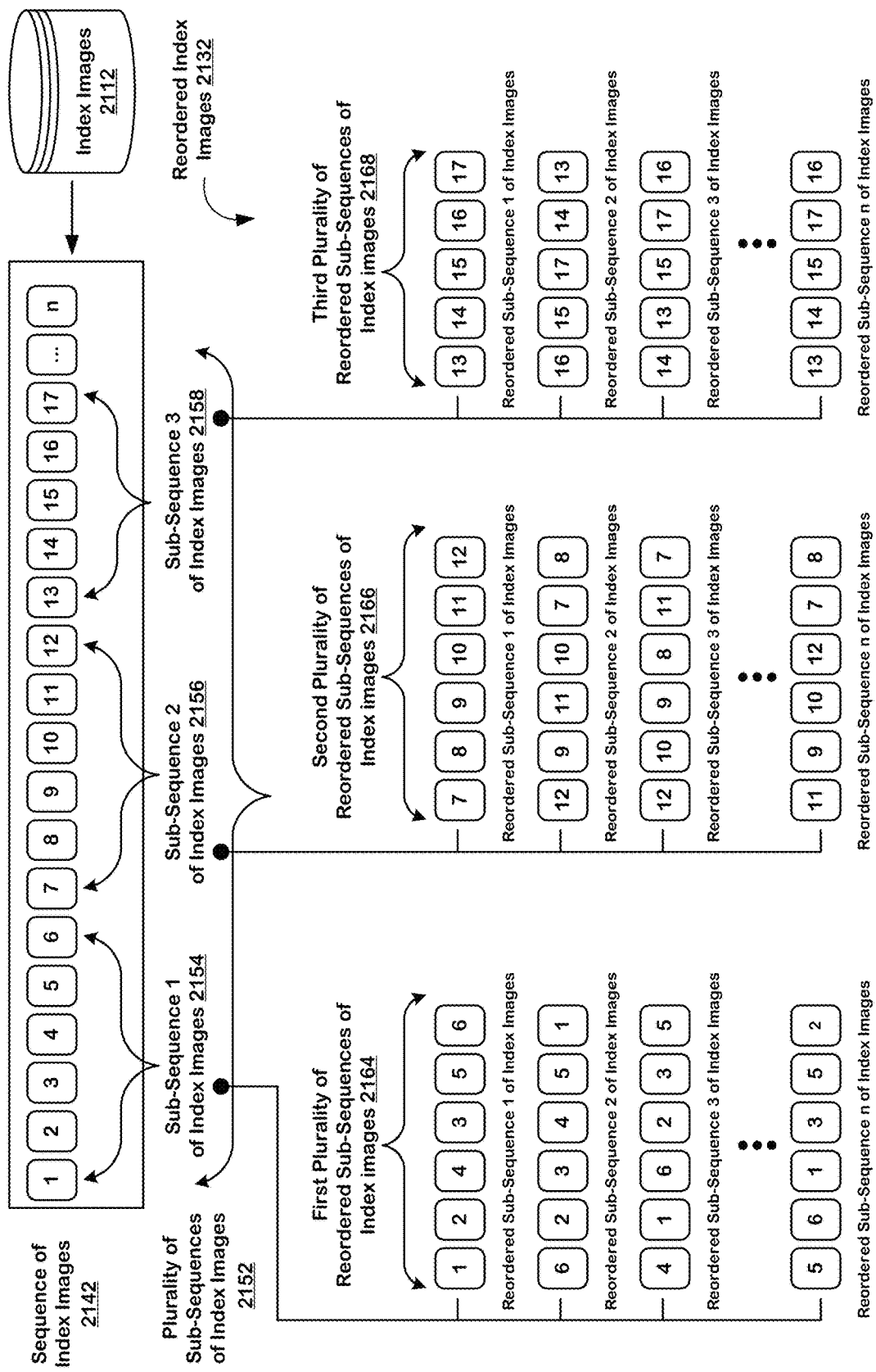
FIG. 21B illustrates one implementation of how the reordered index images 2132 of FIG. 21A are generated.

FIG. 21B illustrates one implementation of how the reordered index images 2132 of FIG. 21A are generated. In one implementation, this includes the following steps—(i) accessing a sequence of index images 2142 generated for index sequencing cycles of a sequencing run, and selecting a plurality of sub-sequences of index images 2152 from the sequence of index images, (ii) generating respective pluralities of reordered sub-sequences 2164, 2166, and 2168 of index images for respective sub-sequences of index images 2154, 2156, and 2158 in the plurality of sub-sequences of index images 2152, (iii) accessing a sequence of target images generated for target sequencing cycles of the sequencing run, and selecting a plurality of sub-sequences of target images from the sequence of target images, and (iv) training the neural network-based base caller 300 using the respective pluralities of reordered sub-sequences of index images, and the plurality of sub-sequences of target images.

The target sequencing cycles are early target sequencing cycles of the sequencing run. The respective pluralities of reordered sub-sequences of index images compensate for low-sequence diversity in the sequence of index images. The steps further include, based on the training, generating the trained neural network-based base caller 300, and applying the trained neural network-based base caller 300 for base calling at inference.

FIGS. 24 and 25 show various implementations of the technology disclosed.

Computer System

Figure 22:
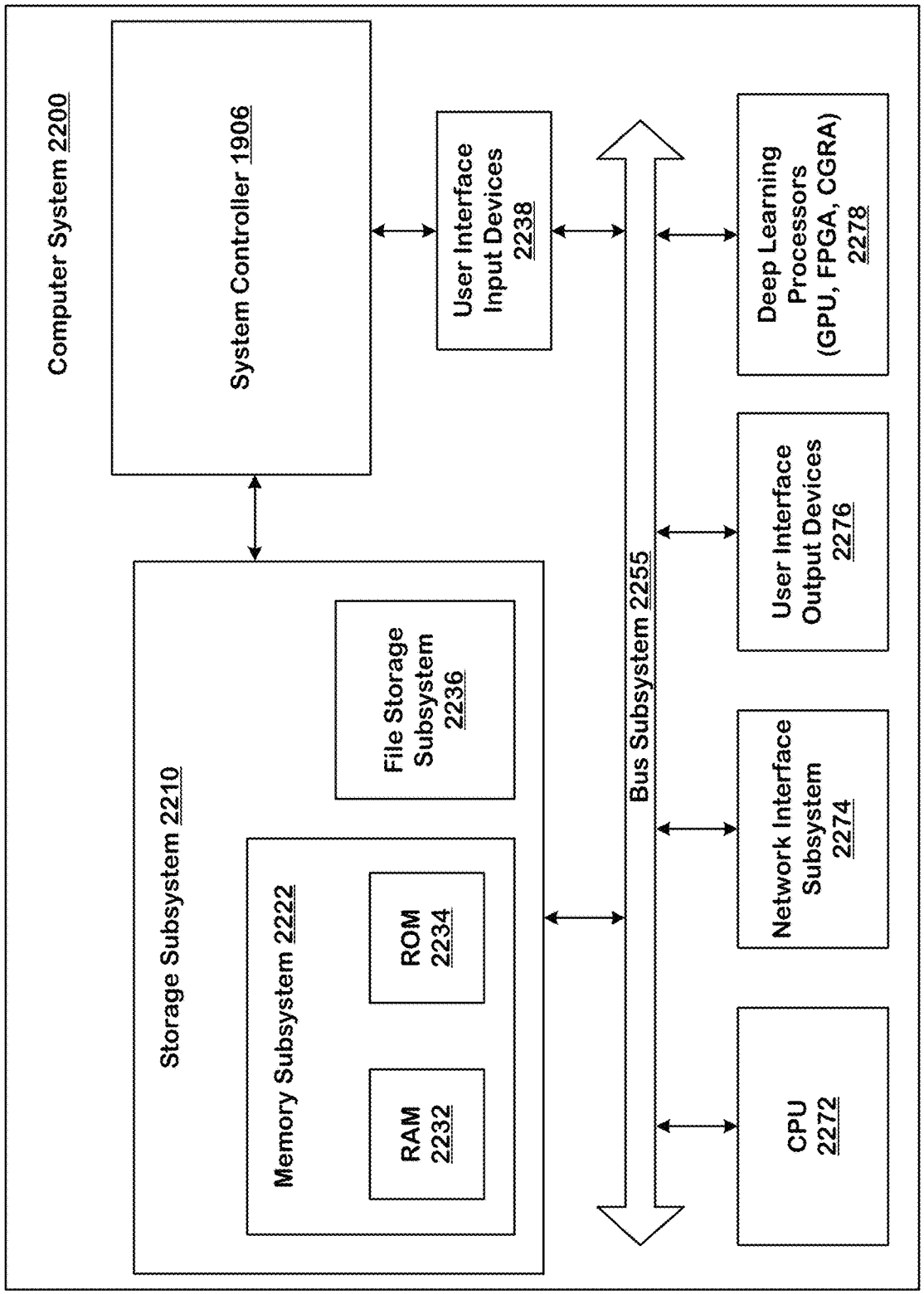
FIG. 22 is a computer system that can be used by the sequencing system of FIG. 19A to implement the base calling techniques disclosed herein.

FIG. 22 is a computer system 2200 that can be used by the sequencing system 1900A to implement the base calling techniques disclosed herein. Computer system 2200 includes at least one central processing unit (CPU) 2272 that communicates with a number of peripheral devices via bus subsystem 2255. These peripheral devices can include a storage subsystem 2210 including, for example, memory devices and a file storage subsystem 2236, user interface input devices 2238, user interface output devices 2276, and a network interface subsystem 2274. The input and output devices allow user interaction with computer system 2200. Network interface subsystem 2274 provides an interface to outside networks, including an interface to corresponding interface devices in other computer systems.

In one implementation, the system controller 1906 is communicably linked to the storage subsystem 2210 and the user interface input devices 2238.

User interface input devices 2238 can include a keyboard; pointing devices such as a mouse, trackball, touchpad, or graphics tablet; a scanner; a touch screen incorporated into the display; audio input devices such as voice recognition systems and microphones; and other types of input devices. In general, use of the term "input device" is intended to include all possible types of devices and ways to input information into computer system 2200.

User interface output devices 2276 can include a display subsystem, a printer, a fax machine, or non-visual displays such as audio output devices. The display subsystem can include an LED display, a cathode ray tube (CRT), a flat-panel device such as a liquid crystal display (LCD), a projection device, or some other mechanism for creating a visible image. The display subsystem can also provide a non-visual display such as audio output devices. In general, use of the term "output device" is intended to include all possible types of devices and ways to output information from computer system 2200 to the user or to another machine or computer system.

Storage subsystem 2210 stores programming and data constructs that provide the functionality of some or all of the modules and methods described herein. These software modules are generally executed by deep learning processors 2278.

Deep learning processors 2278 can be Graphics Processing Units (GPUs), Field-Programmable Gate Arrays (FPGAs), Application-Specific Integrated Circuits (ASICs), and/or Coarse-Grained Reconfigurable Architectures (CGRAs). Deep learning processors 2278 can be hosted by a deep learning cloud platform such as Google Cloud Platform™, Xilinx™, and Cirrascale™. Examples of deep learning processors 2278 include Google's Tensor Processing Unit (TPU)™, rackmount solutions like GX4 Rackmount Series™, GX22 Rackmount Series™ NVIDIA DGX-1™, Microsoft' Stratix V FPGA™, Graphcore's Intelligent Processor Unit (IPU)™, Qualcomm's Zeroth Platform™ with Snapdragon Processors™, NVIDIA's Volta™ NVIDIA's DRIVE PX™, NVIDIA's JETSON TX1/TX2 MODULE™, Intel's Nirvana™ Movidius VPU™, Fujitsu DPI™, ARM's DynamicIQ™, IBM TrueNorth™, Lambda GPU Server with Testa V100s™, and others.

Memory subsystem 2222 used in the storage subsystem 2210 can include a number of memories including a main random access memory (RAM) 2232 for storage of instructions and data during program execution and a read only memory (ROM) 2234 in which fixed instructions are stored. A file storage subsystem 2236 can provide persistent storage for program and data files, and can include a hard disk drive, a floppy disk drive along with associated removable media, a CD-ROM drive, an optical drive, or removable media cartridges. The modules implementing the functionality of certain implementations can be stored by file storage subsystem 2236 in the storage subsystem 2210, or in other machines accessible by the processor.

Bus subsystem 2255 provides a mechanism for letting the various components and subsystems of computer system 2200 communicate with each other as intended. Although bus subsystem 2255 is shown schematically as a single bus, alternative implementations of the bus subsystem can use multiple busses.

Computer system 2200 itself can be of varying types including a personal computer, a portable computer, a workstation, a computer terminal, a network computer, a television, a mainframe, a server farm, a widely-distributed set of loosely networked computers, or any other data processing system or user device. Due to the ever-changing nature of computers and networks, the description of computer system 2200 depicted in FIG. 22 is intended only as a specific example for purposes of illustrating the preferred implementations of the present invention. Many other configurations of computer system 2200 are possible having more or less components than the computer system depicted in FIG. 22.

Clauses

The following clauses are part of this disclosure:

1. A computer-implemented method, including:
    accessing a set of sequencing images,
        wherein sequencing images in the set of sequencing images are arranged in a first order;
    reordering the sequencing images in a reordered set of the sequencing images,
        wherein the sequencing images in the reordered set of the sequencing images are arranged in a second order, and
        wherein the first order is different than the second order; and
    processing the reordered set of the sequencing images and generating at least one base call prediction.

2. The computer-implemented method of clause 1, further including training a neural network-based base caller over a plurality of training iterations, wherein respective training iterations in the plurality of training iterations process respective reordered sets of the sequencing images through the neural network-based base caller to generate respective base call predictions, and update weights of the neural network-based base caller based on comparison of the respective base call predictions against respective base call ground truths.

3. The computer-implemented method of clause 2, wherein the sequencing images are arranged at a center position, at one or more right flanking positions, and at one or more left flanking positions.

4. The computer-implemented method of clause 3, wherein a particular one of the sequencing images is kept fixed at the center position between the first order and the second order.

5. The computer-implemented method of clause 4, wherein at least some of the sequencing images at the right flanking positions and the left flanking positions are permutated between the first order and the second order.

6. The computer-implemented method of clause 5, wherein at least some of the sequencing images at the right flanking positions and the left flanking positions are kept fixed between the first order and the second order.

7. The computer-implemented method of clause 6, further including training the neural network-based base caller over a first training iteration that processes the set of sequencing images through the neural network-based base caller to generate a first base call prediction, and updates weights of the neural network-based base caller based on comparison of the first base call prediction against a first base call ground truth.

8. The computer-implemented method of clause 7, further including training the neural network-based base caller over a second training iteration that processes the reordered set of sequencing images through the neural network-based base caller to generate a second base call prediction, and updates weights of the neural network-based base caller based on comparison of the second base call prediction against a second base call ground truth.

9. The computer-implemented method of clause 1, wherein respective ones of the sequencing images are generated for respective sequencing cycles of a sequencing run in the first order.

10. The computer-implemented method of clause 9, wherein respective ones of the sequencing images are respective index images generated for respective index sequencing cycles of the sequencing run in the first order.

11. The computer-implemented method of clause 1, further including:
  selecting a plurality of subsets of N sequencing images from a set of M sequencing images, wherein respective subsets in the plurality of subsets arrange the N sequencing images in respective sequences of the N sequencing images; and wherein M>N.

12. The computer-implemented method of clause 11, wherein the respective sequences have different combinations of the N sequencing images.

13. The computer-implemented method of clause 12, wherein the combinations are combinations with replacement.

14. The computer-implemented method of clause 12, wherein the combinations are combinations without replacement.

15. The computer-implemented method of clause 11, wherein the respective sequences have different permutations of the N sequencing images.

16. The computer-implemented method of clause 15, wherein the permutations are permutations with repetition.

17. The computer-implemented method of clause 15, wherein the permutations are permutations without repetition.

18. The computer-implemented method of clause 11, wherein the respective sequences arrange the N sequencing images in accordance with consecutive sequencing cycles.

19. The computer-implemented method of clause 11, wherein the respective sequences arrange the N sequencing images in accordance with non-consecutive sequencing cycles.

20. The computer-implemented method of clause 11, wherein the respective sequences arrange the N sequencing images in accordance with a combination of consecutive sequencing cycles and non-consecutive sequencing cycles.

21. The computer-implemented method of clause 11, wherein the N varies between the respective sequences.

22. The computer-implemented method of clause 11, wherein the N is constant between the respective sequences.

23. The computer-implemented method of clause 11, wherein the respective sequences have overlapping sequencing images.

24. The computer-implemented method of clause 11, wherein the respective sequences have no overlapping sequencing images.

25. The computer-implemented method of clause 11, further including training the neural network-based base caller over respective training iterations that process the respective sequences of the N sequencing images through the neural network-based base caller to generate respective base call predictions, and update weights (e.g., via backpropagation) of the neural network-based base caller based on comparison of the respective base call predictions against respective base call ground truths.

26. The computer-implemented method of clause 11, wherein the M sequencing images are generated for consecutive sequencing cycles.

27. The computer-implemented method of clause 11, wherein the M sequencing images are generated for non-consecutive sequencing cycles.

28. The computer-implemented method of clause 11, wherein the M sequencing images are generated for a combination of consecutive sequencing cycles and non-consecutive sequencing cycles.

29. A computer-implemented method, including:
  accessing a plurality of sequences of N sequencing images; and
  training a neural network-based base caller over a plurality of training iterations, wherein respective training iterations in the plurality of training iterations process respective sequences of the N sequencing images in the plurality of sequences in respective orders through the neural network-based base caller to generate respective base call predictions, and update weights (e.g., via backpropagation) of the neural network-based base caller based on comparison of the respective base call predictions against respective base call ground truths.

30. The computer-implemented method of clause 29, wherein the respective sequences arrange the N sequencing images at a center position, at one or more right flanking positions, and at one or more left flanking positions.

31. The computer-implemented method of clause 30, wherein a particular one of the N sequencing images is kept fixed at the center position between the respective sequences.

32. The computer-implemented method of clause 31, wherein at least some of the N sequencing images at the right flanking positions and the left flanking positions vary between the respective sequences.

33. The computer-implemented method of clause 29, wherein the N sequencing images are selected from M sequencing images, wherein M>N.

34. The computer-implemented method of clause 33, wherein the respective sequences have different combinations of the N sequencing images.

35. The computer-implemented method of clause 34, wherein the combinations are combinations with replacement.

36. The computer-implemented method of clause 34, wherein the combinations are combinations without replacement.

37. The computer-implemented method of clause 33, wherein the respective sequences have different permutations of the N sequencing images.

38. The computer-implemented method of clause 37, wherein the permutations are permutations with repetition.

39. The computer-implemented method of clause 37, wherein the permutations are permutations without repetition.

40. The computer-implemented method of clause 29, wherein the respective sequences arrange the N sequencing images in accordance with consecutive sequencing cycles.

41. The computer-implemented method of clause 29, wherein the respective sequences arrange the N sequencing images in accordance with non-consecutive sequencing cycles.

42. The computer-implemented method of clause 29, wherein the respective sequences arrange the N sequencing images in accordance with a combination of consecutive sequencing cycles and non-consecutive sequencing cycles.

43. The computer-implemented method of clause 29, wherein the N varies between the respective sequences.

44. The computer-implemented method of clause 29, wherein the N is constant between the respective sequences.

45. The computer-implemented method of clause 29, wherein the respective sequences have overlapping sequencing images.

46. The computer-implemented method of clause 29, wherein the respective sequences have no overlapping sequencing images.

47. The computer-implemented method of clause 33, wherein the M sequencing images are generated for consecutive sequencing cycles.

48. The computer-implemented method of clause 33, wherein the M sequencing images are generated for non-consecutive sequencing cycles.

49. The computer-implemented method of clause 33, wherein the M sequencing images are generated for a combination of consecutive sequencing cycles and non-consecutive sequencing cycles.

50. The computer-implemented method of clause 29, wherein the M sequencing images are index sequencing images generated for index sequencing cycles of a sequencing run.

51. A computer-implemented method of training a neural network-based base caller that comprises a spatial logic configured to extract intensity features confined to per-cycle sequencing images in an input, and a temporal logic configured to extract intensity features spanning pan-cycle sequencing images in the input, including:
    training the spatial logic and the temporal logic of the neural network-based base caller on a first training dataset of sequencing images to generate a trained spatial logic and a trained temporal logic, wherein the training includes forward propagating sequencing images in the first training dataset through the spatial logic and the temporal logic and generating base call predictions, and backward propagating, through the temporal logic and the spatial logic, gradient updates determined based on comparison of the base call predictions against base call ground truths;
    further training only the trained spatial logic of the neural network-based base caller on a second training dataset of sequencing images to generate a retrained spatial logic, wherein the further training includes forward propagating sequencing images in the second training dataset through the trained spatial logic and the trained temporal logic and generating further base call predictions, and backward propagating, only through the trained spatial logic, further gradient updates determined based on comparison of the further base call predictions against further base call ground truths, thereby bypassing backward propagating the further gradient updates through the trained temporal logic; and
    applying the retrained spatial logic and the trained temporal logic of the neural network-based base caller on new sequencing images at inference to generate new base call predictions.

52. The computer-implemented method of clause 51, wherein the sequencing images in the first training dataset of sequencing images are read sequencing images generated for read sequencing cycles of a sequencing run.

53. The computer-implemented method of clause 51, wherein the sequencing images in the second training dataset of sequencing images are index sequencing images generated for index sequencing cycles of the sequencing run.

54. The computer-implemented method of clause 53, wherein the sequencing images in the second training dataset of sequencing images include a combination of the read sequencing images and the index sequencing images.

55. The computer-implemented method of clause 53, wherein the bypassing prevents the trained temporal logic from learning temporal dependencies between intensity features of the index sequencing images.

56. A computer-implemented method of training a neural network-based base caller that comprises a spatial logic configured to extract intensity features confined to per-cycle sequencing images in an input, and a temporal logic configured to extract intensity features spanning pan-cycle sequencing images in the input, including:
    training the spatial logic and the temporal logic of the neural network-based base caller on a first training dataset of sequencing images to generate a trained spatial logic and a trained temporal logic;
    further training only the trained spatial logic of the neural network-based base caller on a second training dataset of sequencing images to generate a retrained spatial logic; and
    configuring the neural network-based base caller with the retrained spatial logic and the trained temporal logic to execute future base calling.

57. A computer-implemented method of training a neural network-based base caller that comprises a spatial logic configured to extract intensity features confined to per-cycle sequencing images in an input, and a temporal logic configured to extract intensity features spanning pan-cycle sequencing images in the input, including:
    training the spatial logic and the temporal logic of the neural network-based base caller on a first training dataset of sequencing images to generate a trained spatial logic and a trained temporal logic;
    further training only the trained spatial logic of the neural network-based base caller on a second training dataset of index sequencing images to generate a retrained spatial logic; and
    configuring the neural network-based base caller with the retrained spatial logic and the trained temporal logic to execute future base calling of index sequencing cycles.

58. A system, comprising:
    an accessing logic configured to access a set of sequencing images,
        wherein sequencing images in the set of sequencing images are arranged in a first order;
    a reordering logic configured to reorder the sequencing images in a reordered set of the sequencing images,
        wherein the sequencing images in the reordered set of the sequencing images are arranged in a second order, and
        wherein the first order is different than the second order; and
    a processing logic configured to process the reordered set of the sequencing images and generate at least one base call prediction.

59. The system of clause 58, further comprising:
    a normalization logic configured to normalize one or more of the sequencing images in the reordered set of the sequencing images.

60. The system of clause 58, wherein one or more of the sequencing images in the ordered and/or reordered set of the sequencing images are normalized sequencing images.

61. A computer-implemented method of training a neural network-based base caller to base call index sequences, the method including:

accessing a sequence of index images generated for index sequencing cycles of a sequencing run, and selecting a plurality of sub-sequences of index images from the sequence of index images;

generating respective pluralities of reordered sub-sequences of index images for respective sub-sequences of index images in the plurality of sub-sequences of index images, wherein reordered sub-sequences of index images in a given plurality of reordered sub-sequences of index images generated for a given sub-sequence of index images each have a different ordering;

accessing a sequence of target images generated for target sequencing cycles of the sequencing run, and selecting a plurality of sub-sequences of target images from the sequence of target images;

training a neural network-based base caller using the respective pluralities of reordered sub-sequences of index images, and the plurality of sub-sequences of target images.

62. The computer-implemented method of clause 61, wherein the target sequencing cycles are early target sequencing cycles of the sequencing run.

63. The computer-implemented method of clause 61, wherein the respective pluralities of reordered sub-sequences of index images compensate for low-sequence diversity in the sequence of index images.

64. The computer-implemented method of clause 61, further including, based on the training, generating a trained neural network-based base caller, and applying the trained neural network-based base caller for base calling at inference.

65. A non-transitory computer readable storage medium impressed with computer program instructions to train a neural network-based base caller to base call index sequences, the instructions, when executed on a processor, implement a method comprising:

accessing a sequence of index images generated for index sequencing cycles of a sequencing run, and selecting a plurality of sub-sequences of index images from the sequence of index images;

generating respective pluralities of reordered sub-sequences of index images for respective sub-sequences of index images in the plurality of sub-sequences of index images, wherein reordered sub-sequences of index images in a given plurality of reordered sub-sequences of index images generated for a given sub-sequence of index images each have a different ordering;

accessing a sequence of target images generated for target sequencing cycles of the sequencing run, and selecting a plurality of sub-sequences of target images from the sequence of target images;

training a neural network-based base caller using the respective pluralities of reordered sub-sequences of index images, and the plurality of sub-sequences of target images.

66. The non-transitory computer readable storage medium of clause 64, wherein the target sequencing cycles are early target sequencing cycles of the sequencing run.

67. The non-transitory computer readable storage medium of clause 64, wherein the respective pluralities of reordered sub-sequences of index images compensate for low-sequence diversity in the sequence of index images.

68. The computer-implemented method of clause 64, implementing the method further comprising, based on the training, generating a trained neural network-based base caller, and applying the trained neural network-based base caller for base calling at inference.

69. A system including one or more processors coupled to memory, the memory loaded with computer instructions to train a neural network-based base caller to base call index sequences, the instructions, when executed on the processors, implement actions comprising:

accessing a sequence of index images generated for index sequencing cycles of a sequencing run, and selecting a plurality of sub-sequences of index images from the sequence of index images;

generating respective pluralities of reordered sub-sequences of index images for respective sub-sequences of index images in the plurality of sub-sequences of index images, wherein reordered sub-sequences of index images in a given plurality of reordered sub-sequences of index images generated for a given sub-sequence of index images each have a different ordering;

accessing a sequence of target images generated for target sequencing cycles of the sequencing run, and selecting a plurality of sub-sequences of target images from the sequence of target images;

training a neural network-based base caller using the respective pluralities of reordered sub-sequences of index images, and the plurality of sub-sequences of target images.

70. The system of clause 69, wherein the target sequencing cycles are early target sequencing cycles of the sequencing run.

71. The system of clause 69, wherein the respective pluralities of reordered sub-sequences of index images compensate for low-sequence diversity in the sequence of index images.

72. The system of clause 69, further implementing actions comprising, based on the training, generating a trained neural network-based base caller, and applying the trained neural network-based base caller for base calling at inference.

73. A trained base caller, comprising:
neural network weights trained on training data comprising:
(i) respective pluralities of reordered sub-sequences of index images generated for respective sub-sequences of index images in a plurality of sub-sequences of index images, wherein reordered sub-sequences of index images in a given plurality of reordered sub-sequences of index images generated for a given sub-sequence of index images each have a different ordering, and wherein the plurality of sub-sequences of index images are selected from a sequence of index images generated for index sequencing cycles of a sequencing run; and
(ii) a plurality of sub-sequences of target images selected from a sequence of target images generated for target sequencing cycles of the sequencing run.

74. The trained base caller of clause 73, wherein the target sequencing cycles are early target sequencing cycles of the sequencing run.

Other implementations of the method described in this section can include a non-transitory computer readable storage medium storing instructions executable by a processor to perform any of the methods described above. Yet another implementation of the method described in this section can include a system including a memory and one or more processors operable to execute instructions, stored in the memory, to perform any of the methods described above.

While the present invention is disclosed by reference to the preferred implementations and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following clauses.

What is claimed is:

1. A computer-implemented method, including:
accessing a set of sequencing images depicting emission signals from nucleotide clusters, wherein sequencing images in the set of sequencing images are arranged in a first order;
reordering the sequencing images depicting emission signals in a reordered set of the sequencing images,
wherein the sequencing images in the reordered set of the sequencing images are arranged in a second order, and wherein the first order is different than the second order; and
processing the reordered set of the sequencing images and generating at least one base call prediction for a nucleotide base in a sequence read based on the reordered set of the sequencing images.

2. The computer-implemented method of claim 1, further including training a neural network-based base caller over a plurality of training iterations, wherein respective training iterations in the plurality of training iterations process respective reordered sets of the sequencing images through the neural network-based base caller to generate respective base call predictions, and update weights of the neural network-based base caller based on comparison of the respective base call predictions against respective base call ground truths.

3. The computer-implemented method of claim 2, wherein the sequencing images are arranged at a center position, at one or more right flanking positions, and at one or more left flanking positions.

4. The computer-implemented method of claim 3, wherein a particular one of the sequencing images is kept fixed at the center position between the first order and the second order.

5. The computer-implemented method of claim 4, wherein at least some of the sequencing images at the one or more right flanking positions and the one or more left flanking positions are permutated between the first order and the second order.

6. The computer-implemented method of claim 5, wherein at least some of the sequencing images at the one or more right flanking positions and the one or more left flanking positions are kept fixed between the first order and the second order.

7. The computer-implemented method of claim 6, further including training the neural network-based base caller over a first training iteration that processes the set of sequencing images through the neural network-based base caller to generate a first base call prediction, and updates weights of the neural network-based base caller based on comparison of the first base call prediction against a first base call ground truth.

8. The computer-implemented method of claim 7, further including training the neural network-based base caller over a second training iteration that processes the reordered set of sequencing images through the neural network-based base caller to generate a second base call prediction, and updates weights of the neural network-based base caller based on comparison of the second base call prediction against a second base call ground truth.

9. The computer-implemented method of claim 1, wherein respective ones of the sequencing images are generated for respective sequencing cycles of a sequencing run in the first order.

10. The computer-implemented method of claim 9, wherein respective ones of the sequencing images are respective index images generated for respective index sequencing cycles of the sequencing run in the first order.

11. The computer-implemented method of claim 1, further including:
selecting a plurality of subsets of N sequencing images from a set of M sequencing images, wherein respective subsets in the plurality of subsets arrange the N sequencing images in respective sequences of the N sequencing images; and wherein M>N.

12. The computer-implemented method of claim 11, wherein the respective sequences have different combinations of the N sequencing images.

13. The computer-implemented method of claim 12, wherein the different combinations are combinations with replacement.

14. The computer-implemented method of claim 12, wherein the different combinations are combinations without replacement.

15. The computer-implemented method of claim 11, wherein the respective sequences have different permutations of the N sequencing images.

16. The computer-implemented method of claim 15, wherein the different permutations are permutations with repetition.

17. The computer-implemented method of claim 15, wherein the different permutations are permutations without repetition.

18. The computer-implemented method of claim 11, wherein the respective sequences arrange the N sequencing images in accordance with consecutive sequencing cycles.

19. The computer-implemented method of claim 11, wherein the respective sequences arrange the N sequencing images in accordance with non-consecutive sequencing cycles.

20. The computer-implemented method of claim 11, wherein the respective sequences arrange the N sequencing images in accordance with a combination of consecutive sequencing cycles and non-consecutive sequencing cycles.

21. The computer-implemented method of claim 11, wherein N for the N sequencing images varies between the respective sequences.

22. The computer-implemented method of claim 11, wherein N for the N sequencing images is constant between the respective sequences.

23. The computer-implemented method of claim 11, wherein the respective sequences have overlapping sequencing images.

24. The computer-implemented method of claim 11, wherein the respective sequences have no overlapping sequencing images.

25. The computer-implemented method of claim 11, further including training a neural network-based base caller over respective training iterations that process the respective sequences of the N sequencing images through the neural network-based base caller to generate respective base call predictions, and update weights of the neural network-based base caller based on comparison of the respective base call predictions against respective base call ground truths.

26. The computer-implemented method of claim 11, wherein the set of M sequencing images are generated for consecutive sequencing cycles.

27. The computer-implemented method of claim 11, wherein the set of M sequencing images are generated for non-consecutive sequencing cycles.

28. The computer-implemented method of claim 11, wherein the set of M sequencing images are generated for a combination of consecutive sequencing cycles and non-consecutive sequencing cycles.

29. A computer-implemented method, including:
accessing a plurality of sequences of N sequencing images; and
training a neural network-based base caller over a plurality of training iterations, wherein respective training iterations in the plurality of training iterations process respective sequences of the N sequencing images in the plurality of sequences in respective orders through the neural network-based base caller to generate respective base call predictions,
wherein a first order for the N sequencing images of the respective orders differs from a second order for the N sequencing images of the respective orders, and
wherein the respective training iterations in the plurality of training iterations update weights of the neural network-based base caller based on comparison of the respective base call predictions against respective base call ground truths.

30. The computer-implemented method of claim 29, wherein the respective sequences arrange the N sequencing images at a center position, at one or more right flanking positions, and at one or more left flanking positions.

31. A system, comprising:
accessing logic configured to access a set of sequencing images depicting emission signals from nucleotide clusters, wherein sequencing images in the set of sequencing images are arranged in a first order;
reordering logic configured to reorder the sequencing images depicting emission signals in a reordered set of the sequencing images,
wherein the sequencing images in the reordered set of the sequencing images are arranged in a second order, and
wherein the first order is different than the second order; and
processing logic configured to process the reordered set of the sequencing images and generate at least one base call prediction for a nucleotide base in a sequence read based on the reordered set of the sequencing images.

* * * * *